US012667739B2

(12) United States Patent
Wall et al.

(10) Patent No.: US 12,667,739 B2
(45) Date of Patent: Jun. 30, 2026

(54) SYSTEM AND METHOD FOR WILDFIRE RISK ASSESSMENT, MITIGATION AND MONITORING FOR BUILDING STRUCTURES

(71) Applicant: Fortress Wildfire Insurance Group, LLC, Rocklin, CA (US)

(72) Inventors: John Wall, Frankford, DE (US); Michael O'Dell, Alameda, CA (US)

(73) Assignee: Fortress Wildfire Insurance Group, LLC

( * ) Notice: Subject to any disclaimer, the term of this patent is extended or adjusted under 35 U.S.C. 154(b) by 934 days.

(21) Appl. No.: 17/863,298

(22) Filed: Jul. 12, 2022

(65) Prior Publication Data

US 2023/0023808 A1 Jan. 26, 2023

Related U.S. Application Data

(60) Provisional application No. 63/221,242, filed on Jul. 13, 2021.

(51) Int. Cl.
*A62C 3/02* (2006.01)
*G06F 30/13* (2020.01)
(Continued)

(52) U.S. Cl.
CPC ............ *A62C 3/0278* (2013.01); *G06F 30/13* (2020.01); *G06V 20/176* (2022.01); *G06V 20/188* (2022.01); *G06F 2119/08* (2020.01)

(58) Field of Classification Search
CPC ....... A62C 3/0278; G06F 30/00; G06F 30/13; G06F 2119/08; G06V 20/176; G06V 20/188; G06Q 40/08
(Continued)

(56) References Cited

U.S. PATENT DOCUMENTS 10,529,029 B2 1/2020 Okazaki
10,650,285 B1 5/2020 Okazaki
(Continued)

FOREIGN PATENT DOCUMENTS

WO 2014151122 A1 9/2014
WO WO-2020176309 A1 * 9/2020 ............. A62C 37/44

OTHER PUBLICATIONS

Rhodes, Noah et al. "Balancing Wildfire Risk and Power Outages Through Optimized Power Shut-Offs", Jul. 2021, IEEE Transactions on Power Systems, vol. 36, No. 4, IEEE. (Year: 2021).*
(Continued)

*Primary Examiner* — Cedric Johnson
(74) *Attorney, Agent, or Firm* — Smith Baluch LLP

(57) ABSTRACT

There is a system and method for wildfire loss assessment for a building structure, or a set of building structures, comprising obtaining a building structure dataset; receiving, by a computer system, computer-readable input data regarding one or more fuel sources, in the proximity of the building structure location, that may cause the building structure to ignite; correlating and combining the building structure dataset with the fuel source dataset; determining, by the computer system, an ignition potential for the building structure based on the one or more fuel sources; and outputting a report of the ignition potential for the building structure.

20 Claims, 34 Drawing Sheets

(51) Int. Cl.
 *G06V 20/10* (2022.01)
 *G06F 119/08* (2020.01)
(58) Field of Classification Search
 USPC .......................................................... 703/2
 See application file for complete search history.

(56) References Cited

U.S. PATENT DOCUMENTS

| | | | |
|---|---|---|---|
| 10,755,357 | B1 | 8/2020 | Davis et al. |
| 11,030,491 | B2 | 6/2021 | Okazaki |
| 11,195,058 | B2 | 12/2021 | Okazaki |
| 2014/0132409 | A1 | 5/2014 | Billman et al. |
| 2019/0304026 | A1 | 10/2019 | Lyman et al. |
| 2021/0090300 | A1 | 3/2021 | Leppänen et al. |
| 2021/0097850 | A1* | 4/2021 | Ton-That .............. G06F 16/587 |
| 2022/0398840 | A1* | 12/2022 | Dhawan ................... G08G 5/56 |

OTHER PUBLICATIONS

Platt, Rutherford "Wildfire Hazard in the Home Ignition Zone: An Object-Oriented Analysis Integrating LiDAR and VHR Satellite Imagery", 2014, Applied Geography 51, Elsevier Ltd. (Year: 2014).*
Examination Report No. 2 in Australian App. No. 2022/205,161 dated Dec. 5, 2025, 4 pages.
Bahrani, Babak, The University of North Carolina at Charlotte ProQuest Dissertations Publishing, 2020. 27835390, pp. 1-24.
Santoso, Frontiers in Mechanical Engineering • Jul. 2019 vol. 5 Article 19 pp. 1-21.
Andrews, Patricia L. 2018. The Rothermel surface fire spread model and associated developments: A comprehensive explanation. Gen. Tech. Rep. RMRS-GTR-371. Fort Collins, CO: U.S. Department of Agriculture, Forest Service, Rocky Mountain Research Station. 121 p., pp. 1-132.
Andrews, Patricia L.; Chase, Carolyn H. 1989. BEHAVE: fire behavior prediction and fuel modeling system—BURNsubsystem, Part 2. General Technical Report INT-260. Ogden, UT: U.S. Department of Agriculture, Forest Service, Intermountain Research Station. 93 p., pp. 1-27.
Andrews, Patricia L.; Chase, Carolyn H. 1989. BEHAVE: fire behavior prediction and fuel modeling system—BURNsubsystem, Part 2. General Technical Report INT-260. Ogden, UT: U.S. Department of Agriculture, Forest Service, Intermountain Research Station. 93 p., pp. 28-65.
Andrews, Patricia L.; Chase, Carolyn H. 1989. BEHAVE: fire behavior prediction and fuel modeling system—BURNsubsystem, Part 2. General Technical Report INT-260. Ogden, UT: U.S. Department of Agriculture, Forest Service, Intermountain Research Station. 93 p., pp. 66-96.
Andrews, Patricia L.; Heinsch, Faith Ann; Schelvan, Luke. 2011. How to generate and interpret fire characteristics charts for surface and crown fire behavior. Gen. Tech. Rep. RMRS-GTR-253. Fort Collins, CO: U.S. Department of Agriculture, Forest Service, Rocky Mountain Research Station. 40 p.
Andrews, Proceedings of 7th Symposium on Fire and Forest Meteorology; Oct. 23-25, 2007 pp. 1-13.
Burgan, General Technical Report INT-167. Ogden, UT: U. S. Department of Agriculture, Forest Service, Intermountain Forest pp. 1-27.
Burgan, General Technical Report INT-167. Ogden, UT: U. S. Department of Agriculture, Forest Service, Intermountain Forest pp. 28-56.
Burgan, General Technical Report INT-167. Ogden, UT: U. S. Department of Agriculture, Forest Service, Intermountain Forest pp. 57-98.
Burgan, General Technical Report INT-167. Ogden, UT: U. S. Department of Agriculture, Forest Service, Intermountain Forest pp. 99-132.

Center for Chemical Process Safety, Appendix a. View Factors for Selected Configurations. 2010. In Guidelines for Vapor Cloud Explosion, Pressure Vessel Burst, BLEVE, and Flash Fire Hazards, 397-407.
Cleary, Peter. Humidity in Attics—Sources and Control Methods. United States: N. p., 1984. Web., pp. 1-17.
Cobian-Iniguez J, Aminfar A, Weise DR and Princevac M (2019) On the Use of Semi-empirical Flame Models for Spreading Chaparral Crown Fire. Front. Mech. Eng. 5:50. doi: 10.3389/fmech.2019.00050 pp. 1-13.
Cohen "Structure Ignition Assessment Model {Saim}" USDA Forest Service Gen. Tech. Rep. PSW-GTR-158. 1995. pp. 85-92.
Cohen, Canada J. For. Res. vol. 34, 2004Relating Flame Radiation to Home Ignition Using Modeling and Experimental Crown Fires, pp. 1617-1626.
Cohen, Jack D. 2000. Preventing disaster: Home ignitability in the wildland-urban interface. Journal of Forestry 98(3): 15-21. pp. 1-7.
Cruz, M. and Alexander, M. (2010). Assessing crown fire potential in coniferous forests of western North America: a critique of current approaches and recent simulation studies. International Journal of Wildland Fire, 19(4) 377-398.
Cruz, M.G., Alexander, M.E. The 10% wind speed rule of thumb for estimating a wildfire's forward rate of spread in forests and shrublands. Annals of Forest Science 76, 44 (2019). https://doi.org/10.1007/s13595-019-0829-8 pp. 1-11.
Cunningham, Kyle. 2003. Landowner's Guide to Determining Weight of Standing Hardwood Trees. Southern Journal of Applied Forestry Nov. 27: 269-78.
Dietenberger, Mark A.; Boardman, Charles R. 2016. EcoSmart fire as structure ignition model in wildland urban interface: predictions and validations. Fire Technology. DOI: 10.1007/s10694-016-0632-0.
Hakes, Raquel & Caton, Sara & Gorham, Daniel & Gollner, Michael. (2016). A Review of Pathways for Building FireSpread in the Wildland Urban Interface Part II: Response of Components and Systems and Mitigation Strategies in theUnited States. Fire Technology. 53. 10.1007/s10694-016-0601-7_ pp. 1-18.
Hakes, Raquel & Caton, Sara & Gorham, Daniel & Gollner, Michael. (2016). A Review of Pathways for Building FireSpread in the Wildland Urban Interface Part II: Response of Components and Systems and Mitigation Strategies in theUnited States. Fire Technology. 53. 10.1007/s10694-016-0601-7_pp. 19-30.
Hakes, Raquel & Caton, Sara & Gorham, Daniel & Gollner, Michael. (2016). A Review of Pathways for Building FireSpread in the Wildland Urban Interface Part II: Response of Components and Systems and Mitigation Strategies in theUnited States. Fire Technology. 53. 10.1007/s10694-016-0601-7_pp. 30-37.
Harris, Hillary, "Analysis and Parameterization of the Flight of Ember Generationexperiments" (2011). All Theses. 1251. pp. 1-38.
Harris, Hillary, "Analysis and Parameterization of the Flight of Ember Generationexperiments" (2011). All Theses. 1251. pp. 39-80.
Harris, Hillary, "Analysis and Parameterization of the Flight of Ember Generationexperiments" (2011). All Theses. 1251. pp. 81-120.
Jenkins, Jennifer C.; Chojnacky, David C.; Heath, Linda S.; Birdsey, Richard A. 2004. Comprehensive database ofdiameter-based biomass regressions for North American tree species. Gen. Tech. Rep. NE-319. Newtown Square, PA: U.S. Department of Agriculture, Forest Service, Northeastern Research Station. 45 p., pp. 1-19.
Jenkins, Jennifer C.; Chojnacky, David C.; Heath, Linda S.; Birdsey, Richard A. 2004. Comprehensive database ofdiameter-based biomass regressions for North American tree species. Gen. Tech. Rep. NE-319. Newtown Square, PA: U.S. Department of Agriculture, Forest Service, Northeastern Research Station. 45 p., pp. 20-48.
Manzello, S.L., Maranghides, A., Shields, J.R., Mell, W.E., Hayashi, Y. and Nii, D. (2009), Mass and size distribution generated fro burning Korean pine, pp. 1-11.
Miguel G. Cruz, Martin E. Alexander, Ronald H. Wakimoto, Modeling the Likelihood of Crown Fire Occurrence in Conifer Forest Stands, Forest Science, vol. 50, Issue 5, Oct. 2004, pp. 640-658.
Nazare, Shonali, Isaac T. Leventon, and Rick Davis. 2021. "Ignitibility of StructuralWood Products Exposed toEmbers During Wildland Fires: A Review of Literature." Gaithersburg, MD: National Institute of Standards; Technology_pp. 1-18.

(56) References Cited

OTHER PUBLICATIONS

Nazare, Shonali, Isaac T. Leventon, and Rick Davis. 2021. "Ignitibility of StructuralWood Products Exposed toEmbers During Wildland Fires: A Review of Literature." Gaithersburg, MD: National Institute of Standards; Technology_pp. 19-34.

Nazare, Shonali, Isaac T. Leventon, and Rick Davis. 2021. "Ignitibility of StructuralWood Products Exposed toEmbers During Wildland Fires: A Review of Literature." Gaithersburg, MD: National Institute of Standards; Technology_pp. 35-45.

Nazare, Shonali, Isaac T. Leventon, and Rick Davis. 2021. "Ignitibility of StructuralWood Products Exposed toEmbers During Wildland Fires: A Review of Literature." Gaithersburg, MD: National Institute of Standards; Technology_pp. 46-55.

Nelson, Ralph M., Jr. 1980. Flame characteristics for fires in southern fuels. Research Paper SE-205. Asheville, NC: USDA—Forest Service, Southeastern Forest Experiment Station. 14 p.

NWCG Publications: Fire Behavior Field Reference Guide, PMS 437, Fuel Moisture References, Dead Fuel Moisture Content_pp. 1-600.

NWCG Publications: Fire Behavior Field Reference Guide, PMS 437, Fuel Moisture References, Dead Fuel Moisture Content_pp. 601-1070.

P.H. Thomas, The Size of Flames From Natural Fires, p. 844-859.

Phillips, M, Robinson, C, Gupta, N, and Werth, D. Wildfire Ignition Resistance Estimator Wizard Software Development Report. United States: N. p., 2012. Web. doi:10.2172/1053027. pp. 1-70.

Prevatt, David O., and David B. Roueche. 2019. "Evaluation of Wind Resistance of Vinyl Siding and Soffit Systems, and Performance During the 2017 Hurricane Irma." Tallahassee, FL: Florida Department of Business; Professional Regulation_pp. 1-74.

Prevatt, David O., and David B. Roueche. 2019. "Evaluation of Wind Resistance of Vinyl Siding and Soffit Systems, and Performance During the 2017 Hurricane Irma." Tallahassee, FL: Florida Department of Business; Professional Regulation_pp. 75-89.

Ralph M. Nelson, Jr., International Journal of Wildland Fire, 2002, 11, An effective wind speed for models of fire spread, pp. 153-161.

Raquel S.P. Hakes, Hamed Salehizadeh, Matthew J. Weston-Dawkes, Michael J. Gollner, Thermal characterization of firebrand piles, Fire Safety Journal, vol. 104, 2019, pp. 34-42, ISSN 0379-7112.

Rothermel, Richard C. 1991. Predicting behavior and size of crown fires in the northern Rocky Mountains. Res. Pap. INT-RP-438. Ogden, UT: U.S. Department of Agriculture, Forest Service, Intermountain Research Station. 46 p.

Schulz Baker Worcester Polytechnic Institute Jun. 2011 Burning Characteristics of Individual Douglas-Fir Trees in the Wildland/Urban Interface pp. 1-118.

Syphard, International Journal of Disaster Risk Reduction 21, The importance of building construction materials relative to other factors affecting structure survival during wildfire (2017) 140-147.

Weise, David R. (2022). Wind and slope effects on laboratory-scale fire behavior. Forest Service Research Data Archive. https://doi.org/10.2737/RDS-2017-0018.

WERTH 2012 Wildfire Ignition Resistance Estimator {WildFIRE} Wizard Software Development Report pp. 1-21.

Examination Report No. 1 in Australian App. No. 2022/205,161 dated Jan. 10, 2025, 5 pages.

Office Action in Canadian App. No. 3,167,602 dated May 14, 2025, 3 pages.

Boomhower and Fowlie, et al. "How Are Insurance Markets Adapting to Climate Change? Risk Selection and Regulation in the Market for Homeowners Insurance." NBER Working Paper No. 32625 (2024), 80 pages.

Cisneros, et al. "Spatial wildfire risk modeling using mixtures of tree-based multivariate Pareto distributions." arXiv preprint arXiv:2308.03870 (2023), 32 pages.

Kearns, et al. "The construction of probabilistic wildfire risk estimates for individual real estate parcels for the contiguous United States." Fire 5.4 (2022): 117, 44 pages.

Platt, Wildfire hazard in the home ignition zone: An object-oriented analysis integrating LiDAR and VHR satellite imagery, Applied Geography vol. 51, Jul. 2014, pp. 108-117.

Rodriguez-Baca, et al. "Rating a wildfire mitigation strategy with an insurance premium: a boreal forest case study." Forests 7.5 (2016): 107, 15 pages.

Schwartz, "Geospatial-Based Property Risk Ratings" Insurance thought Leadership, 2024, accessed on Nov. 25, 2025 athttps://www.insurancethoughtleadership.com/personal-lines/geospatial-based-property-risk-ratings, 6 pages.

Verisk Analytics, Inc., Powering Better Insurance Decisions, webpages 2025, accessed on Nov. 25, 2025, at https://www.verisk.com/, 7 pages.

Wildfire risk: a complex problem with a multifaceted solution PWC consulting alliances 2025, 26 pages, accessed on Nov. 25, 2025 at https://www.pwc.com/us/en/industries/financial-services/library/pwc-wildfire-risk-integrated-solution.pdf, 26 pages.

ZestyAI webpages accessed on Nov. 25, 2025, at https://zesty.ai/products/wildfire, 10 pages.

WERTH 2012 Wildfire Ignition Resistance Estimator {WildFIRE} Wizard Software Development Report pp. 22-52.

WERTH 2012 Wildfire Ignition Resistance Estimator {WildFIRE} Wizard Software Development Report pp. 53-70.

Zhou et al, JFSP Project ID 15 1 04 4 pp. 42-67.

Zhou et al, JFSP Project ID 15-1-04-4 pp. 1-20.

Zhou et al, JFSP Project ID 15-1-04-4 pp. 21-41.

* cited by examiner

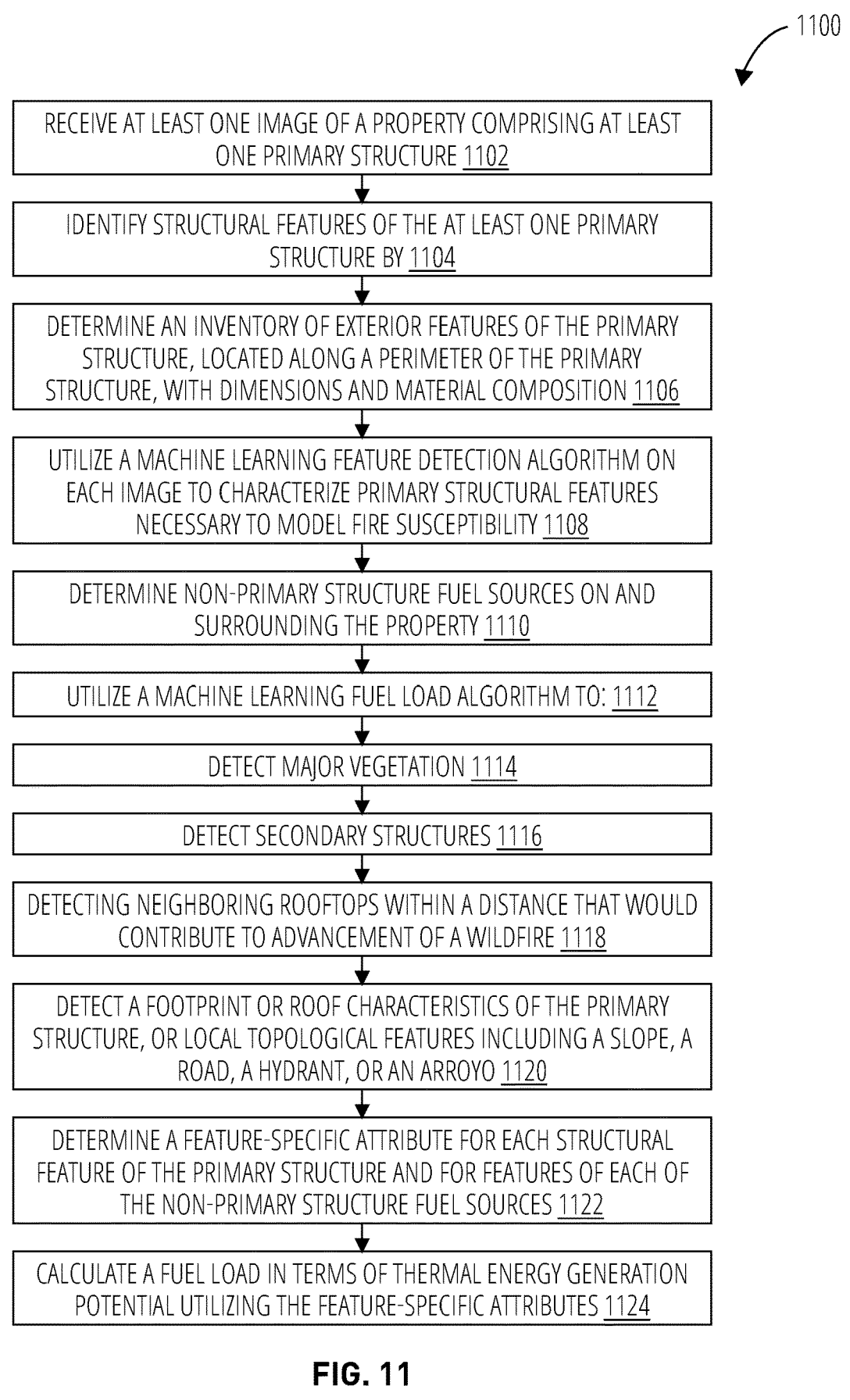

1100

RECEIVE AT LEAST ONE IMAGE OF A PROPERTY COMPRISING AT LEAST ONE PRIMARY STRUCTURE 1102

↓

IDENTIFY STRUCTURAL FEATURES OF THE AT LEAST ONE PRIMARY STRUCTURE BY 1104

↓

DETERMINE AN INVENTORY OF EXTERIOR FEATURES OF THE PRIMARY STRUCTURE, LOCATED ALONG A PERIMETER OF THE PRIMARY STRUCTURE, WITH DIMENSIONS AND MATERIAL COMPOSITION 1106

↓

UTILIZE A MACHINE LEARNING FEATURE DETECTION ALGORITHM ON EACH IMAGE TO CHARACTERIZE PRIMARY STRUCTURAL FEATURES NECESSARY TO MODEL FIRE SUSCEPTIBILITY 1108

↓

DETERMINE NON-PRIMARY STRUCTURE FUEL SOURCES ON AND SURROUNDING THE PROPERTY 1110

↓

UTILIZE A MACHINE LEARNING FUEL LOAD ALGORITHM TO: 1112

↓

DETECT MAJOR VEGETATION 1114

↓

DETECT SECONDARY STRUCTURES 1116

↓

DETECTING NEIGHBORING ROOFTOPS WITHIN A DISTANCE THAT WOULD CONTRIBUTE TO ADVANCEMENT OF A WILDFIRE 1118

↓

DETECT A FOOTPRINT OR ROOF CHARACTERISTICS OF THE PRIMARY STRUCTURE, OR LOCAL TOPOLOGICAL FEATURES INCLUDING A SLOPE, A ROAD, A HYDRANT, OR AN ARROYO 1120

↓

DETERMINE A FEATURE-SPECIFIC ATTRIBUTE FOR EACH STRUCTURAL FEATURE OF THE PRIMARY STRUCTURE AND FOR FEATURES OF EACH OF THE NON-PRIMARY STRUCTURE FUEL SOURCES 1122

↓

CALCULATE A FUEL LOAD IN TERMS OF THERMAL ENERGY GENERATION POTENTIAL UTILIZING THE FEATURE-SPECIFIC ATTRIBUTES 1124

FIG. 11

| | Material | Application | Thickness (mm) | Emissivity | Conductivity (W/m/K) | Density (kg/m³) |
|---|---|---|---|---|---|---|
| 0 | Cedar Shake | Roof | 25.00 | 0.85 | 0.156 | 395 |
| 1 | Asphalt Shingle (Class A) | Roof | 6.00 | 0.91 | 0.235 | 1560 |
| 2 | Tile | Roof | 9.00 | 0.90 | 1.400 | 1900 |
| 3 | Vinyl Siding + XPS Foam | Exterior Surface | 0.92 | 0.89 | 0.145 | 1889 |
| 4 | Clear Grade Redwood T&G | Exterior Surface | 19.20 | 0.82 | 0.171 | 410 |
| 5 | #2 Ponderosa Pine T&G | Exterior Surface | 18.50 | 0.83 | 0.169 | 420 |
| 6 | Painted Plywood | Exterior Surface | 12.80 | 0.83 | 0.211 | 500 |
| 7 | Single Pane Float Glass | Exterior Surface | 2.38 | 0.92 | 1.100 | 1900 |

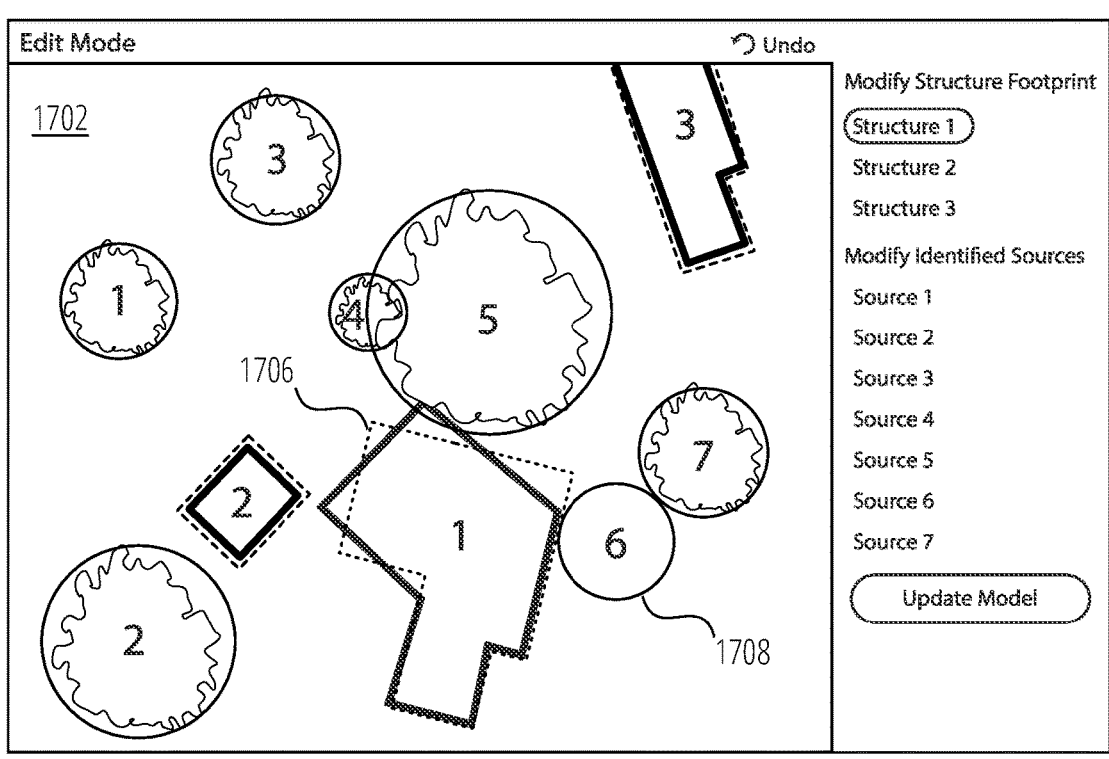
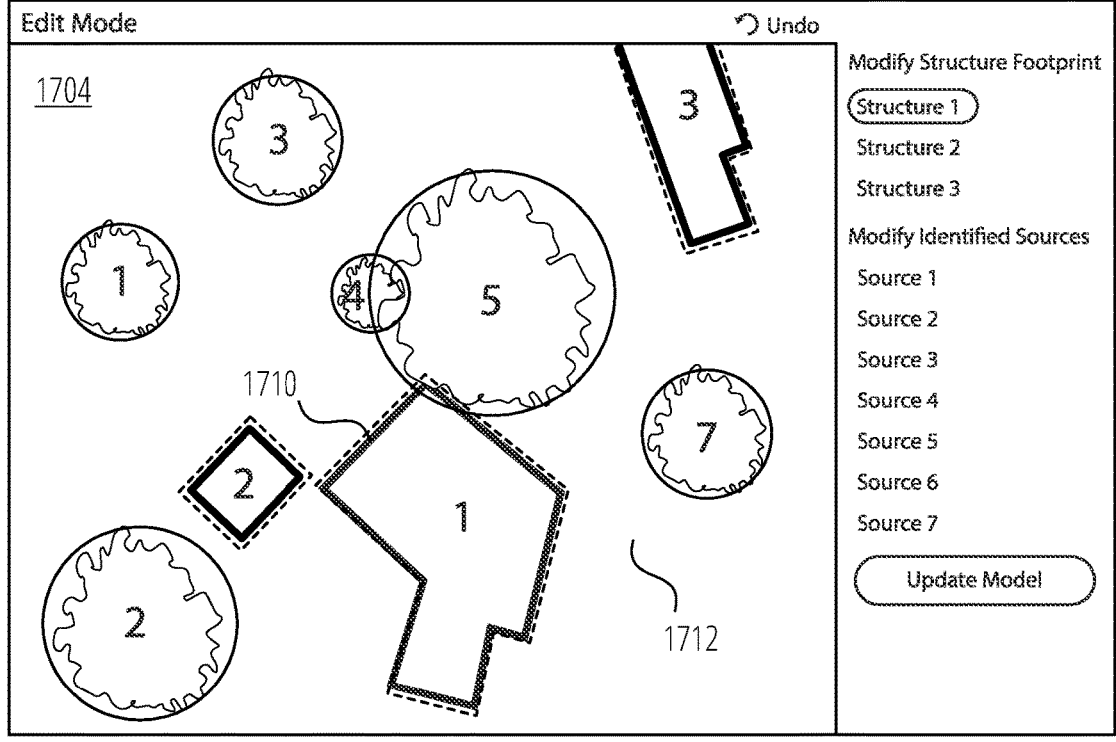
FIG. 17

1900a

1900b

Total heat release approximated by triangle and rectangle

Seconds

Heat delta (j) per 2' wall segment (from all visible trees) for vinyl siding + XPS foam

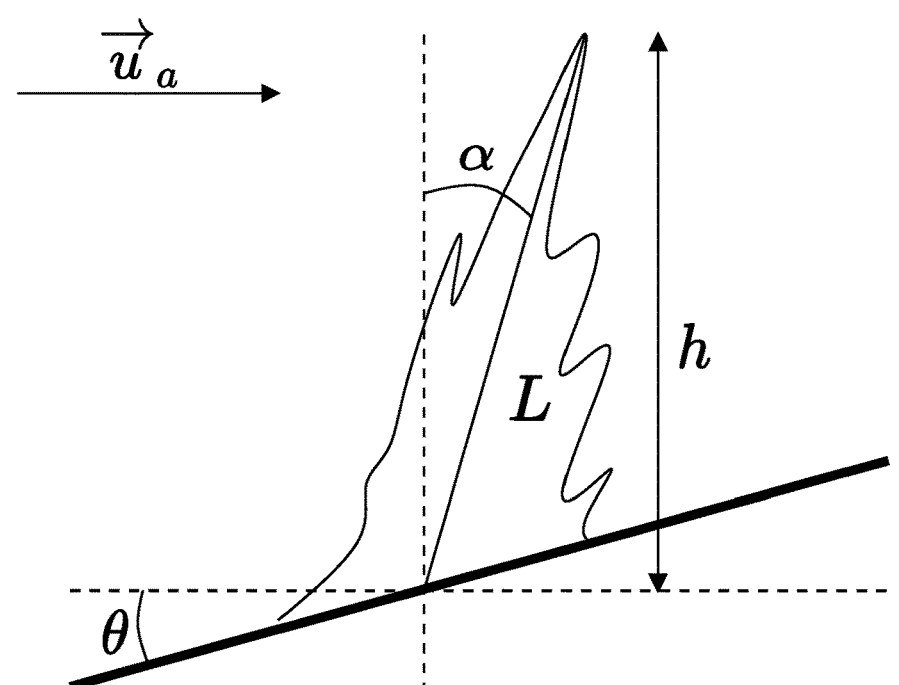
FIG. 20A

2000b

2002a

2004

2006

104

102

2000c

2002b

2004

2006

104

102

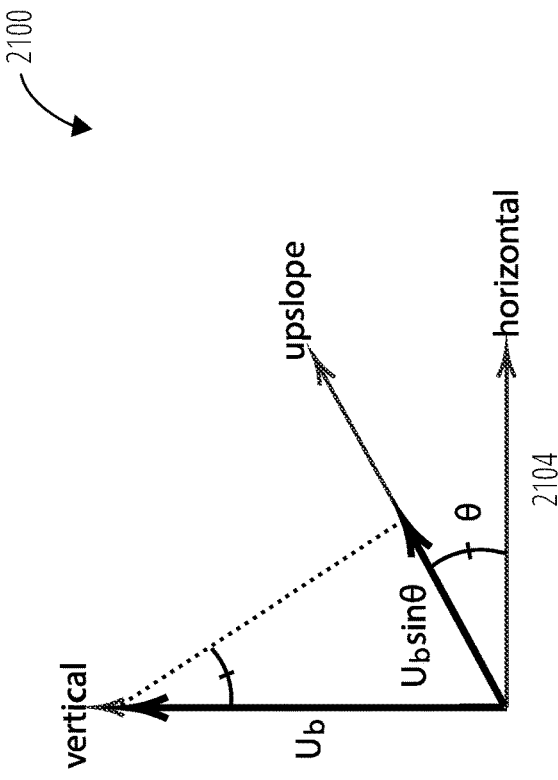
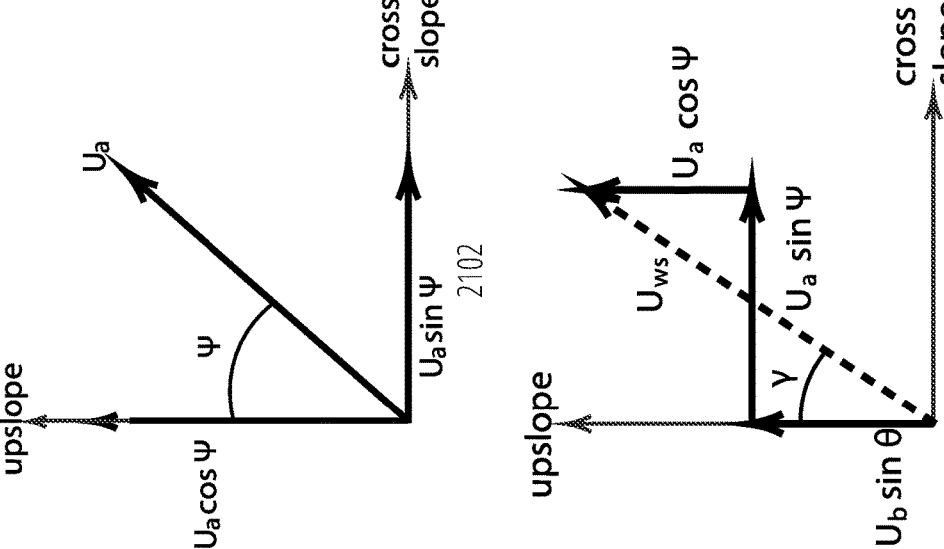
FIG. 21

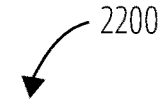
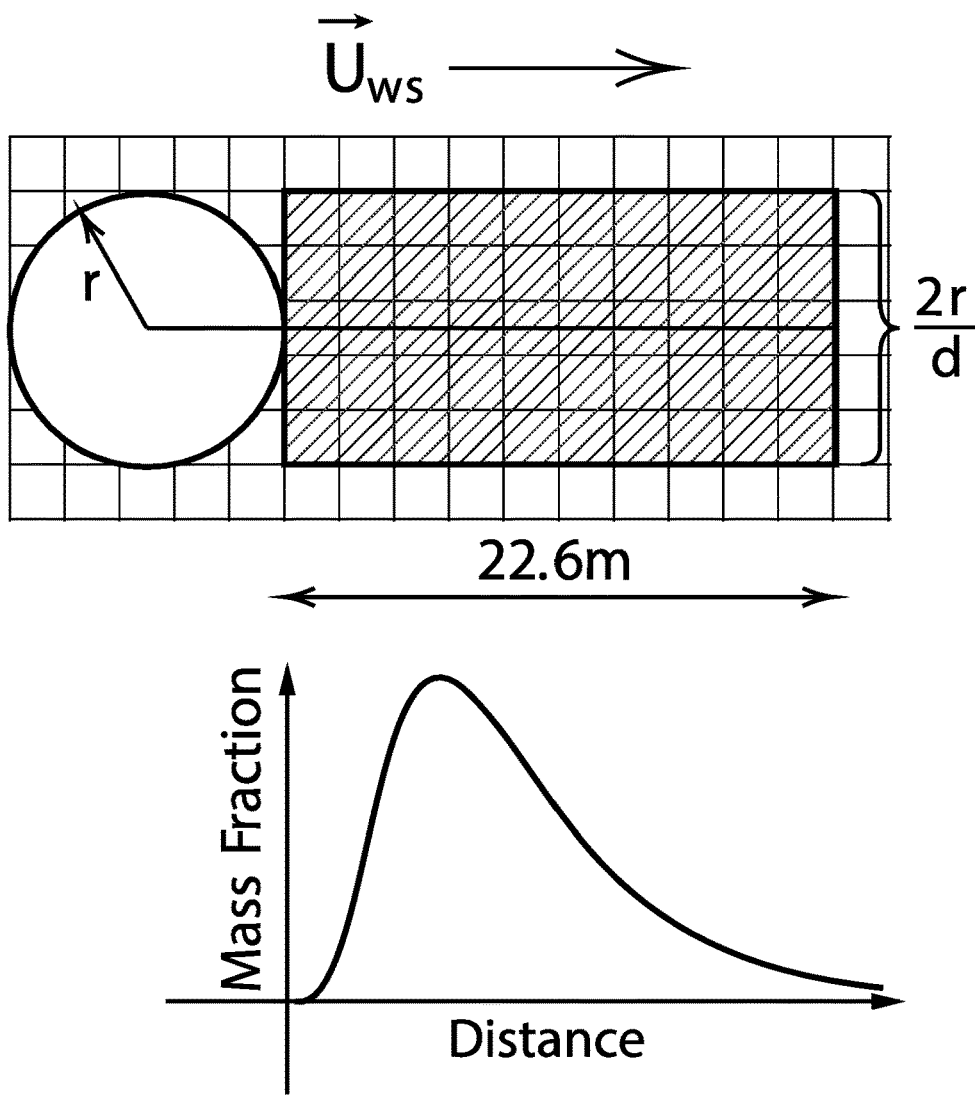
FIG. 22

Ember penetration surplus (count) per 2'
wall segment (from trees within 22.6m)

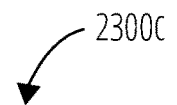
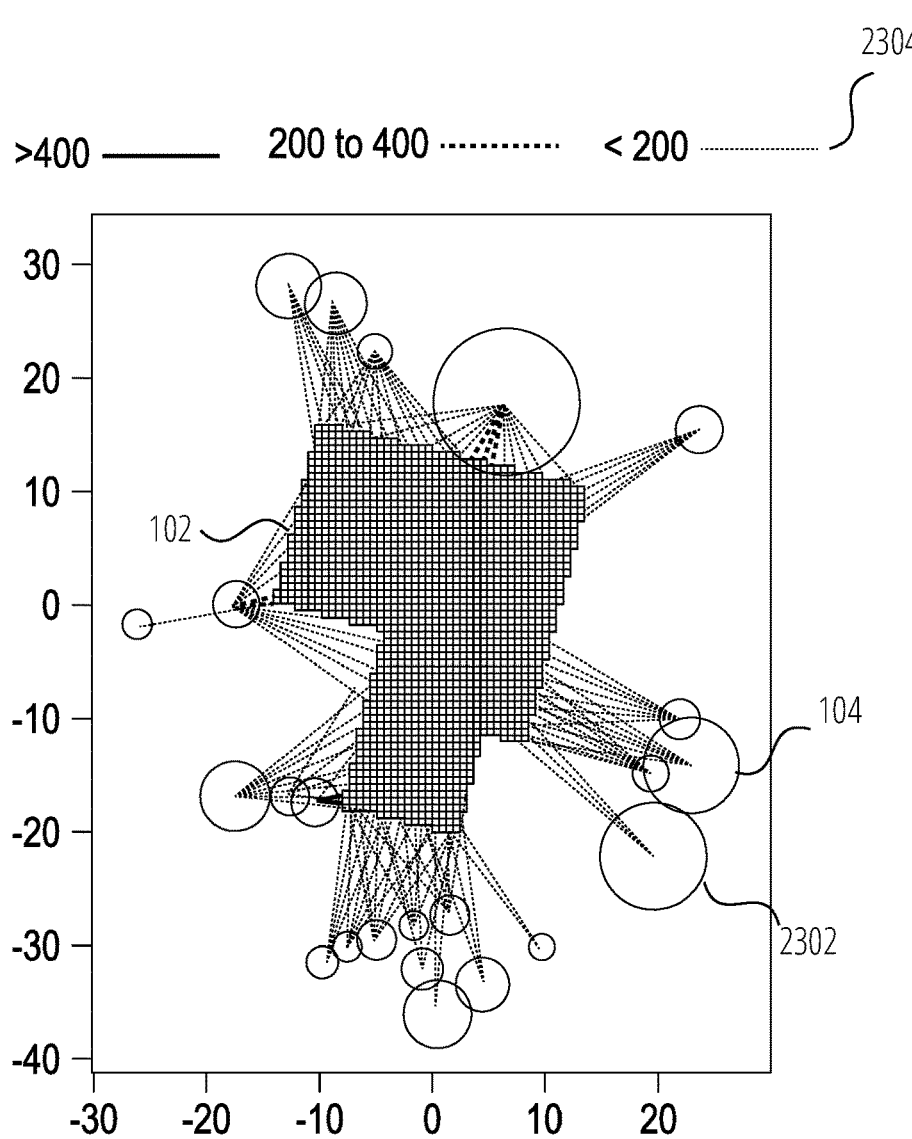
FIG. 23C

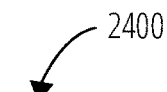
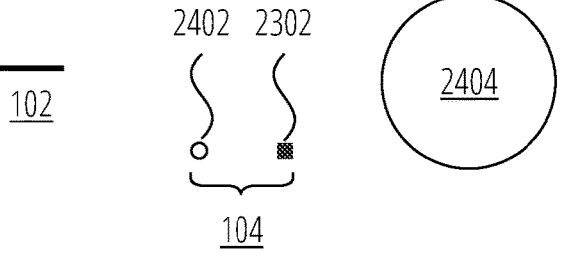
FIG. 24

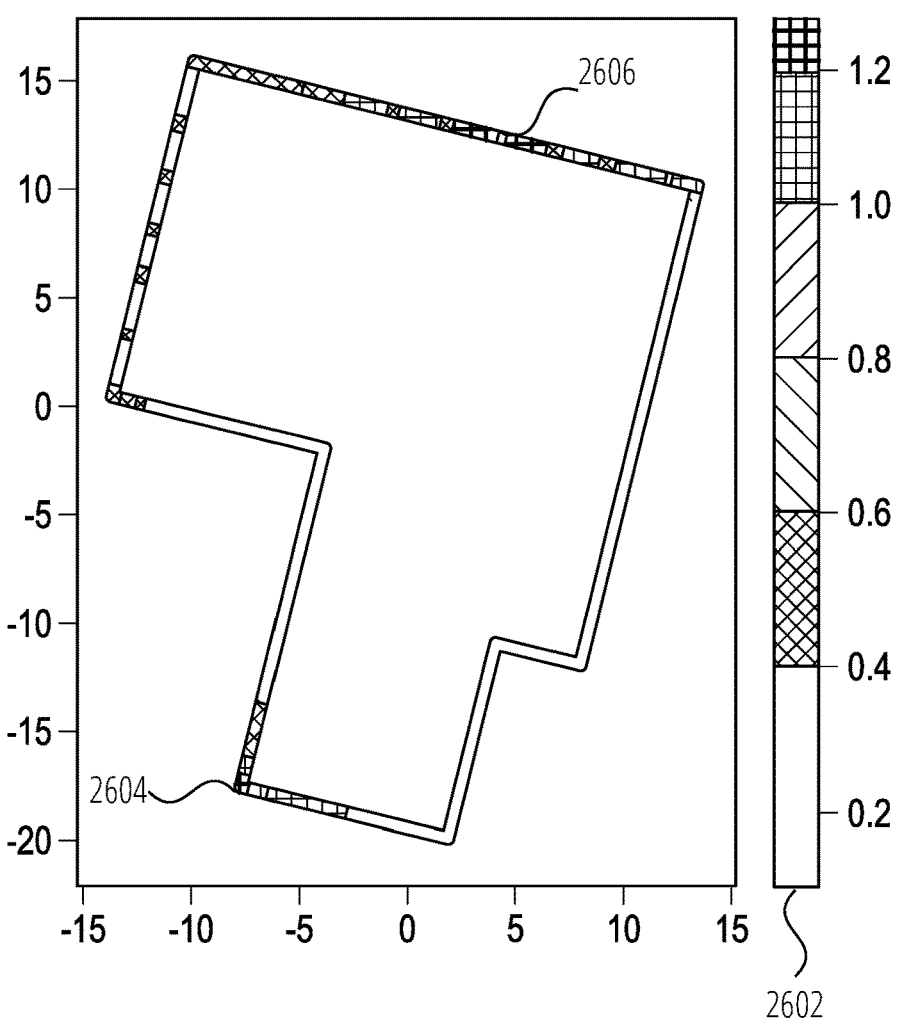
Sum of Heat (j) per 2' wall
segment (from all visible trees)
FIG. 26

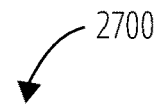
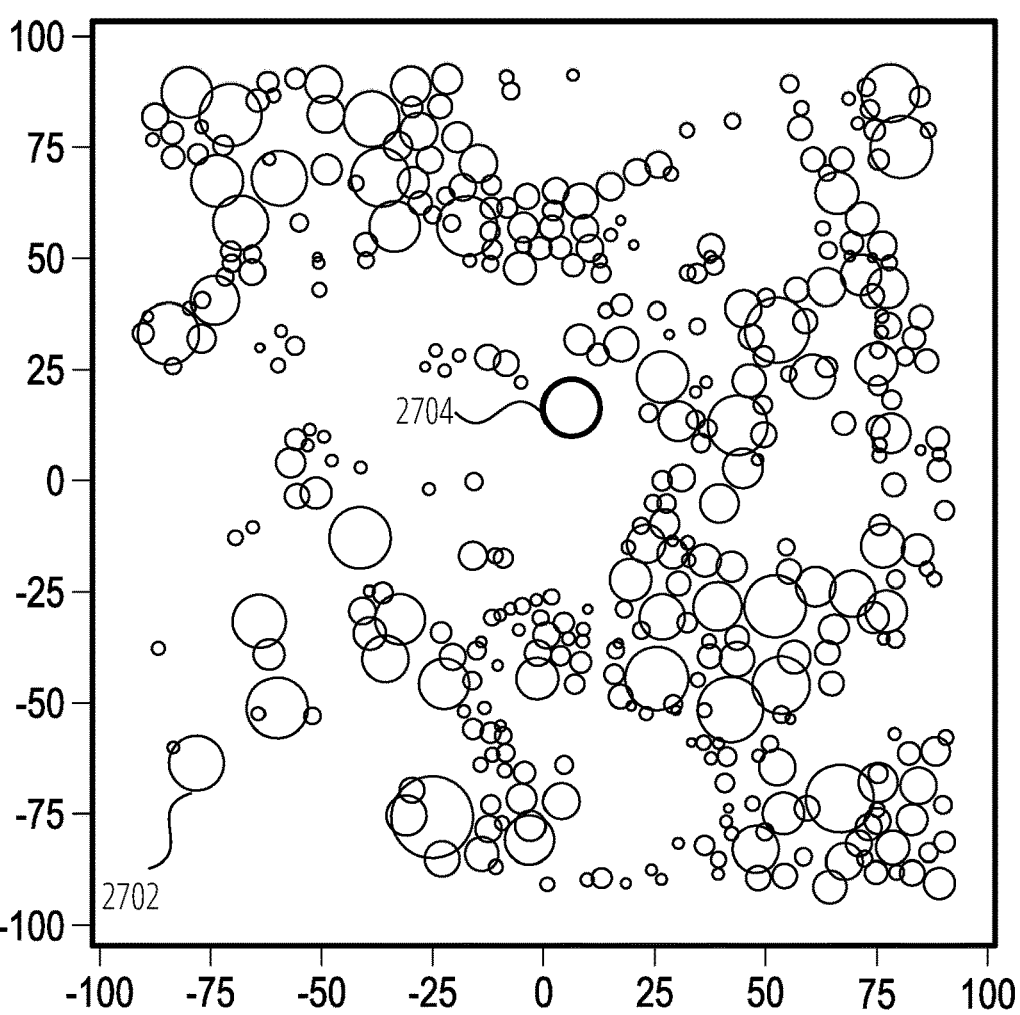
Sum of Heat (j) output per tree
(to all visible wall segments)
FIG. 27

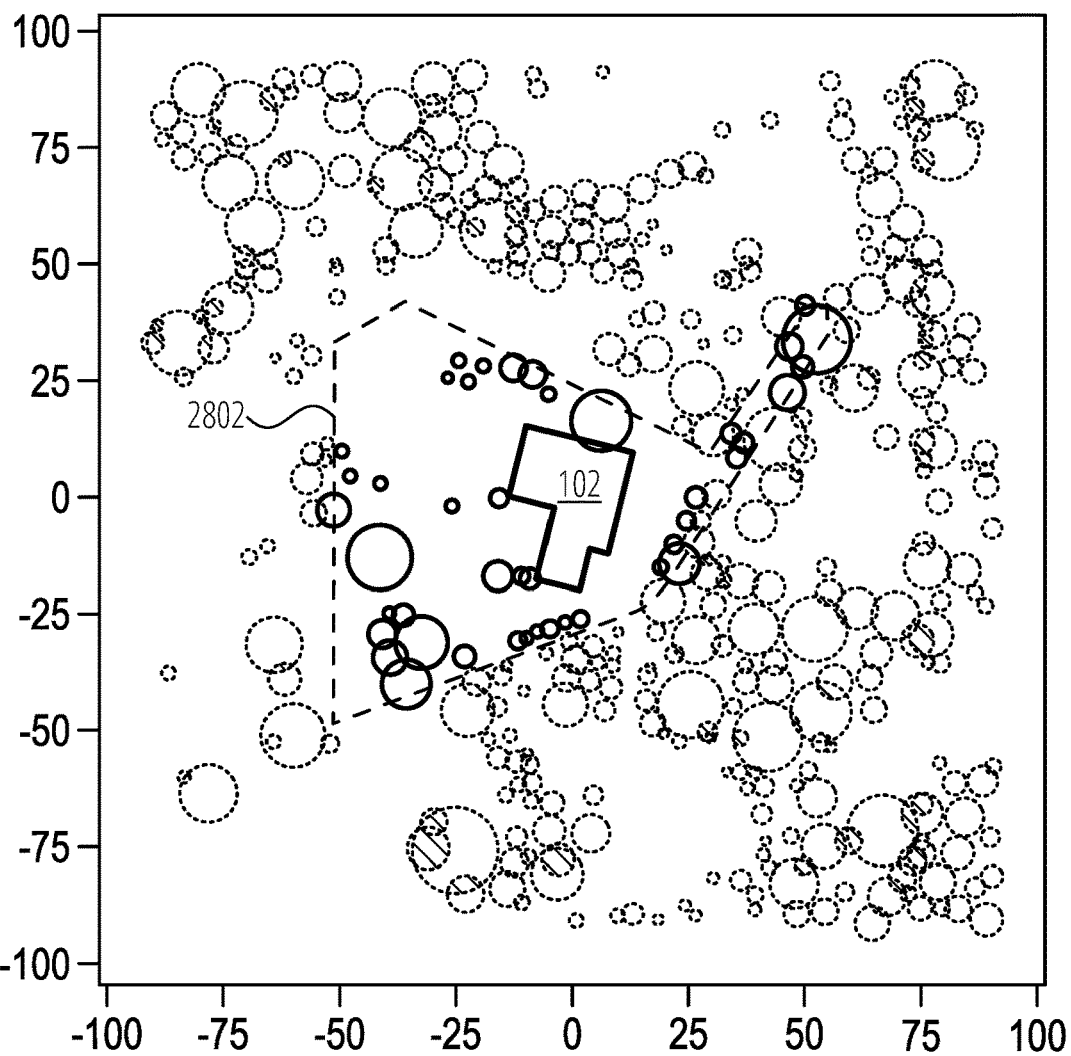
Structure within parcel, with trees
FIG. 28

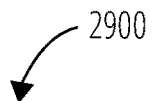
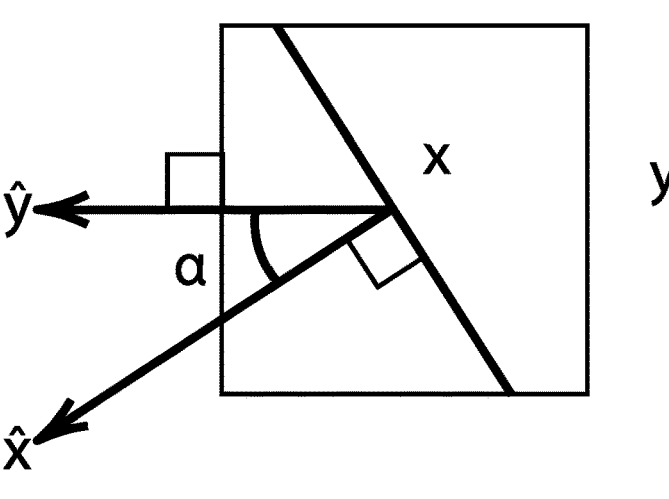
FIG. 29
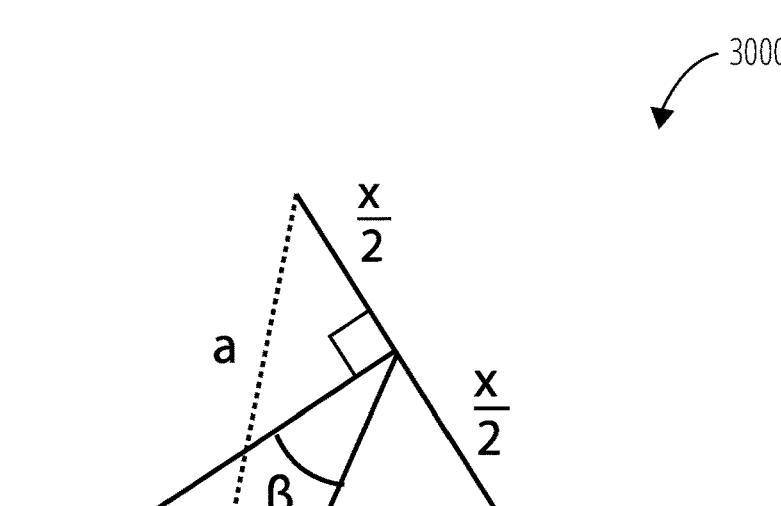
FIG. 30

3300
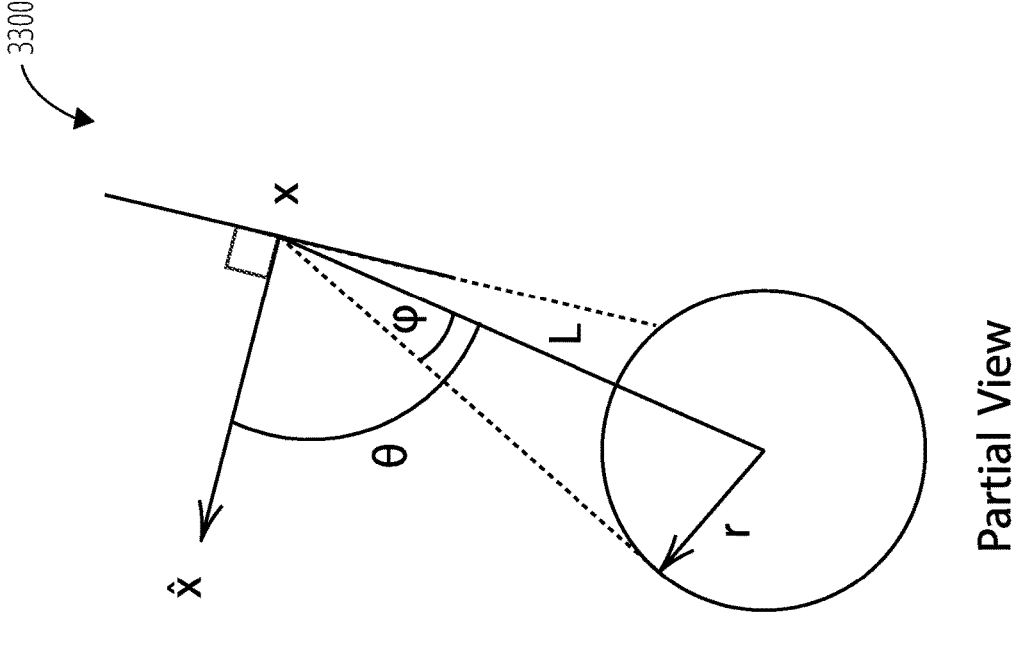
Partial View
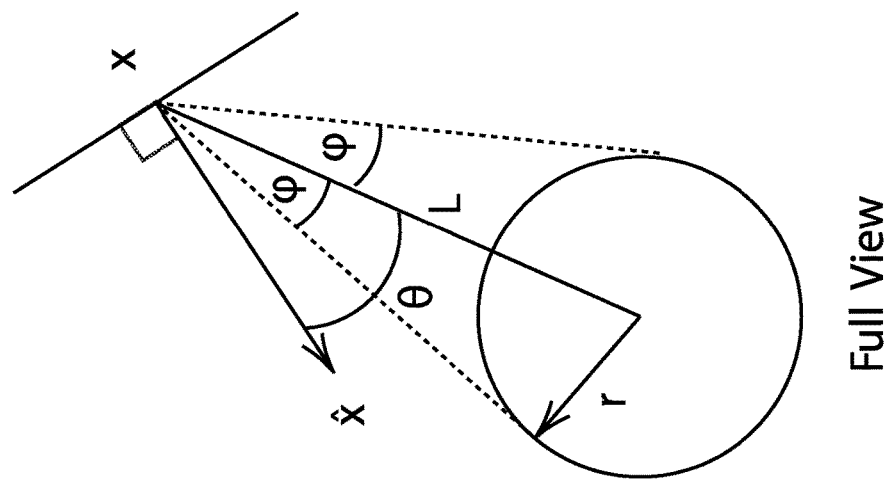
Full View
FIG. 33

SYSTEM AND METHOD FOR WILDFIRE RISK ASSESSMENT, MITIGATION AND MONITORING FOR BUILDING STRUCTURES

CROSS-REFERENCE TO RELATED APPLICATIONS

This application claims the benefit of U.S. provisional patent application Ser. No. 63/221,242, filed on Jul. 13, 2021, the contents of which are incorporated herein by reference in their entirety.

TECHNICAL FIELD

This disclosure relates generally to systems and methods for assessing, mitigating and monitoring wildfire damage risk for building structures, and in particular to quantitative systems and methods to calculate risk and calculate the impacts of mitigation strategies for a given residential housing unit or commercial building.

BACKGROUND

Wildfires are an increasingly important factor for homeowners to consider in various parts of the world, including in North America. In high-risk areas wildfires present a real danger of total loss of a building structure, such as a residential home.

Despite the increasing chance of loss, and the ongoing chance of total loss, approaches to assessing the likelihood of that loss, figuring out how to mitigate that chance, and monitoring the risk over time are not particularly useful due to their lack of precision, lack of actionable data, and unrealistic approaches to implementing and scaling to match the size of the problem. For example, some approaches are simply generic guidelines (like directing the general removal of flammable material without further reasoning or direction) or require an expert on-site to do an evaluation of how to protect a property (which is then highly dependent on the expert and lacks any quantitative analysis of ignition risk to a property based on surrounding environment, fuels, and ignition characteristics of a structure).

There is accordingly a need in the art for an improved system and method for wildfire risk assessment, mitigation, and monitoring.

BRIEF SUMMARY

In one aspect, a method includes receiving at least one image of a property, where the property includes at least one primary structure. The method also includes identifying structural features of the at least one primary structure by determining an inventory of exterior features of each at least one primary structure on the property, where the features are located along a perimeter of the at least one primary structure and include dimensions and material composition. The method also identifies structural features by utilizing a machine learning feature detection algorithm on each of the at least one image to characterize primary structural features used to model fire susceptibility. The method further includes determining at least one non-primary structure fuel source on the property and surrounding the property by utilizing a machine learning fuel load algorithm for detecting major vegetation including at least one of a tree and a shrub, detecting secondary structures including at least one of a shed and a fence, detecting neighboring rooftops within a distance of the primary structure that would contribute to advancement of a wildfire, and detecting at least one of a footprint of the primary structure, roof characteristics of the primary structure, and local topological features, where the local topological features include at least one of a slope, a road, a hydrant, and an arroyo. The method also includes determining non-primary structure fuel sources on the property and surrounding the property by determining a feature-specific attribute for each of the structural features of the at least one primary structure and for features of each of the non-primary structure fuel sources. The method finally includes determining non-primary structure fuel sources on the property and surrounding the property by calculating a fuel load in terms of thermal energy generation potential utilizing the feature-specific attributes.

In another aspect, a computing apparatus is disclosed comprising a processor and a memory. The memory stores instructions that, when executed by the processor, configure the apparatus to perform the method described above.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 11 illustrates a routine 1100 in accordance with one embodiment.

FIG. 17 illustrates a model editing interface 1700 in accordance with one embodiment.

FIG. 20A illustrates a flame angle as a function of slope and effective wind speed 2000a in accordance with one embodiment.

FIG. 21 illustrates a vector composition of wind-slope interaction 2100 in accordance with one embodiment.

FIG. 22 illustrates an ember mass projection downwind 2200 in accordance with one embodiment.

FIG. 23C illustrates an ember population soffit vectors 2300c in accordance with one embodiment.

FIG. 24 illustrates fuel sources within and outside of ember throw distance 2400 in accordance with one embodiment.

FIG. 26 illustrates a sum of heat per wall segment 2600 in accordance with one embodiment.

FIG. 27 illustrates a sum of heat per fuel source 2700 in accordance with one embodiment.

FIG. 28 illustrates a structure and fuel sources within a parcel 2800 in accordance with one embodiment.

FIG. 29 illustrates a wall normal for grid tile 2900 in accordance with one embodiment.

FIG. 30 illustrates a point source view factor 3000 in accordance with one embodiment.

FIG. 33 illustrates a spherical source view factor 3300 in accordance with one embodiment.

DETAILED DESCRIPTION

Figure 1:
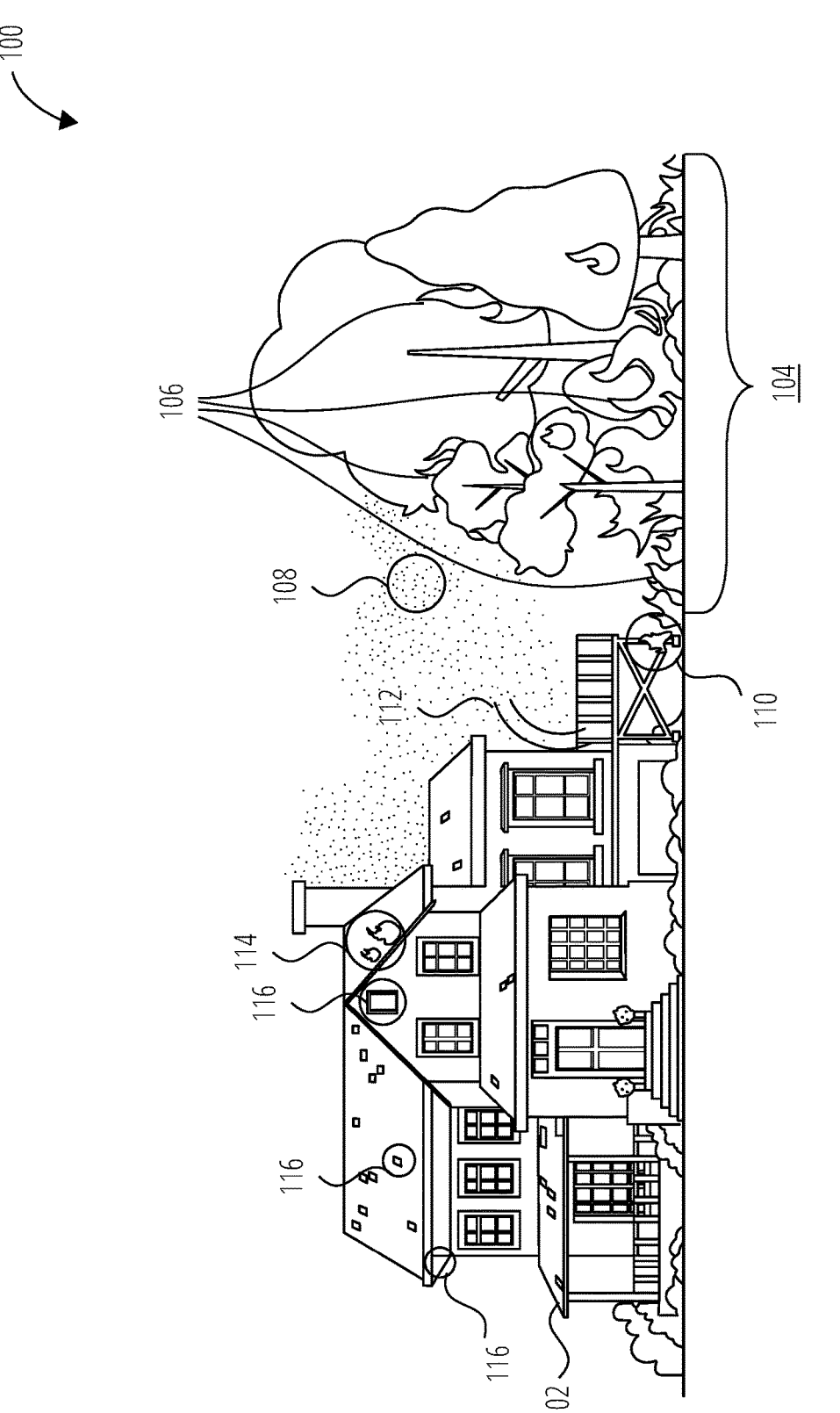
FIG. 1 illustrates a structure with fuel sources 100 in accordance with one embodiment.

Herein, numerous specific details are set forth in order to provide a thorough understanding of the exemplary embodiments described. However, it may be understood by those of ordinary skill in the art that the embodiments described herein may be practiced without these specific details. In other instances, well-known methods, procedures and components have not been described in detail so as not to obscure the embodiments generally described herein. Furthermore, this description is not to be considered as limiting the scope of the embodiments described herein in any way, but rather as merely describing the implementation of various embodiments as presented here for illustration.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. In certain embodiments, the computer may be a digital or any analogue computer.

Program code and/or machine learning (or other artificial intelligence) may be applied to input data to perform the functions described herein and to generate output information. The output information may be applied to one or more output devices. Note that machine learning as described herein may be implemented as a single machine learning instance, or as multiple instances of machine learning, including coverage refined for different scenarios, embodiment across different devices, etc. Reference herein to a singular machine learning instance is for ease and clarity of disclosure, and not intended to limit the disclosed solution in any way.

Each program may be implemented in a high-level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., read only memory (ROM), magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, and the like. Non-transitory computer-readable media comprise all computer-readable media, with the exception being a transitory, propagating signal. The term non-transitory is not intended to exclude computer readable media such as a volatile memory or random access memory (RAM), where the data stored thereon is temporarily stored. The computer useable instructions may also be in various forms, including compiled and non-compiled code.

At a high-level, and as described further herein, methods for wildfire failure assessment may involve:
 a. extracting fuel source 104 and target structure 102 features (as introduce in FIG. 1),
 b. computing surface normals and placing fuel source and structure features onto a grid (rasterize geographic information system (GIS) polygons) such as grid 1208 (further described with respect to FIG. 12), with defined projection, where each grid cell (tile) overlapping a structural feature (part of structure 102) may be a structural segment, c. computing fuel-source/structure-segment distance vectors (using vector computation from points snapped to grid), d. filtering fuel/structure distance vectors to exclude vectors for wall segments shaded by other wall segments, and then, by threat vector (convection, radiant, ember accumulation, ember penetration):

i. computing pair-wise threat loads at each segment from distance vectors, ii. summing threat loads over segments for total load at each structural segment, iii. computing failure surplus (or deficit) for each material at each segment, where a surplus indicates ignition, and iv. computing failure contributions for each fuel source by summing failure surpluses over fuel sources, e. optionally considering and implementing mitigation techniques to avoid failures, and f. optionally monitoring the structure for changes to the structure (either the mitigated or unmitigated states).

FIG. 1 illustrates a structure with fuel sources 100 in accordance with one embodiment. A structure 102 with fuel sources 104 is shown, upon which embodiments of the disclosed systems and methods may operate. Fuel sources 104 may be heat vectors affecting structure 102 in four different ways—direct flame exposure 110 (convection), radiant heat 112, ember accumulation 114, and ember penetration 116. Any of these risk or heat vectors may cause a part of structure 102 to catch on fire, as described herein.

Structure 102 may be a house, cottage, or the like, or other type of structure, including commercial structures. Structure 102 may simply be referred to herein as a building or structure. The systems and methods disclosed herein may be applied to determine, mitigate and monitor the wildfire risk for non-structures—such as vehicles or natural objects such as forests and plants. However the present focus remains on structures.

Fuel sources 104 surrounding a structure 102 may generate flames 106 that may spread upon contact with flammable materials, and may further generate ember projectiles 108, which may be spread from the fuel sources 104 on air currents. Movement of flames 106 may be influenced by air currents and elevation, as well as the presence or absence of flammable fuel.

Flames 106 may cause direct flame exposure 110 and thus ignition of materials comprising the structure 102, as well as generate radiant heat 112. Radiant heat 112 may cause combustion of materials by raising the material temperature to above the material's ignition temperature. Ember projectiles 108 may fall or be blown onto and gather upon surfaces of a structure 102, resulting in ember accumulation 114 which may ignite those surfaces. Openings in a structure 102, such as windows, gaps in roofing materials, and soffits, may allow ember penetration 116, and these embers may ignite materials interior to the structure 102.

System

Figure 2:
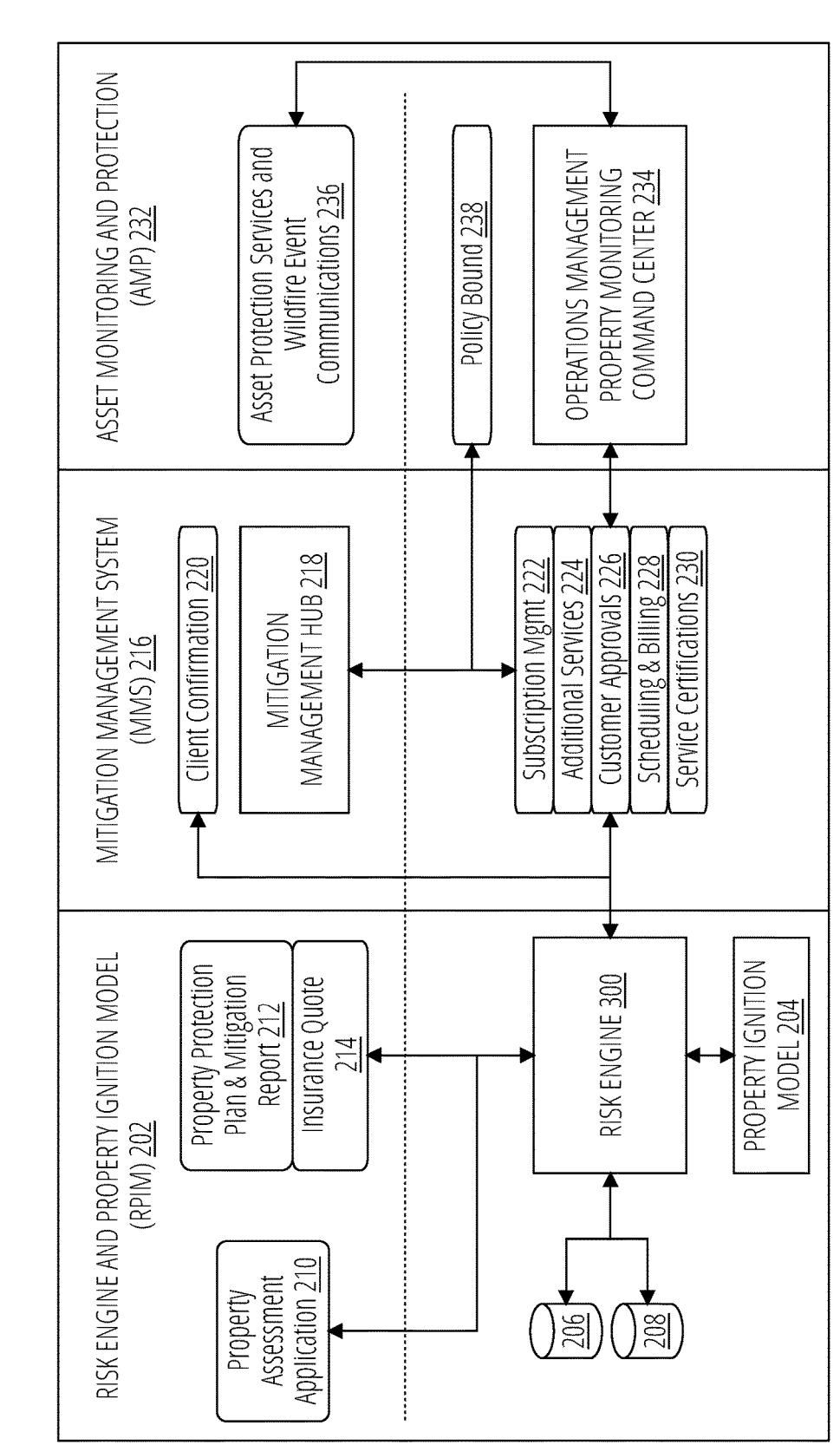
FIG. 2 illustrates a system for wildfire risk assessment and mitigation 200 in accordance with one embodiment.

FIG. 2 illustrates a system for wildfire risk assessment and mitigation 200 in accordance with one embodiment. The system for wildfire risk assessment and mitigation 200 may comprise a risk engine and property ignition model system (RPIM 202), mitigation management system (MMS 216) and asset monitoring and protection system (AMP 232).

Figure 4:
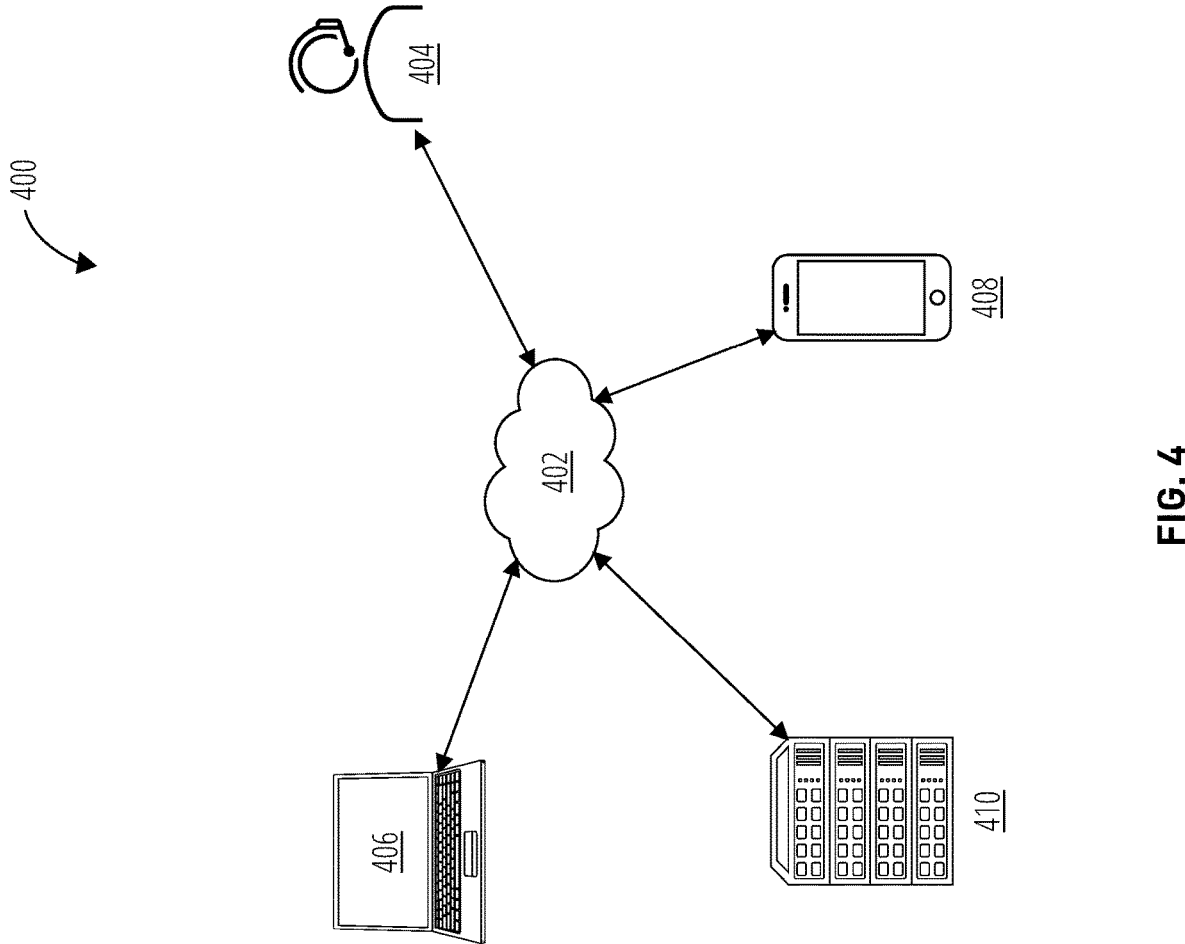
FIG. 4 illustrates a networked computing system 400 in accordance with one embodiment.

The system for wildfire risk assessment and mitigation 200 may be implemented using a 400, as illustrated in FIG. 4. The 400 may comprise various computing devices connected across a network 402. These may include stationary computing devices 406, mobile computing devices 408, and servers 410 (including cloud-based servers), which may be acted upon or interacted with by one or more users 404.

RPIM 202 is a system that may perform various aspects of the methods described herein, and in particular at least portions of methods 500, 600, 700 and 800, and related visual depictions. The RPIM 202 may comprise a risk engine 300 that interacts with a property ignition model 204 to analyze and assess aspects of a property for wildfire risk. The risk engine 300 may request data from and provide data to application programming interfaces (APIs) such as external APIs 206 and third party data providers 208 as part of this analysis and assessment. The risk engine 300 may interact with a property assessment application 210 in order to obtain information regarding the features of a property, as is described elsewhere in this application in further detail. The risk engine 300 may provide data to inform a property protection plan & mitigation report 212 and an insurance quote 214, and may also take information from these entities in as input to its analysis and assessment, and in order to refine its algorithms to provide improved analysis in future. The risk engine 300 may take as input and update as output client confirmation 220, subscription management 222, additional services 224, customer approvals 226, scheduling and billing 228, and service certifications 230 associated with the property under assessment. These entities may be further used in mitigating risk using MMS 216.

MMS 216 is a system that may perform various aspects of the methods described herein, and in particular at least portions of methods 500 and 900, and related visual depictions. The MMS 216 may comprise a mitigation management hub 218 that may take as input and update as output subscription management 222, additional services 224, customer approvals 226, scheduling and billing 228, and service certifications 230 associated with the property under assessment. These entities may be further used to determine the binding of a policy (see policy bound 238), as well as inform the operations management property monitoring command center 234 of AMP 232.

AMP 232 is a system that may perform various aspects of the methods described herein, and in particular at least portions of methods 500 and 1000, and related visual depictions. AMP 232 may include an operations management property monitoring command center 234 that may take as input and update as output subscription management 222, additional services 224, customer approvals 226, scheduling and billing 228, and service certifications 230 associated with the property under assessment. AMP 232 may be informed by whether or not the policy is bound (policy bound 238). The operations management property monitoring command center 234 may interact with asset protection services and wildfire event communications 236 in order to remain up to date on changes to and status of the asset being monitored. The AMP 232 may in one embodiment comprise a monitoring platform. The monitoring platform may utilize predictive models to trigger pre-fire and during fire services entitled under Additional Services 224.

Figure 3:
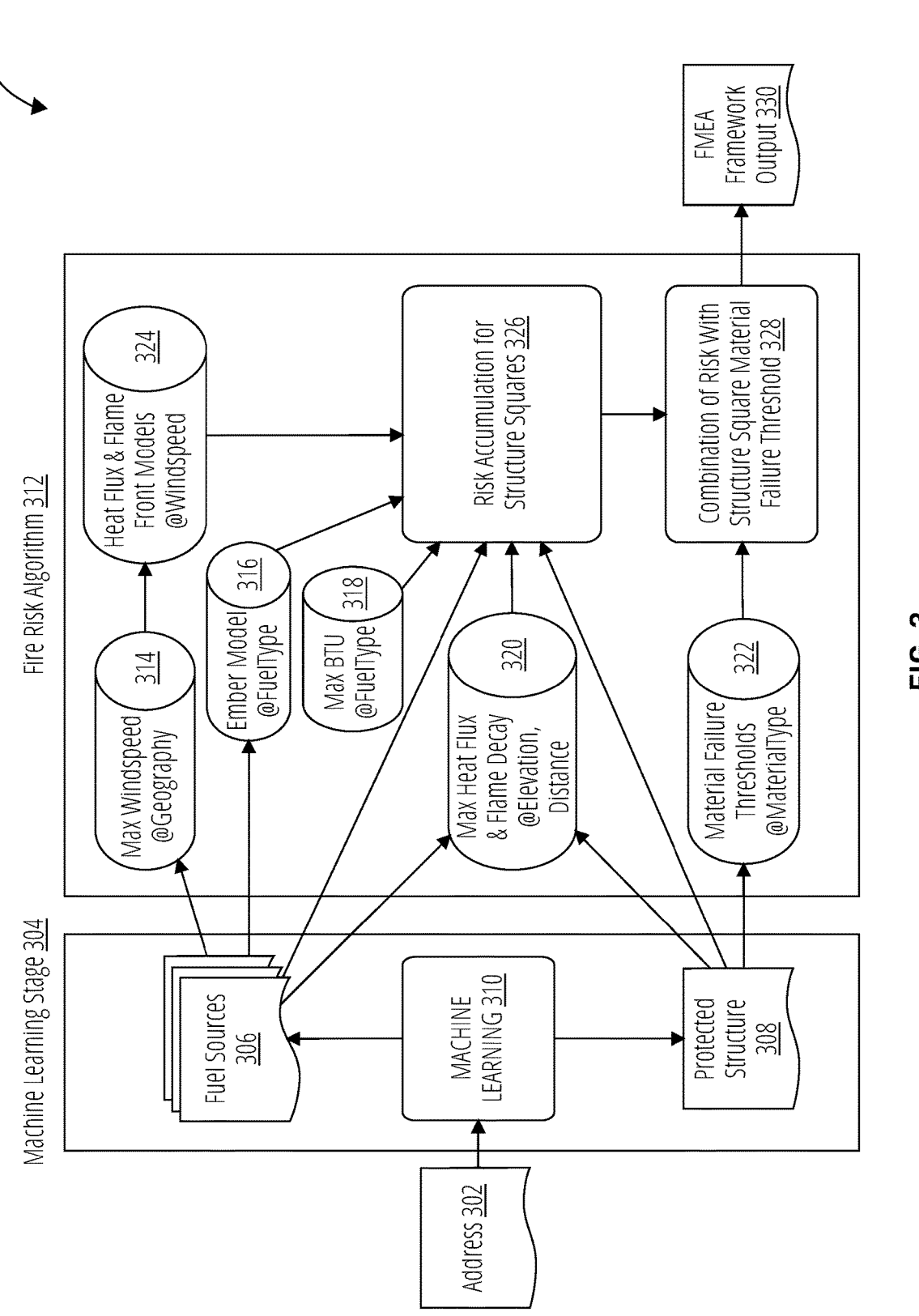
FIG. 3 illustrates a risk engine 300 in accordance with one embodiment.

FIG. 3 illustrates a risk engine 300 in accordance with one embodiment. The risk engine 300 includes machine learning stage 304 and a fire risk algorithm 312. The machine learning stage 304 may take in an address 302 and use machine learning 310 to identify fuel sources 306 and at least one protected structure 308, which it may provide to the fire risk algorithm 312. Based on the fuel sources 306 and protected structure 308, informational databases may be used to gather information on or calculate maximum wind-speed 314, ember model 316, maximum heat output in British Thermal Units (BTUs) (maximum BTU 318), maximum heat flux and flame decay 320, material failure thresholds 322, and heat flux and flame front models 324. These may each be applied to wall segments to determine risk accumulation for structure squares 326. This may inform a combination of risk with structure square material failure threshold 328. The result may be provided as Failure Mode Effect Analysis output (FMEA framework output 330).

Risk accumulation for structure squares 326 may take into account radiant flux projection, flame front ellipse, and ember dispersion to intersect all structure squares encountered. Combination of risk with structure square material failure threshold 328 may combine each structure square accumulated input against material failure thresholds 322 for each failure mode (flux, flame, ember).

FMEA framework output 330 may include a detailed structure failure analysis as follows: each section of the structure that would experience an ignition during a wildfire may be inventoried, and the inventory may be ordered by severity and surplus. FMEA framework output 330 may also include a detailed fuel contributors by zone (1-3) as follows: contributors may be inventoried by zone and ordered by contribution to failures related to each fuel source in order of contribution, this may facilitate identification and prioritization of actionable mitigation work.

Property Ignition Model (PIM)

More than forty years of wildfire research has produced a variety of models—physical, probabilistic, and dynamic—that describe the spread, intensity, and nature of wildfires (e.g., BeHave, FlamMap, FARSITE, FSPRo, etc.). Fewer models, such as Structure Ignition Assessment Model (SIAM) and EcoSmart Fire, model home ignition along the Wildland Urban Interface (WUI) in the context of wildfire. While these models may be useful for identifying structural features vulnerable to wildfire conditions, to date, no widely available model scores homes for risk of damage or destruction from wildfire at scale.

Threat Vectors: Analysis of Heat Flux and Ember Penetration

PIM is premised upon the empirically determined tenant that ignition is a function of a home's structural features and their spatial relationship to the immediately surrounding fuel sources. Furthermore, research has determined that ignition is caused by some combination of the three principal ways in which fire spreads along the WUI:

1. Radiant heat aided by piloted ignition from embers,
2. Direct flame impingement (convective heat), and
3. Firebrands entering the structure and accumulation of firebrands.

These three modes of wildfire fire transmission form the physical basis of a thermodynamic Threat Vector analysis. Not all structural elements are vulnerable to all Threat Vectors, and given that each Threat Vector represents a different physical phenomenon, the impact of each Threat Vector may be modeled separately:

Heat flux for radiant impact,
Flame front contact for direct flame impingement,
Ember mass accumulation and size population for firebrand accumulation, and
Ember penetration probability computation.

The likelihood of ignition by either of these vectors is a function of the variables encoded in the matrix, the spatial relationships between them, and the specific attributes of each individual element. To exemplify this, consider fire spread from a large 1-ton tree to a home with stucco siding. The PIM considers the total heat released by the tree under combustion, the heat capacity of stucco, the ignition temperature of treated wood, the distribution of ember size by distance from the tree, and several other attributes that, when taken together, fully characterize fire transmission between the tree and the home.

Finally, the assumption that if any feature of the home fails (ignites) then the entire home may ignite, allows for linear pair-wise (heat source—structure segment) modeling of the overall home ignition question. In practice, PIM evaluates whether each exterior structural element of a given home ignites under the influence of each of the four Threat Vectors summed over all fuel sources with direct access to each exterior structural element. The impact of each of the four Threat Vectors may be summed over all "line of sight" fuel sources (e.g., a tree "on the other side of the house" may have no impact) at each structure tile. Then, for each structure feature at that tile location, an ignition (failure) determination may be computed:

For radiant heat, the total incident heat flux may be used in combination with tables of structural material heat capacities to determine if ignition temperatures are reached.

Breaking temperatures are used in the case of window glass.

If the flame front occupies the same coordinates as a structural tile, that tile may be assumed to ignite/fail.

For roof tiles, accumulated ember mass may be used to determine whether or not burn-through occurs.

For wall tiles, sub 0.01 g ember populations may be used to probabilistically determine if embers penetrate vents.

Wind may be an additional variable to be considered when modeling fire transmission. Since wind direction may affect the impact of any given fuel source on each roof or wall tile, Threat Vector outcomes may be computed nine separate times: once for wind from each of eight compass headings and a "no wind" case to cover worst case conditions for each structure tile. The model considers, for example, that a wind out of the north-east may yield maximum heat and ember transfer to structural elements on the north side of the house, but a south-west wind may yield little impact on those same elements. In that situation, the north-east results may be used for evaluation.

Model Calculation References

Deterministic Ignition Modeling (Cohen 1995) "*Structure Ignition Assessment Model (SAIM)*"

(Cohen 1800) "*Preventing Disaster: Home ignitability in the wildland-urban interface.*"

Cohen established the foundation for ignition models (including PIM) by deterministically modeling structure and fuel interactions. This was the first step in establishing homeowner agency to protecting homes from wildfire.

Ember Transport Modeling and Ignition Impact (Harris 2011) "*Analysis and Parameterization of the Flight of Ember Generation Experiments*" (Zhou 2019) "*Fire Ember Production from Wildland and Structural Fuels.*"

Harris 2011 and Zhou 2019 greatly improved on ember travel and ignition modeling methods established by SIAM.

Ember to Ignition Rates (Santoso 2019) "*Review of the Transition from Smoldering to Flaming Combustion Wildfires*"

Santoso 2019 provides updated ember ignition models leveraged in PIM calculations.

Flame Length and Wind Speed Models (*United States (US) Department of Agriculture/US Forest Service*) *BeHave Wildfire Model*

(Andrews 2007) "*BeHavePlus Fire Modeling System: Past, Present, and Future.*"

(Cohen 1804) "*Relating Flame Radiation to Home Ignition Using Modeling and Experimental Crown Fires.*"

The USDA and USFS keep their BeHave Wildfire model updated. In the model, their flame length calculations may be leveraged, as well as crown fire behavior, and wind models to simulate fire spread conditions.

Wildfire Ignition Resistance (Werth 2012) *Wildfire Ignition Resistance Estimator* (*WildFIRE*) *Wizard Software*

This software was developed under contract to the US Department of Energy to evaluate ignition risks. WildFIRE offers enhanced calculations of burn threats used in PIM.

Ember Ignition Characteristics Based on Fuel Type (Bahrani 2020) "*Characterization of Firebrands Generated from Selected Vegetative Fuels in Wildland Fires*"

Bahrani 2020 provides a refined understanding of fuel loads.

Structural Burn Pathways (Hakes 2016) "*A review of Pathways for Building Fire Spread in Wildland Urban Interface Part II: Response of Components and Systems and Mitigations Strategies in the United States*"

To accurately reflect how structures burn, the PIM incorporates analysis of burn pathways by component type and material makeup.

Fuel Structure Interactions (Phillips 2012) "WildFire Ignition Resistance Estimator (WildFIRE) Wizard Technical Report."

(Dietenberger 2016) "EcoSmart Fire as Structure Ignition Model in Wildland Urban Interface: Predictions and Validations." (Weise 2017) "Wind and Slope Effects on Laboratory-Scale Fire Behavior."

The PIM combines deterministic modeling of heat flux and direct flame, and enhances modeling of ember accumulation and penetration building on approaches demonstrated in earlier models.

Tree combustion (Manzello 2009) "*Mass and Size Distribution of Firebrands Generated from Burning Korean Pine (Pinus Koraiensis) Trees.*" (Cunningham 2003) "*Wind and Slope Effects on Laboratory-Scale Fire Behavior.*"

(Schulz Baker 2011) "*Burning Characteristics of Individual Douglas-Fir Trees in the Wildland/Urban Interface.*"

Our model uses work by Schulz Baker, Shunhara, and Cunningham to better model heat release rate for trees.

Structural Risk Based on Construction Materials (Syphard 2017) "*The Importance of Building Construction Materials Relative to Other Factors Affecting Structure Survival During Wildfire*"

Our model also incorporates recent findings on building construction and design parameters that predict structure survival.

Simplifying Assumptions for PIM

To facilitate these computations, in one embodiment, PIM may make several, simplifying assumptions based on the literature that do not significantly impact the accuracy of the model results:

1. Home ignition is a function of the home's structural features and the immediately surrounding fuel sources.
2. If any structural feature fails (ignites or breaks), then the entire home will ignite.
3. The PIM assumes extreme spread rate and intensity, i.e., assumes a worst case scenario in which everything burns simultaneously thus applying maximal heat flux and ember accumulation onto the structure.
4. Consideration of radiant heat, flame impingement, piloted ember and firebrand accumulation is sufficient to determine ignition and thus destruction or survival of a home in wildfire conditions.
5. Consideration of major point source fuels (i.e., trees) is sufficient. Some embodiments may consider additional fuel source categories.
6. All fuels within a 20 m radius of the home centroid burn.
7. Trees release all heat under characteristic Heat Release Rate curves (see FIG. 19B).
8. Large trees release between 0.08% and 0.15% of their mass as embers when burned.
9. Computational resolution may be done on the order of 50 cm (2 ft) and in 2-dimensions without loss of accuracy.

The PIM in one embodiment may utilize a simplified set of standard fuel sources, structural elements, and fire susceptibility parameters for modeling. Accuracy of the PIM may continue to improve as feature detection algorithms are trained and refined and more data is gathered on the fire susceptibility of individual materials.

Failure Cataloging

For each structure tile for which the model determines an ignition (failure), PIM catalogues the following:

1. Tile location,
2. Feature (or features) that failed,
3. Threat Vector (or vectors) that caused each of the feature failure(s),
4. Individual fuel sources contributing to each of the specific vector—feature failure(s),
5. Wind direction(s) during failure,
6. Failure Surplus—a measure of "how close" the feature came to non-failure/non-ignition. For example, a feature might fail at 2 kJ/m$^2$ of accumulated heat flux over the combustion period. The model determines that the feature fails because the incident heat at that tile is 2.5 kJ/m$^2$. Thus the "failure surplus" is 0.5 kJ/m$^2$. The "failure surplus" may be useful for determining the remediation classification. Large surpluses indicate more extensive remediation may be needed (or may even not be possible), whereas small surpluses may need less extensive remediation.

Failure Mode Effect Analysis (FMEA) Framework and Risk Scoring

With the modeling approach described in the previous section, each fuel source and structural element in scope is backed by specific calculations for thermal energy output, probability of ignition, and remediation opportunity. The rich level of detail obtained through data acquisition methods may support calculations that may vary considerably from item to item. For example, a short tree with a small crown may have a much smaller thermal energy output potential than a tall tree with a large crown. All failure items may be compiled into a modified Failure Mode Effect Analysis (FMEA) framework, and the relative risk of each item may be quantified in a Risk Priority Number (RPN).

While results of the overall risk assessment may be presented in the context of standards set by the Institute for Business and Home Safety (IBHS) and include four discrete risk zones, listed below, the relative risk may be computed for each of five threat vectors (convective, radiant, ember accumulation, ember penetration, and nearby non-primary structures).

Home Ignition Zone: The structure itself and a boundary of 5 feet minimum from the structure Zone One: 5 feet to 30 feet from the structure.

Zone Two: 30 to 100 feet from the structure.

Zone Three: 100 to 500 feet from the structure.

Once each threat vector score is computed, a cumulative risk score may be calculated, and then for the entire property based on threat vector contributions to ignition failure points. The PIM incorporates the compounding effect of risk from multiple threat vectors. This also helps in understanding contributors to ignition, as most items may fail due to a cumulative effect of heat flux from multiple sources.

It is also important to understand that each failure item may be attached to multiple fuel sources and there may be overlap between them. The FMEA framework analysis sits on top of each individual failure item so each failure and the point at which it fails may be properly represented. This gives us the ability to show multiple failures in the same location of a home. For example, a wall section may comprise a window and siding that both may fail, but at different points. Reducing one risk may or may not eliminate the adjacent risk. The PIM's risk prioritization approach may augment the FMEA framework in two ways:

1. Traditional detectability scoring may be replaced with remediation scoring. This reflects the ability to address remediation in a failure event.

2. Risk prioritization considers failure contributions and surplus amount to subsequent related structure failures.

Results may be presented to the owner and/or their insurer in the Property Protection Plan, where all supporting calculations, images, and features evaluated throughout the analysis may be attached with each component for review. This approach is unique in that a component-level view of risk for a property may be compiled, and a component-level remediation plan to mitigate risks. From a system perspective, at the end of this process each Risk Component (structure feature or fuel source) may be a separate structured data object that includes a Risk Score, a "Treated" Risk Score, and a Mitigation Treatment. These data objects and the granularity they represent serve as the foundation for the Mitigation Management system, informing the downstream integrated service delivery and logistics around approvals, scheduling, pricing, billing, and other services.

In one embodiment, scoring may be based on the FMEA framework model, where each failure may be identified, and scoring may be computed based on scope, probability, and detectability. Other embodiments may expand on this to map scope to energy, or may score by failure vector, for which more accurate and deterministic data regarding point of ignition may be available.

Each failure vector (convective, radiant, ember accumulation, ember entry, and other structures) involves distinct calculations to determine ignition points. These calculations may be performed using a model for fuel load on the structure and information about when a structure may exhibit a thermal failure (ignition) based on materials and ignition points of those materials. Depending on the failure mode, each calculation may represent a relative overage (excess energy) to ignition based on both energy and amount of the structure that may fail. As these calculations are different, the range of scoring may be fit (based on a large sample of properties >10000) to a 1-100 range, representing a thermal excess of energy needed to cause ignition based on the assumed fire conditions. This may be varied in the disclosed system, but is based on standard peak ignition models of a Peak Burn: all trees burn in a 1 minute heat pulse, with 20 mph winds, and 30% humidity. The scale of output may indicate how much excess energy may be present at the structure during a fire. Zero is no ignition at peak, while the further away from Zero, the more excess energy may be present to drive ignition. This informs both the structure risk as well as amount of energy reduction needed to solve for ignition. Ignition may in some cases be solved by removing fuels or by hardening a structure to be more resilient to thermal exposure. An example of this would be to replace wood siding with cement board siding.

FIG. 4 illustrates a networked computing system 400 in accordance with one embodiment. The networked computing system 400 may be used to implement the system for wildfire risk assessment and mitigation 200 illustrated in FIG. 2. The networked computing system 400 may comprise a network 402, at least one user 404, at least one stationary computing device 406, at least one mobile computing device 408, server 410, in any of various combinations as may be readily apprehended by one of ordinary skill in the art.

Network 402 may be any one or more networks that allow elements of the present system to communicate with each other, as may be known in the art, for example wide area networks (WANs), LANs, and the like, that may be wired or wireless, and may include Bluetooth™, and other approaches to local or remote communication.

There may be one or more stationary computing devices 406 that may be one or more computing systems that may be used various users of the system for wildfire risk assessment and mitigation 200, such as homeowners (owners of structures), appraisers, mitigation consultants or companies, monitoring consultants or companies, insurance companies or brokers and adjusters, structure data providers (such as images of structures, weather data, elevation data, material data, and the like).

Mobile computing devices 408 may provide access to various functionality of system for wildfire risk assessment and mitigation 200, similar to stationary computing devices 406. In addition, mobile computing devices 408 may allow one or more users of system for wildfire risk assessment and mitigation 200 to input structure data that may need the device to be proximate to the structure (such as to take images of the structure and fuel sources that may not be obtained via other means such as satellite or Google™ imagery).

Either stationary computing devices 406 or mobile computing devices 408 may be used to perform various functionality of system for wildfire risk assessment and mitigation 200, as described herein—for example to initiate and perform risk assessment, obtain, calculate or refine structure datasets, determining mitigation strategies and documenting completion of such mitigation, initiating and performing monitoring of one or more structures, and advising of monitoring or mitigation actions needed based on the monitoring. Together stationary computing devices 406 and mobile computing devices 408 may be referred to simply as computing devices.

User 404 may be any of the users as described herein and may access system for wildfire risk assessment and mitigation 200 via stationary computing devices 406 or mobile computing devices 408. User 404 may also be involved in various aspects of systems and methods herein without using a computing device—for example to perform mitigation (tree removal) even if another user may document the mitigation strategy of another user or to provide hardening services (such as spraying fire-retardant) and providing updates or reports relating to both.

It may be understood that there are various permutations of users 404 and computing devices may be part of the systems and methods described herein, including but not limited to relating to both mitigation and hardening and the many related variables involved. Computing devices described with respect to FIG. 4 may be such as are described in greater detail with respect to FIG. 35.

Figure 5:
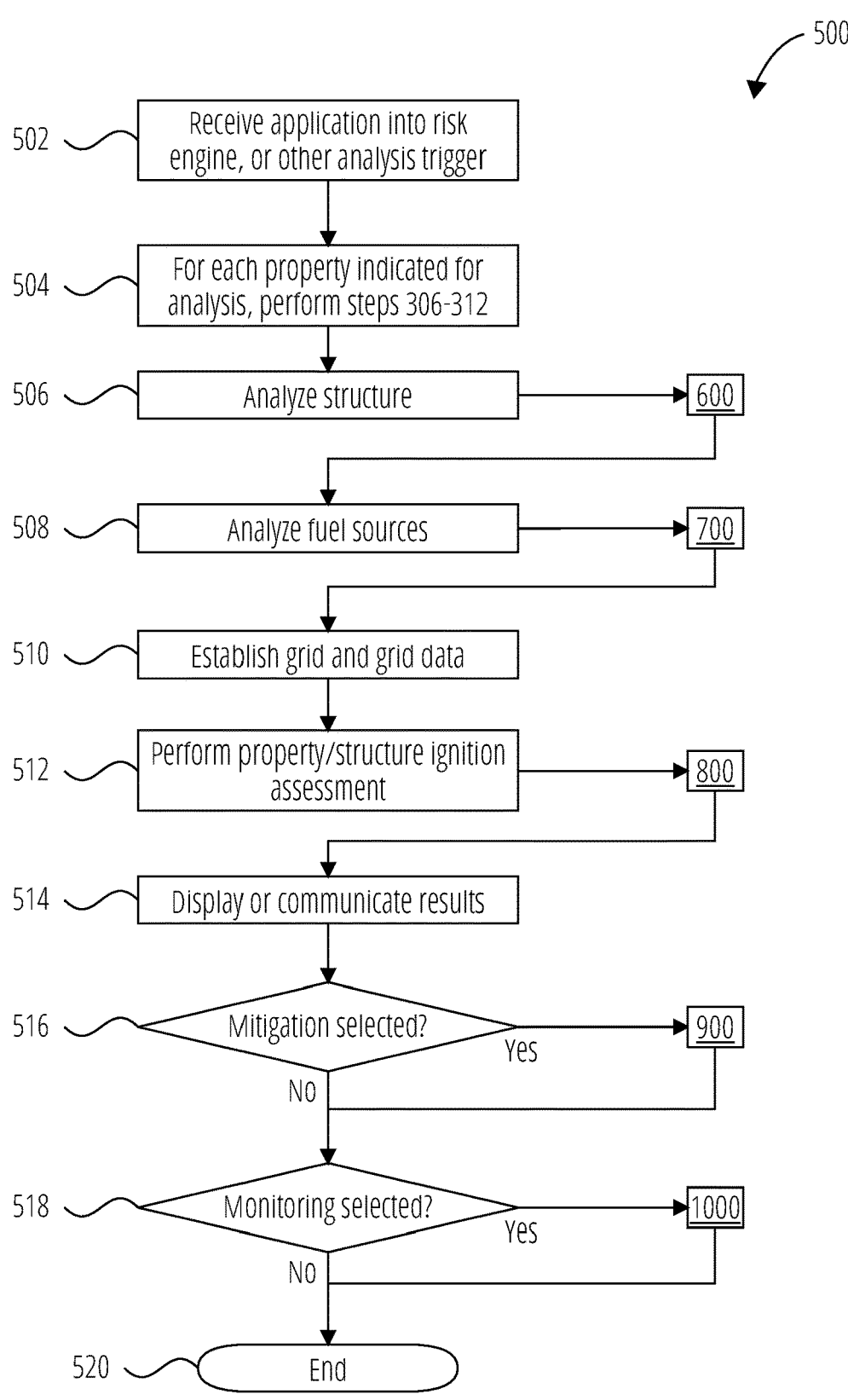
FIG. 5 illustrates a method 500 in accordance with one embodiment.

FIG. 5 through FIG. 10 are flowcharts illustrating methods 500 through 1000 in accordance with one embodiment. Turning to FIG. 5, there is a method 500 for wildfire risk assessment, mitigation and monitoring for building structures.

Method 500 begins at 502 where an application may be received to perform one or more steps of an assessment. An application may be received at RPIM 202 and may be received from a computing device, having been initiated by a user 404. The application may include some limited data about one or more structures, such as a set of structure addresses. Method 500 may also start at 502 with one or more other triggers to perform the method. For example, system for wildfire risk assessment and mitigation 200 may receive new, or further, information that may affect a prior risk assessment or mitigation assessment, such as a user 404 providing more information about structure 102, mitigation step information being received by system for wildfire risk assessment and mitigation 200 (such as confirmation that a tree or other fuel source 104 affecting a particular structure 102 has been cut down), or that monitoring has been initiated for a given structure 102 that is already in system for wildfire risk assessment and mitigation 200 but has not previously been part of a monitoring service. In some of such cases method 500 may not have to fully re-perform all of 504-512 but may update the results based on the new or additional information.

Method 500 continues to then perform various steps to calculate a quantitative risk assessment for each of the structures received in the application. Broadly speaking the ingestion and creation of structure data may be performed at 506-510, as further described. Then risk assessment, with mitigation strategy determination, if indicated, may be performed at 510, as further described. Method 500 may then display results of the risk assessment and/or mitigation assessment at 514. Method 500, at 516, may then allow a user 404 of system for wildfire risk assessment and mitigation 200 to select that they want to further consider mitigation, leading to method 900. Method 500, at 518, may also allow a user 404 of system for wildfire risk assessment and mitigation 200 to select that they want to enable and perform monitoring of one or more structures 102, either in series with 900 or in parallel with 900 depending on the outcome of method 900, leading to method 1000.

Returning to risk assessment at 506-510, method 500 begins to ingest and create structure data used to calculate the risk for a given structure 102, for each structure 102 in a group or set.

Analyze Structure and Fuel Sources

At 506 a structure may be analyzed and ingested, such as by receiving an address, and creation of a structure dataset may be initiated. Ingesting or analyzing the structure may comprise the following, as may be described in method 600 of FIG. 6:

1. 602. Get an address from an application or via a data source available through a computing device (e.g., 406, 408, 410). Using the address, a latitude/longitude point may be obtained. Global positioning system (GPS) coordinates, geographic information system (GIS) coordinates, or other forms of locating and orienting may be used for the various features described herein.

2. 604. Determining a structure outline. This may be the top-down outline view of the structure. This may be determined from a data source and using GPS coordinates of each corner of the structure to create an outline in GPS coordinates. Machine learning may perform this determination in one embodiment.

3. 606. Determining the structure center. This may be determined with reference to data from a data source and the structure outline. The structure center may be used to create the grid 1208.

4. 608. Further structure classification, such as from the exterior features of the structure(s) on the property, where the features (such as windows, decks and the like) are located along the perimeter of the respective structure, their dimensions, and material composition. This may be arrived at from oblique satellite imagery, aerial imagery, ground imagery, real estate and other property data, and input via an app accessible on computing devices (such as via screenshots like those shown in FIG. 16). Machine learning feature detection algorithms may be used on these images to characterize windows, doors, vents, soffits, and every other major feature as needed to model fire susceptibility.

Figures 6, 7:
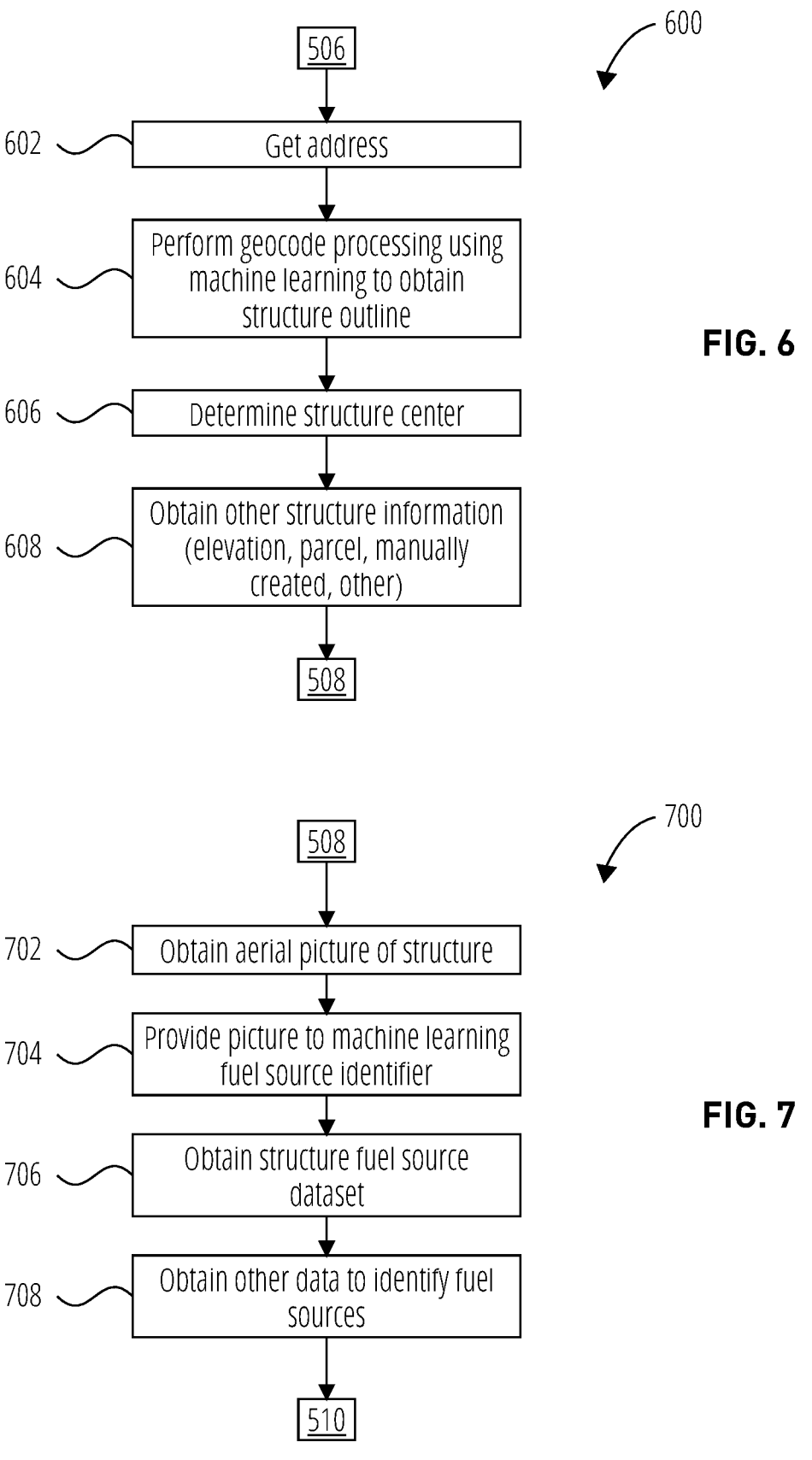
FIG. 6 illustrates a method 600 in accordance with one embodiment.
FIG. 7 illustrates a method 700 in accordance with one embodiment.
Figure 8:
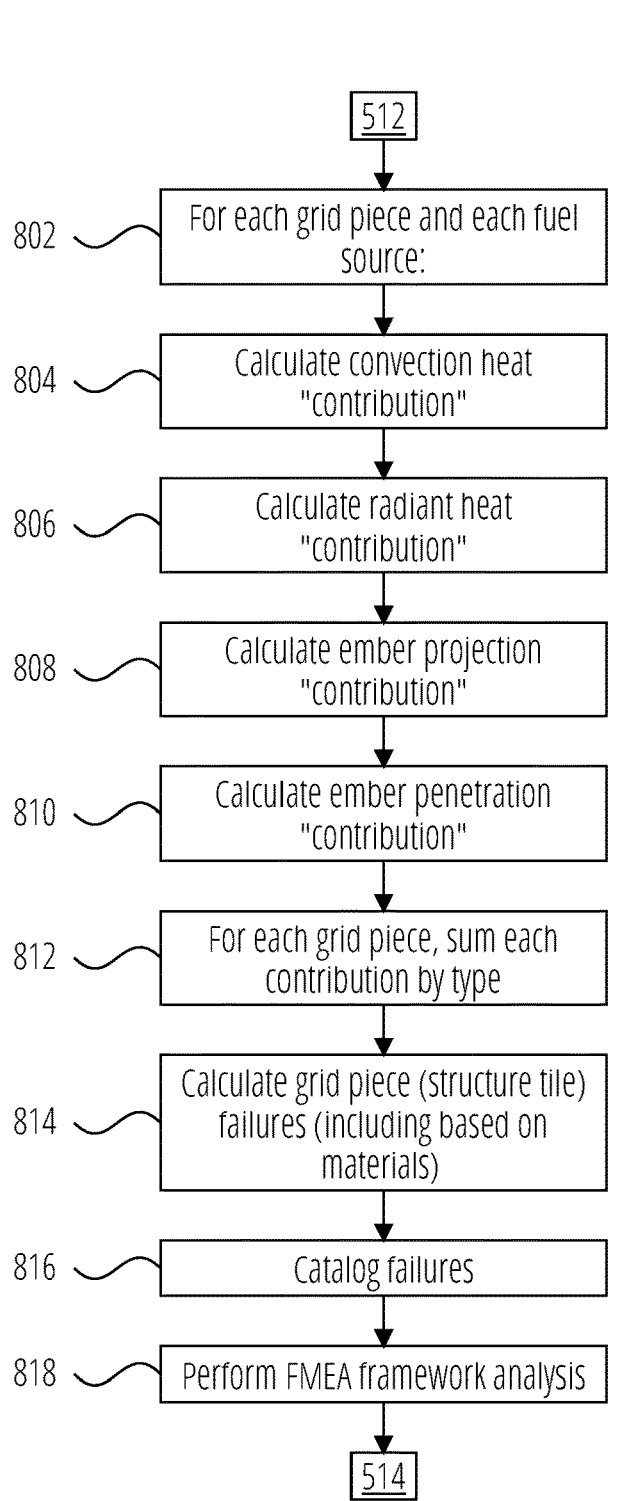
FIG. 8 illustrates a method 800 in accordance with one embodiment.
Figure 9:
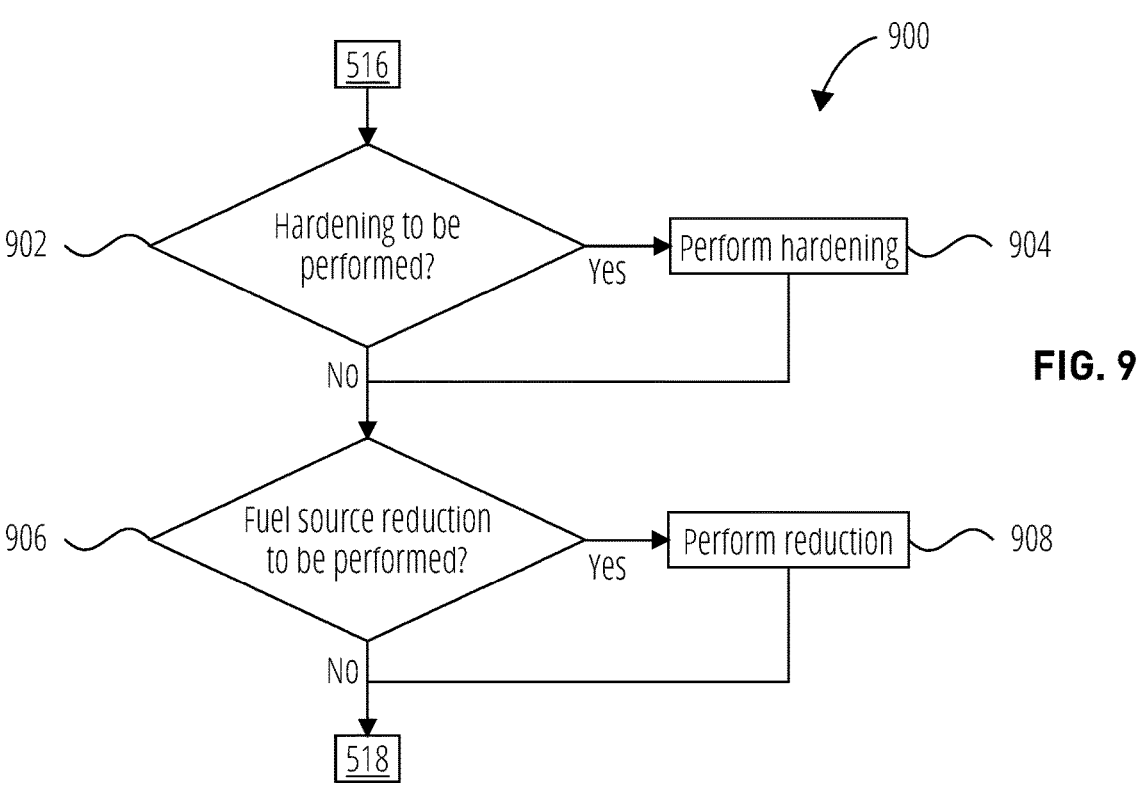
FIG. 9 illustrates a method 900 in accordance with one embodiment.
Figure 10:
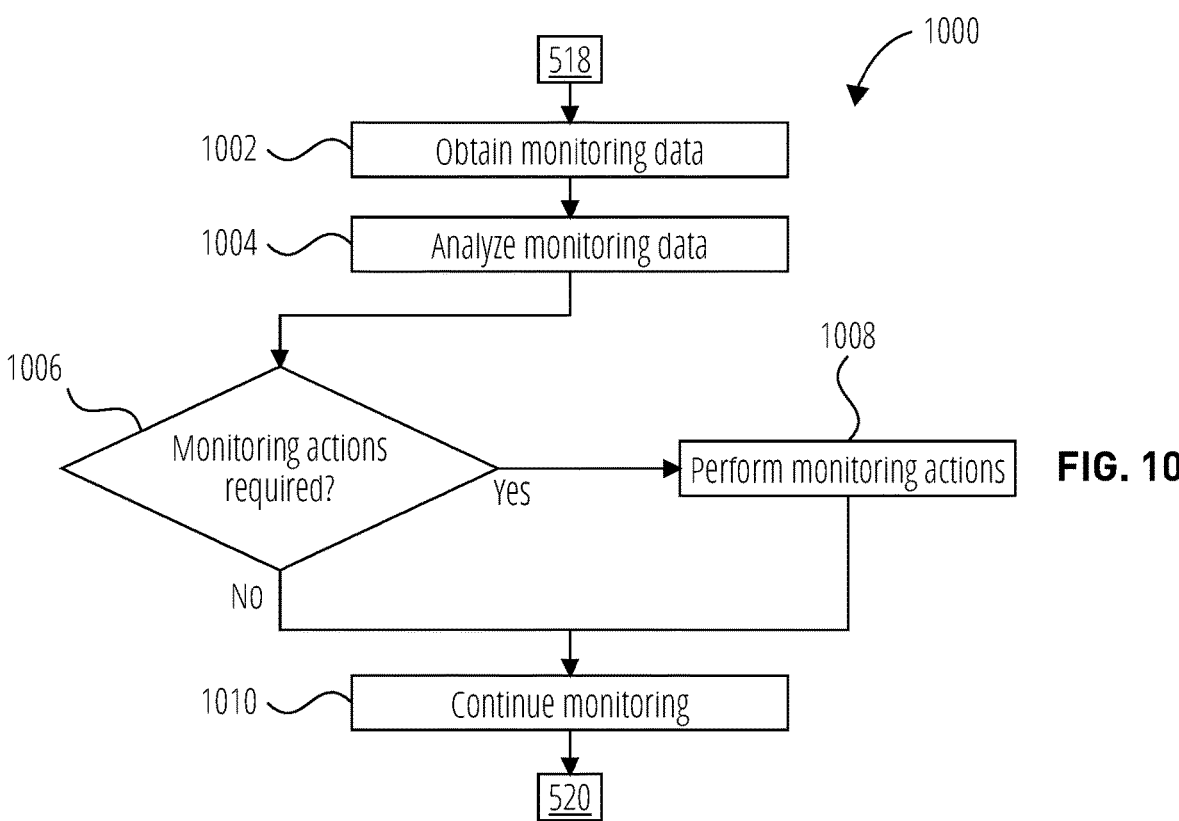
FIG. 10 illustrates a method 1000 in accordance with one embodiment.

Method 600 may then return to method 500 where, at 508 a grid fuel source dataset may be created by determining fuel sources 104 within the grid 1208, as may be described in method 700 of FIG. 7. This may involve determining or detecting major vegetation (trees, shrubs), structures (sheds, fences), and neighboring rooftops within some distance of the structure 102 that would act as a fuel and contribute to the advancement of wildfire. Other characteristics may also be extracted, such as local topological features (slope, roads, hydrants, arroyos). For modeling purposes, specific attributes may then be determined for each feature or fuel source 104. In the case of a large tree, for example, algorithms estimate tree height and measure crown size. In the case of a shed or pool house, algorithms determine height and surface area. Feature-specific attributes may then be used to calculate fuel load in terms of thermal energy (BTU) generation potential. This may be done for every feature or fuel source, effectively translating the sources of data (such as satellite imagery and other sources of data about fuel sources 104) into a full inventory of fuel sources surrounding the structure. This may preferably all be done in an automated fashion, though some may be manual, such as by operators visiting structures 102 and assessing one or more elements of structure 102 and fuel sources 104. In automated functioning images may be provided to an artificial intelligence (AI) image processing system ("AI tree detection system") that identifies fuel sources. The AI tree detection system may have previously been provided training data, from existing data sources 210 and augmented with manual data as may be desired, for example that identified fuel sources 104, such as trees.

Ingesting or analyzing the structure may comprise the following, as may be described in method 700 of FIG. 7:

1. 702. Obtaining one or more images, such as satellite images, of structure 102.
2. 704. Images may be provided to a machine learning system to detect and extract fuel sources 104.
   a. Output encoding may be GIS layer(s) of vector polygons with an appropriate coordinate reference system (global projection) or may be GPS coordinates. A projection may provide correct cardinal orientation of the extracted features when projected onto the grid, computing correct lengths and angles of incidence, and correct overlaying of other data such as spectral band imagery and slope data.
   b. Given a geo-tiff or other geo encoded vector file, features may be raster mapped to a 300 feet×300 feet grid at 2-foot resolution (conforming to industry defined 300-foot home defensible space radius) with a defined geo-projection (World Geodetic System (WGS) 84 or other standard). Note that radiant heat flux threat computations use wall segment normals, which may be better computed pre-rasterization from vector polygons. For rasterization, map centroids to grid intersections—thus, e.g., with 400×400 50 cm resolution (or better, such as 20 cm resolution), grid points would be pixel centers in the original image.
3. 706. Analysis of the detected fuel sources may be completed and a fuel source dataset results.
   a. Analysis may include computing fuel source/structure-segment (tile) distance vectors (using vector computation from points snapped (raster mapped) to grid 1208 for example on structure tiles), and filtering fuel source/structure distance vectors to exclude vectors for wall segments shaded by other wall segments.
   b. Fuel source centroids, wall and roof segments/tiles may be raster mapped ("snapped") to grid points. However, distance vectors may be computed using Euclidean distance (and include direction), not taxicab geometry. The number of distance vectors $x_{ij}$ is O(i*j) where i is the number of wall and roof segments and j is the number of fuel sources.
4. 708. Manual processes may augment the automated dataset that may result from 702-706, such as be users 404 visiting structure 102 and doing an audit, such as via an app accessible on computing devices (such as via screenshots like those shown in FIG. 16). That may allow types of trees to be determined, and the like.

Method 700 may then return to method 500 where, at 510 a structure grid may be created, and structure data may be added to each applicable tile. Using the structure center (GPS coordinates for example) a grid of tiles may be created around the structure center. The structure grid may be set to extend a certain distance to ensure that relevant fuel sources 104 may be included in the risk assessment. For example, a structure grid that extends 300 feet radially from the structure center may be chosen, which may mean grid 1208 extends beyond property boundaries. Tiles may be various sizes, for example 2 foot by 2 foot square tiles. Tiles may be any size and shape, provided that the number and shape of the tiles may be chosen to allow for accurate calculations and risk, mitigation and monitoring functionality, while balancing the computational challenges as the number of tiles increases. Tiles may be classified in many ways, for example as being a tile that forms part of the structure (structure tile, which may be further classified as wall structure tile, roof structure tile or wall/roof structure tile) and fuel source tile. This may allow more efficient computation at 512. Note that any tile may contain part of a wall and part of a roof, for example. Tiles may be "top down" tiles (i.e., from above) such that a depth of a tile (the vertical height) may be determined from the height of the house in that location.

At 510 data gathered at 506 and 508 may be placed in the grid 1208.

Property Ignition Risk Assessment

Having ingested and created relevant data regarding the structure 102 (structure dataset) and the fuel sources 104 (fuel source data source), method 500 continues to perform the structure or property ignition risk assessment, also referred to as a property ignition model 204 (PIM), at 512.

PIM is premised upon the empirically determined tenet that ignition is a function of a structure's structural features and spatial relationship to the immediately surrounding fuel sources. Furthermore, research has determined that ignition is caused by some combination of these principal ways in which fire spreads along the wildland-urban interface:

1. Radiant heat aided by piloted ignition from embers,
2. Direct flame impingement (convective heat), and
3. Firebrands/embers entering the structure or accumulating on surfaces of structure 102.

Figure 19A:
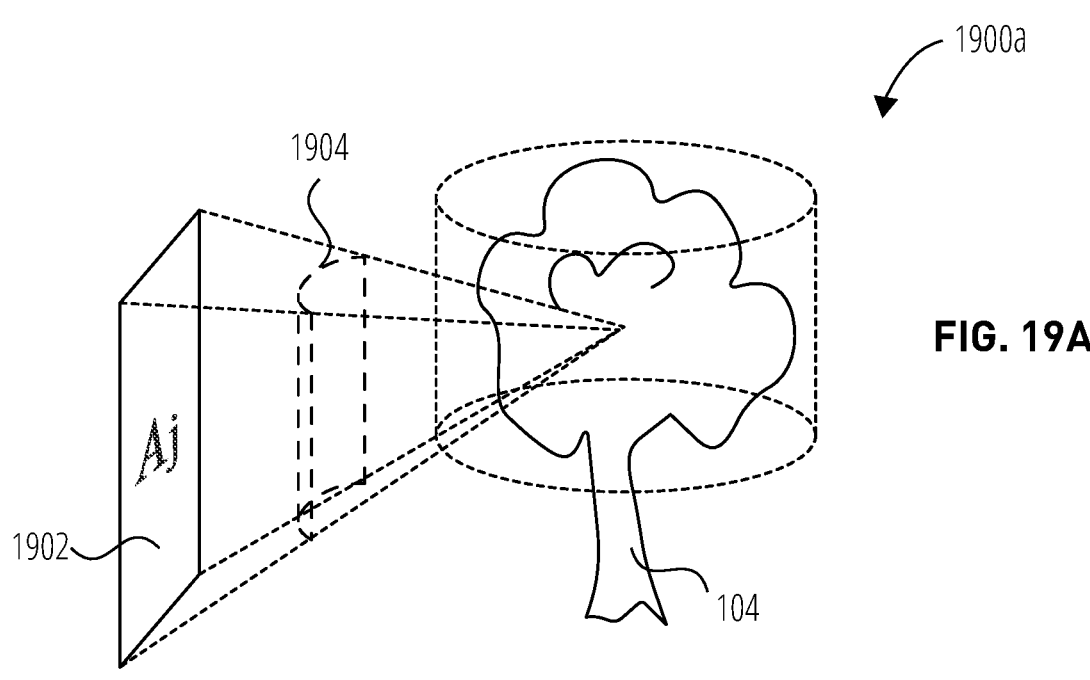
FIG. 19A illustrates a fuel source to wall segment irradiation elevation 1900a in accordance with one embodiment.
Figure 19B:
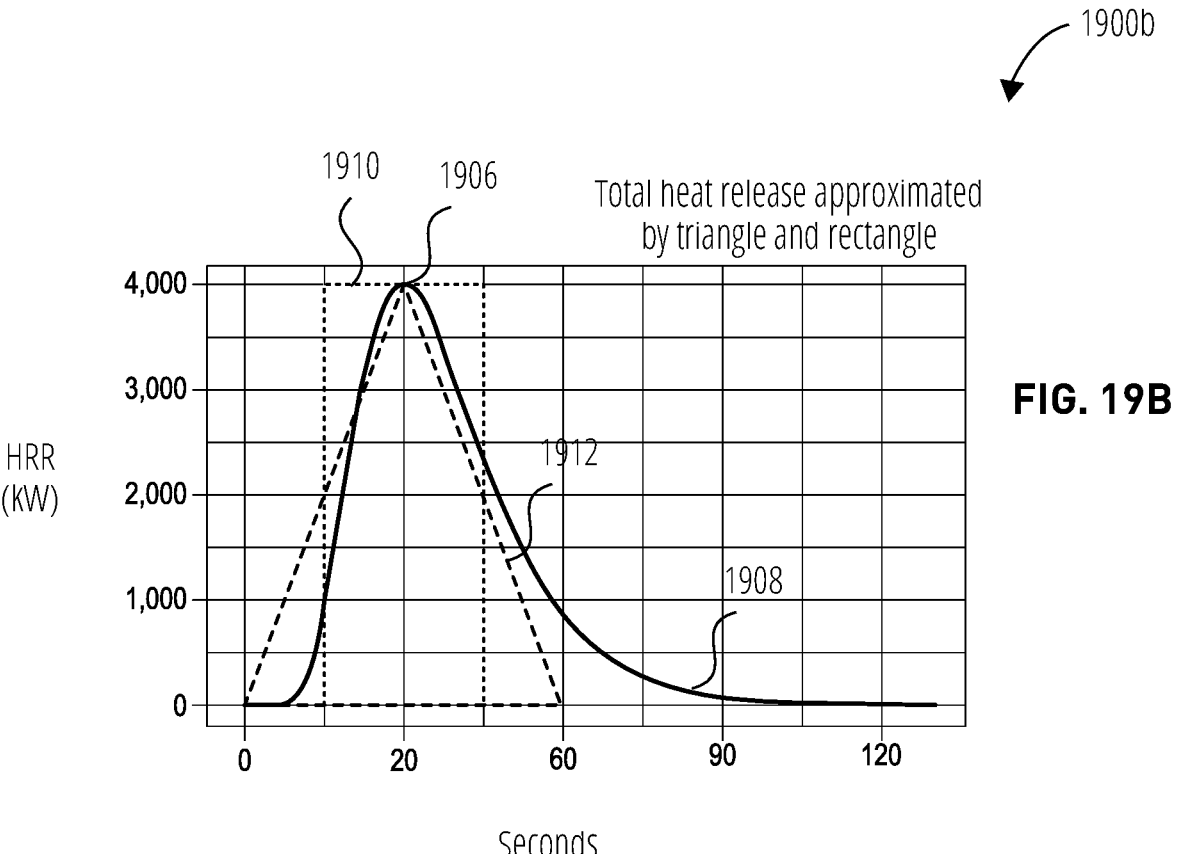
FIG. 19B illustrates a typical large tree heat release rate (HRR) 1900b in accordance with one embodiment.
Figure 19C:
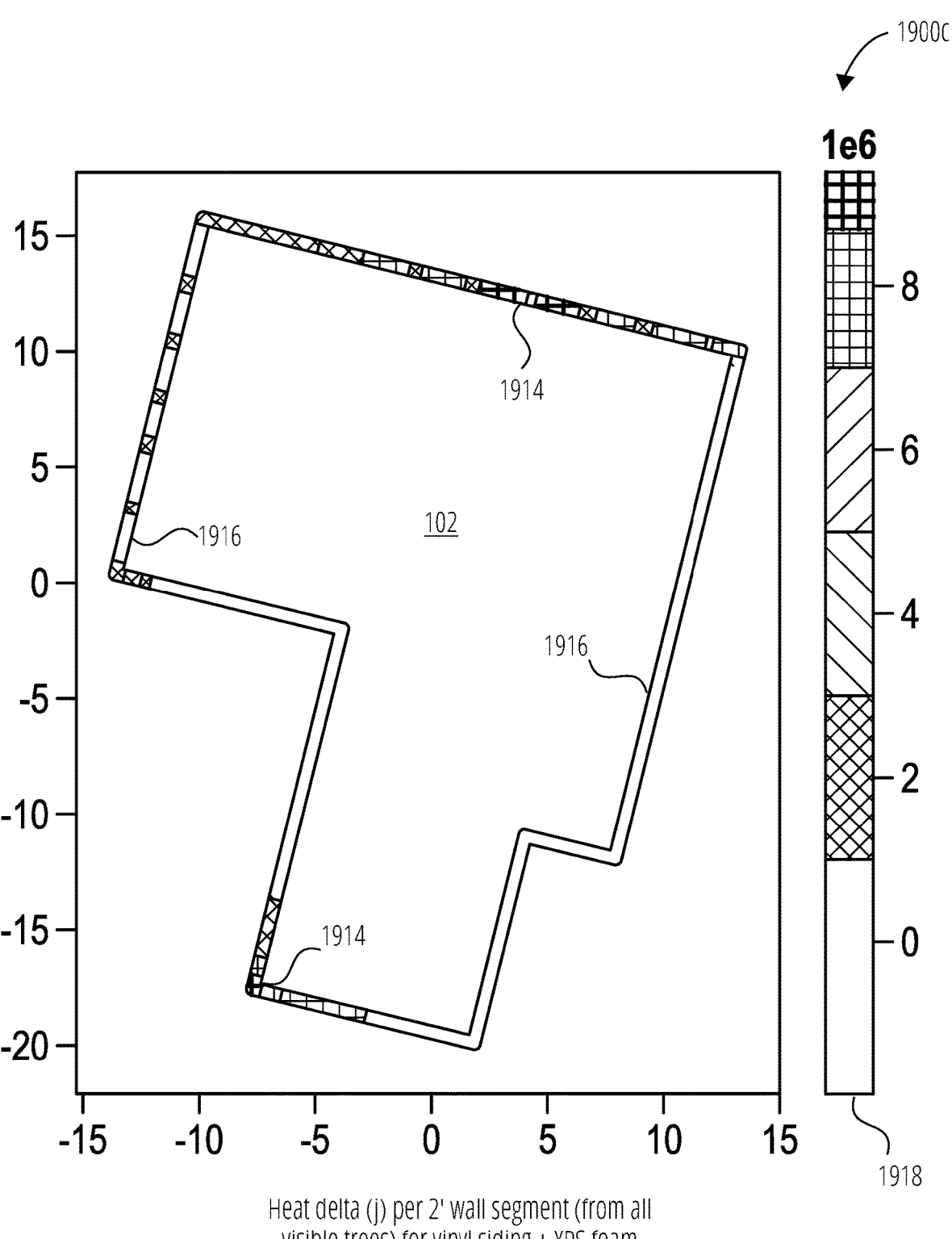
FIG. 19C illustrates a heat delta map 1900c in accordance with one embodiment.

These three modes of wildfire fire transmission form the physical basis of the thermodynamic threat vector analysis. Not all structural elements are vulnerable to all threat vectors, and given that each threat vector represents a different physical phenomenon, the impact of each threat vector may be modeled separately, starting at 802 of FIG. 8:

1. Flame front contact for direct flame impingement (convection, see 804 in method 800), determined by considering—True/False: Is there flame touch? (per wall segment in the 2'×2' tiles in grid 1208).
   a. Thus, per FIG. 20A, crown flame length L and angle α for each tree may be computed. See FIG. 20A for additional details.
   b. All of wind direction and magnitude, crown heat, canopy bulk density, flame length and flame angle may be computed using known approaches, making various assumptions, which may vary over time to increase accuracy. Such all may have an impact on threat vectors caused by convective heat, as may be seen by the impact of changing wind vectors in FIG. 20B and FIG. 20C.
2. Heat flux for radiant impact (see 806 in method 800), determined by considering Joules under/over to ignition (per wall segment in the 2'×2' grid tiles in grid 1208).
   a. The rate at which radiant heat (or any heat) is transmitted to a substance determines whether or not the temperature of the substance rises (the substance may absorb, transmit, reflect, and re-emit heat). If the heat per unit time (heat flux) is sufficiently large, the temperature of the receiving material may rise. The PIM determines ignition of a material at a location by whether or not total heat flux incident on that location causes the temperature of that material to exceed its ignition temperature.
   b. From a fuel of given shape, emissivity, and temperature, the incident radiant heat flux at a structural element is function of view factor (i.e., the share of total radiation from a source that is incident on a receiver/structure tile) which is in turn a function of source shape, structure shape, the relative orientations of the two, and the distance between them—as shown in FIG. 19A.

c. Heat flux from tree combustion follows a log-normal (LN) distribution, as may be seen in FIG. 19B.

d. FIG. 19C shows heat for each structure tile.

Figures 25A, 25B:
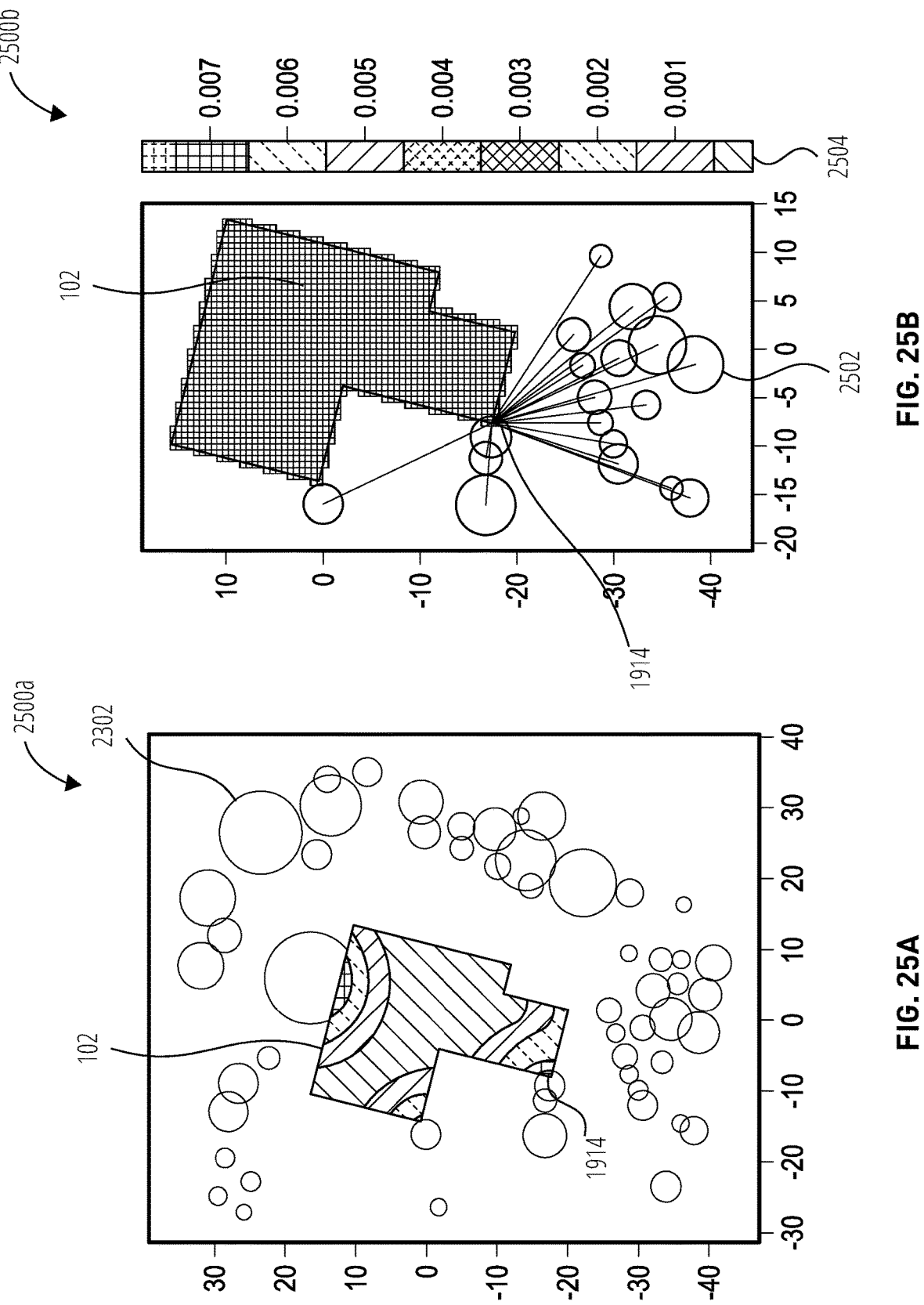
FIG. 25A illustrates an impact from fuel sources within ember throw distance 2500a in accordance with one embodiment.
FIG. 25B illustrates fuel sources contributing to failure due to embers 2500b in accordance with one embodiment.

3. Ember mass accumulation and size population for firebrand accumulation (see 808 in method 800), determined by considering kg of ember under/over to burn through (per roof tile segment in the 2'×2' structure tiles in grid 1208);

a. The failure calculation comprises both a load calculation and an ignition calculation. As shown in FIG. 24, fuel sources 104 may either be within ember throw distance or not. Those outside of ember throw distance may be ignored for these calculations.

b. Ember downrange mass projection in a given direction follows a LN distribution as may be known, based on variables such as wind speed. For PIM, embers at each distance may be considered to fall within a perpendicular range equal to the crown width along a path in the direction of the effective wind. Ember mass accumulation from tree i on surface element j falling within 12 crown width of the downwind line from the tree and less than 22.6 m from the tree is $me_{ij}=0.0015M_{ti}\delta e_{ij}$ where M is the mass of the tree or fuel source 104, and $\delta$ is the ember mass share from fuel source deposited on a given tile.

c. Ember mass accumulation may occur on flat roof tops, gutters, gable junctures, re-entrant corners on wall sections, or anywhere with abrupt changes in wind velocity. Embers falling out of the air stream at wall sections may fall to the nearest horizontal surface creating piles on sills against doors and windows, decks against siding, and ground abutting footings. Accumulated embers transmit heat through conduction and radiation, both measured as a heat flux density. For modeling purposes, wall and roof segments may assume the area of the grid square. Tests on wood demonstrate reliable smoldering combustion at ember densities of 0.247 g/cm². For $M_{e,j}/A_j>0.247$ g/cm² burn-through occurs on roof segments made of wood or thin coatings over wood where $A_j$ is the effective area of the roof or wall segment j (the grid area).

d. As in FIG. 25A and FIG. 25B, fuel sources 104 whose ember throw distances 2404 reach structure 102 may remain part of ember mass accumulation calculations, resulting in the impact on each tile of structure 102, with impacts ranging from innocuous, as in unaffected tiles 1916, to failure, as in failed tiles 1914. FIG. 25B shows the fuel sources within ember throw distance 2502 that contribute to the failed tile 1914.

Figures 23A, 23B:
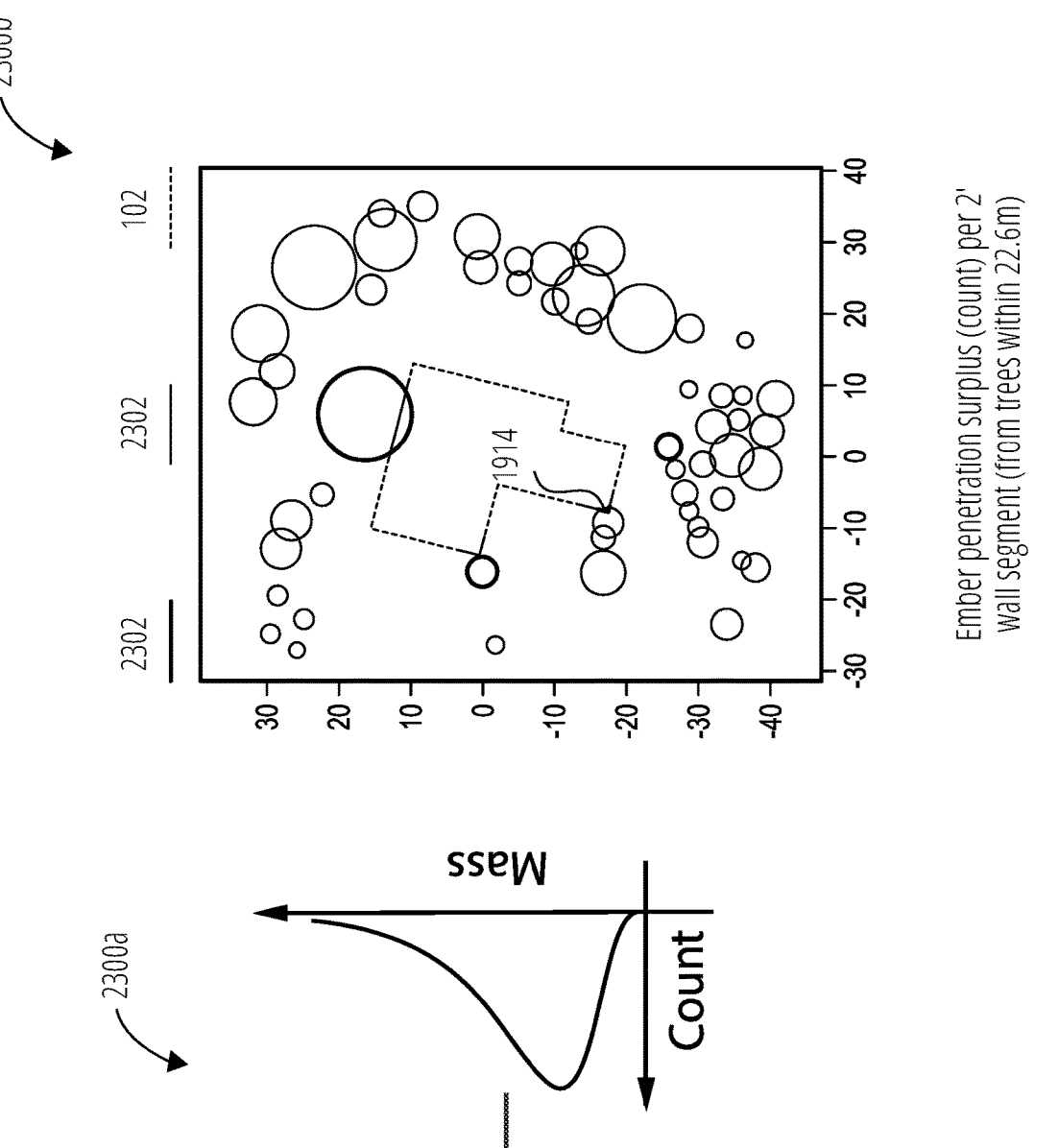
FIG. 23A illustrates an ember mass distribution at a given distance 2300a in accordance with one embodiment.
FIG. 23B illustrates ember penetration surplus per wall segment 2300b in accordance with one embodiment.

4. Ember penetration probability computation (see 810 in method 800), determined by considering the number of embers under/over to burn through (per roof tile segment in the 2×2' structure tiles in grid 1208).

a. At any given downwind distance from a tree, ember particle mass has a distribution as per Figure FIG. 23A.

b. Given the mass and mass distribution at a structure segment j, the population of a given ember size, the mass share at a distance for embers with mass less than 0.01 g and populations of embers <4 mm at structure segment j may be computed. As shown in FIG. 23C, various fuel sources 104 (fuel sources within ember throw distance 2302) impact ember penetration for a given structure tile (being a roof tile or soffit tile). The collective possibility of ember penetration is thus the sum of each fuel source 104 (fuel source within ember throw distance 2302) releasing suitable embers. Given scale 2304 in FIG. 23C, no ember penetration is expected except at failed tile 1914 in FIG. 23B.

c. Ignition from ember penetration through soffits may be modeled as a probability based on:

1. interior attic (rafter, joist, sheathing shaded area) space i. temperature, ii. relative humidity, 2. corresponding 1 hour dead fuel moisture content, 3. the probability of ignition (per ember) as determined by 1 and 2, and 4. number of ember particles penetrating into the space.

d. Soffit panels are typically 12'×16". Seams per structure segment then are, on average, $N_s=S_g/12$ where $S_g$ is the grid size (side length). Assuming a 4 mm soffit seam gap, the exposure area per segment area ratio may be calculated. The number of embers penetrating the soffit gaps then is $N_p=N_{ei,<4mm}\delta x$. The total ignition probability from ember penetration is then $P_{ep}=N_pP(\text{ignition}|1h\text{-MC, T})=0.2N_p$. This value may be greater than 1 indicating a surplus of embers penetrating over and above what may cause ignition.

e. Surplus may then be calculated as well.

PIM Simplifying in Assumptions

To facilitate computations, PIM may make several, simplifying assumptions based on the common general knowledge that do not significantly impact the accuracy of the model results:

1. Home ignition is a function of the home's structural features and the immediately surrounding fuel sources.

2. If any structural feature fails (ignites or breaks), then the entire home will ignite.

3. Assume extreme spread rate and intensity, i.e., assume a worst case scenario in which everything burns simultaneously, thus applying maximal heat flux and ember accumulation onto the structure.

4. Consideration of radiant heat, flame impingement, piloted ember and firebrand accumulation may be sufficient to determine ignition and thus destruction or survival of a home in wildfire conditions.

5. Consideration of major point source fuels (i.e., trees, large shrubs) is a good proxy.

Some embodiments of PIM may consider additional fuel source categories.

6. All fuel sources within a 20 m radius of the home centroid burn.

7. Trees release all heat under characteristic heat release rate curves (see FIG. 19B).

8. Large trees release between 0.08% and 0.15% of their mass as embers when burned.

9. Computational resolution is performed on the order of 50 cm (2 ft) and in 2-dimensions without loss of accuracy.

10. Various formulas and approaches for determining projections onto surfaces may be used, such as view factor computations, tile normal calculations, point source to flat wall, planar source to flat wall, cylinder source to flat wall, sphere source to flat wall, and the like.

Accuracy may improve as the feature detection algorithms (i.e., 506-508) improve and more data sources provide additional, and more accurate, data on the fire susceptibility of individual materials of structure 102, characteristics of fuel sources 104, and knowledge about wildfire.

Tile Failure Calculation

The likelihood of ignition of a tile by any of these vectors is a function of the data and variables encoded in grid 1208, as part of the structure dataset, the spatial relationships between them, and the specific attributes of each individual element. To exemplify this, consider fire spread from a large 1-ton tree to a structure 102 with stucco siding. The PIM considers the total heat released by the tree under combustion, the heat capacity of stucco, the ignition temperature of treated wood, the distribution of ember size by distance from the tree, and several other attributes that, when taken together, fully characterize fire transmission between the tree and the structure (see 812 in method 800).

In practice, PIM evaluates whether each exterior structural element of a given home ignites under the influence of each of the four threat vectors summed over all fuel sources with direct access to each exterior structural element (see 812 in method 800). The impact of each of the four threat vectors may be summed over all "line of sight" fuel sources (e.g., a tree "on the other side of the house" may have no impact) at each structure tile. Then, for each structure feature at that tile location, an ignition (failure) determination may be computed (see 814 in method 800):

1. For radiant heat, the total incident heat flux may be used in combination with tables of structural material heat capacities to determine if ignition temperatures are reached.
2. Breaking temperatures may be used in the case of window glass.
3. If the flame front occupies the same coordinates as a structural tile, that tile may be assumed to ignite/fail.
4. For roof tiles, accumulated ember mass may be used to determine whether or not burn-through occurs.
5. For wall tiles, sub 0.01 g ember populations may be used to probabilistically determine if embers penetrate vents.
6. Each of the four vectors may be summed, for each structure tile, to arrive at an visual overall failure view, as in FIG. 26, where scale 2602 indicates that areas around failed tiles 2604 and failed tiles 2606 failed.

Ignition failure determinations may evolve. For example, specific determinations for new materials or material interfaces (where brick and windows meet) may be added or updated to reflect advances in specific research in the area, without changing the overall PIM and approaches described herein.

Wind is an additional variable for the PIM. Since wind direction may affect the impact of any given fuel source on each roof or wall tile, threat vector outcomes may be computed nine separate times: once for wind from each of eight compass headings and a "no wind" case to cover worst case conditions for each structure tile. The model considers, for example, that a wind out of the north-east may yield maximum heat and ember transfer to structural elements on the north side of the house, but a south-west wind may yield little impact on those same elements. In that situation, the north-east results may be used for evaluation.

Tile Failure Cataloging

For each structure tile for which the model determines an ignition (failure), PIM catalogues the following (see 816 in method 800 and a visual representation in FIG. 26):

1. Tile location,
2. Feature (or features) that failed,
3. Threat vector (or vectors) that caused each of the feature failure(s),
4. Individual fuel sources contributing, or summing, to each of the specific vector—feature failure(s),
5. Wind direction(s) during failure,
6. Failure Surplus—a measure of "how close" the feature came to non-failure/non-ignition. For example, a feature might fail at 2 kJ/m$^2$ of accumulated heat flux over the combustion period. The model determines that the feature fails because the incident heat at that tile is 2.5 kJ/m$^2$. Thus the "failure surplus" is 0.5 kJ/m$^2$. The "failure surplus" may be useful for determining the remediation classification. Large surpluses indicate more extensive remediation may be needed (or may not be possible), whereas small surpluses may need less extensive remediation.

Risk Scoring

As part of 512, risk scoring may occur—taking the output of PIM and determining a risk of ignition, in a quantitative way (for example to allow quick comprehension, comparisons between properties and portfolios and mitigation or hardening impacts). Risk scoring may be based on one or more known risk scoring approaches, such as failure mode effects analysis, tailored to the assessment of fire risk for buildings such as structure 102. Risk scoring may take the output of the PIM and calculate or compute the risk that a particular property, or amount of a portfolio, may ignite. In a risk assessment, surplus heat may be the characteristic that is primarily used.

Risk scoring may take into account, or highlight, differences in heat surplus between properties/portfolios. For example, a building that burns at 1 m joules and would expect to experience 4 m joules of surplus heat in a wildfire (Building X) versus a building that burns at 500 k joules of heat and would expect to experience 10 k joules of surplus heat in a wildfire (Building Y). A given user 404 may view Building X as higher risk than Building Y, but if the absolute or percentage surplus heat was the same, Building X may be viewed as equally risky as Building Y, by a given user 404. A given user 404 may also set thresholds for acceptable risk, or for how buildings are scored or categorized based on surplus heat or surplus heat percentages, and the like. One user 404 may decide "high risk" is more than 500 k joules of surplus or more than 20% surplus for a particular tile to fail, while another may set those values at 100 k joules or 10%. System for wildfire risk assessment and mitigation 200 may allow for various parties and thresholds to be established and used—for example for mitigation and hardening, and monitoring.

With the modeling approach described above, each fuel source 104 and structural element or tile in scope may be backed by specific calculations for thermal energy output, probability of ignition, and remediation opportunity.

The rich level of included in a structure dataset and assembled at 510 may be helpful because these calculations may vary considerably from item to item. For example, a short tree with a small crown may have a much smaller thermal energy output potential than a tall tree with a large crown.

All failure items may be compiled into a modified Failure Mode Effect Analysis (FMEA) framework, and the relative risk of each item may be quantified in a risk priority number (see 818 in method 800).

While the risk scores are computed on the basis of threat vectors, to aid understanding of the risk score, they may be presented within the context of standards set by the Insurance IBHS. The model may consider four discrete risk zones:

1. Home Ignition Zone (HIZ): The structure 102 itself and a boundary of 5 feet minimum from the structure 102, inside the line 1202.
2. Zone One: 5 feet to 30 feet from the structure 102, inside the line 1204 and outside the line 1202.
3. Zone Two: 30 to 100 feet from the structure 102, inside the line 1206 and outside the line 1204.
4. Zone Three: 100 to 500 feet from the structure 102, outside the line 1206.

Once each threat vector risk score is computed, a cumulative risk score may be calculated for the entire property based on threat vector contributions to ignition failure points. The risk score may incorporate the compounding effect of risk from multiple threat vectors on a structure. This also helps in understanding contributors to ignition, as most items may fail due to a cumulative effect of heat flux from multiple sources. A risk score may be a single score, multiple scores, or a single score made up of multiple underlying scores. Scores may be classified as low/medium/high, or any other system. Multiple users 404 may set their own scores and classifications, based on the PIM outputs.

It is also important to understand that each failure item may be attached to multiple fuel sources and there may be overlap between them. The risk scoring may be in addition each individual failure item, to properly represent each failure and the point at which it fails. This allows showing multiple failures in the same location of a home. For example, a wall section (particular tile) where a window and siding both may fail, but at different points. Reducing one risk may or may not eliminate the adjacent risk. Importantly, the risk prioritization approach may augment a typical FMEA framework in two ways:

1. Traditional detectability scoring may be replaced with remediation scoring. This reflects the ability to address remediation in a failure event.
2. Risk prioritization considers failure contributions and surplus amount to subsequent related structure failures. Because a wildfire advances inward from Zone 3 to the Home Ignition Zone, each zone has a quantifiable risk impact on its interior (i.e., zones 2, 1 and HIZ).

Method 800 may then return to method 500 where, at 514 results may be presented to a user 404, digitally on one or more screens of computing devices or physically via written reports, where all supporting calculations, images, and features evaluated throughout the analysis may be retrieved and examined with each component for review. This allows a component-level view of risk for a property, and a component-level remediation plan to mitigate risks.

From a system and data perspective, at the end of this process each risk component (structure feature or tile or fuel source) may be a separate structured data object that may include a risk score, a "treated" risk score, and a mitigation treatment. These data objects and the granularity they represent serve as the foundation for MMS 216, informing the downstream integrated service delivery and logistics around approvals, scheduling, pricing, billing, and other services.

This allows viewing of results in a more meaningful way than schemes that classify structures as High/Medium/Low risk, for example.

Expert Risk Analysis and Onsite Inspection/Review

When a risk assessment is compiled using system for wildfire risk assessment and mitigation 200 the results may be reviewed by an expert fire risk analyst, who may be a user 404, as part of method 500, for example at 512. By having the data collection prepared for review, an analyst may focus on anomalies in the property that need additional attention, adjustments to scoring that may be needed to accurately reflect risk and provide review of the machine learning determinations. This process may also serve as a feedback loop for machine learning algorithms described herein, to train and enhance risk models. Over time, and based on requirements of users 404, such as insurers, analyst review may be leveraged selectively for high-risk properties and for spot reviews.

Mitigation

At 516 method 500 may consider whether mitigation options are desired. This may include showing or highlighting mitigation, that may already have been determined at 512 (also as shown in FIG. 27 and FIG. 28) and may involve further considerations as described herein with respect to FIG. 9. If mitigation options are desired then method 500 may proceed to method 900, either as method 500 continues or waiting for method 900 to end.

To accomplish this, system for wildfire risk assessment and mitigation 200 focuses on risk factors that the homeowner may control and provides a clear path forward to address them. Proper mitigation may reduce the probability of ignition and greatly increase the chance of survival in the event of a proximate wildfire. System for wildfire risk assessment and mitigation 200 identifies, or has identified, the contribution of each fuel source to specific feature failures and thus provides a framework for prioritizing mitigation. In addition, since the zone of the contributors is also identified, it is also much easier to determine actionable mitigations vs. those that may be out of the purview of the owner.

As above, an output of the risk assessment may be a rank-ordered list of Ignition Failure items and the associated elements (fuel sources) in each zone that contribute to ignition. While the interaction of fire with the set of risk features for a given property may be complex, the features themselves may be discrete and may be specific to zones, thus lending themselves to prescriptive actions in the risk mitigation step. And as each threat vector evolves differently across the defensible space zones, the objectives of the basic mitigation steps also change as one moves through the defensible space zones and approaches the structures.

Effective remediation may include such activities as tree trimming, brush and tree removal, home hardening, sealing of vulnerability points, and removal of ignition spots. Because a multitude of services may be needed to lower fire risk below an acceptable threshold, scale and standardization may be needed to make effective remediation accessible, viable, and affordable for individual property owners. MMS 216 may include a platform that connects homeowners to the specific service providers they need based on their initial risk assessment and mitigation options selected or recommended. The precision and granularity of PIM enables prescriptive planning, predictable pricing, and efficient resourcing. A significant additional value to this service may be the formal recording of the mitigation efforts and outcomes—which may be ingested back into method 500 to update risks and failure assessments, giving a record of the reduced risk resulting from the mitigation work.

System for wildfire risk assessment and mitigation 200 may allow leveraging both an existing internal service organization (i.e., part of the entity running system for wildfire risk assessment and mitigation 200) as well as external providers to execute the mitigation services. Networks may be positioned to supply resources for ongoing remediation work as well as imminent threat response. In each case, the trade skills needed for mitigating the risks of a specific property may be identified and dispatched once a mitigation plan may be agreed upon with the homeowner. Mitigation plans may be reassessed prior to any mitigation work to confirm that the prescribed remediation work may reduce risk to acceptable levels, and service execution may be tracked by all parties via the platform, such as via computing devices and websites and apps.

The various datasets described may feed the MMS 216. Each object includes the scoring elements described previously. In addition, each object has additional elements and values including Type (Structure or Fuel Source) and Mitigation Treatment (seal via screening, low branch trimming, tree removal, fire retardant application, etc.—which may be classified or described and stored so that the indicated services or technicians may easily be identified and dispatched).

Turning specifically to method 900, mitigation aims to proactively and preemptively protect the property or structure 102 from ignition in two ways: hardening the structures to ignition, at 904, and reducing fuel loads surrounding the structure, at 908.

Method 900 begins at 902 to consider if hardening is to be performed. This may involve factors such as budget, and whether any hardening options may be available for a particular structure 102 (what materials is structure 102 made of, how valuable is structure 102 relative to the cost of hardening, and the like) or location of structure 102 (how far is it from a hardening provider or materials to provide hardening)—including an assessment of whether hardening is the efficient and may be effective, based on the failures and causes of those failures. This determination may be made by a user 404 or in an automated fashion (for example automated calculations of the efficacy and efficiency of hardening).

If hardening is to be performed then it is performed at 904. This may involve, for example, replacing certain materials used in structure 102 (bricks for siding, etc.), sealing soffits, removing features of structure 102 (removing or replacing wood decks), or applying fire retardants to minimize/eliminate ignition risk for one or more tiles (or areas of tiles) that were identified as being subject to failure, or near failure (for example some form of buffer or threshold above which a structure tile may have retardant applied to it).

Method may then continue to 906 to consider if fuel source reduction is to occur. This consideration may be akin to the consideration regarding hardening, but directed at fuel source reduction, and may involve further considerations, such as entitlement to reduce/remove a particular fuel source 104.

If fuel reduction is to be performed, then it is performed at 908. This may involve, for example, pruning and removing fuel sources, or applying fire retardants to minimize/eliminate ignition risk for one or more fuel sources that were identified as leading to structure tile failure, or near failure (for example some form of buffer or threshold above which a structure tile may have retardant applied to it).

Fuel sources such as trees or other flammable objects on a property are often completely removed to bring down the chance of failure from any of the failure vectors described herein. Additional data provided by the disclosed solution may permit modeling of limb removal on a tree, up to a specific height, not only reducing the mass of flammable material held in the tree, but also increasing its distance from wall segments of the nearby structure. Removing limbs may preserve a tree while still moving its potential flame ball up vertically, moving the flame touch away from the structure, and in some cases moving the convective source away from the structure, reducing radiant and convective heat contributions to ignition. Finally, removing limbs may reduce ember output, thus reducing the build up of embers for either accumulation failures or entry failures. In one embodiment, the approach may be to evaluate each major contributor (tree in this case) and, based on data collection about the tree (height, max trim height, radius reduction, height of roof), to determine if trimming tree(s) instead of removing them may adequately reduce ignition risk. This solution path may appeal to home owners from both an aesthetic and cost perspective, and represents an improvement of the disclosed solution over conventional approaches.

It is to be understood that hardening and mitigation options, and selection, may be manual or automated (such as against set criteria for cost, effectiveness, etc.) and may be determined by a user 404, such as the property owner or an insurance company, with the owner's permission for example. A manual approach may be desired, as mitigation may involve impacting structure 102 and fuel sources 104 in ways that impact more than wildfire risk—for example a favorite old tree, a deck that the owner enjoys using—which may impact mitigation or push towards one solution over another.

In cases where manual mitigation is considered, in addition to the underlying data, various visual representations may assist in assessing remediation options. For example, FIG. 27 may show heat output per fuel source 104, where fuel sources such as fuel source 2702 may be relatively innocuous, whereas a different shade fuel source 2704 may be a remediable factor, or mitigation fuel source—at least for one threat vector. Some mediation, such as removable of one or more fuel sources, may not be possible (or may need further approvals) given fuel sources 104 may be outside property line 2802 for structure 102, thus on another property, as shown in FIG. 28, or legal requirements may apply to tree removal.

MMS 216 may allow approvals for mitigation and accept payment for mitigation services performed, and may provide payment to users 404 that performed the mitigation steps.

It is also to be understood that 904 and 908 may happen in any order and one may end before the other—mitigation may be a long process (i.e., hours to months or longer) based on what is selected and how long it takes to perform.

Monitoring and Protection

One of the challenges facing property owners and their insurers is the dynamic nature of wildfire risk. Current approaches generally treat the risk as static either out of a need for simplicity or efficiency. As surrounding vegetation changes and properties undergo maintenance, remodeling, or landscaping, new risks emerge and previous mitigations lose effectiveness. To address this challenge, system for wildfire risk assessment and mitigation 200 and MMS 216, enables ongoing monitoring and remediation services customized to the specific needs of a given property. Applicable service subscribers or structures 102 may benefit from scheduled maintenance, routine inspection, and real-time alerting on changes to the risk profile, allowing homeowners, their insurance brokers and insurers, to understand and accept that wildfire risk assessment and protection is not a once-a-year exercise.

As with PIM, monitoring may be fully integrated to system for wildfire risk assessment and mitigation 200, allowing property owners to easily respond to critical events. If there is an imminent risk to a property, there may be fire retardant on site, a prescribed mitigation plan, service providers on call, with an app to coordinate communications (such as via screenshots like those shown in FIG. 16). This makes for much more effective incident response by eliminating many of the steps that are typically involved in deploying effective property protection services. With continuous monitoring and on-demand service providers, properties may be pre-treated at scale in front of very high-risk time windows.

Returning to the methods described herein, method 500, at 518, may consider whether monitoring options are desired—either for individual structures or properties or for portfolios—leading to method 1000.

Method 1000 may include ingesting and/or updating various information and data from various data sources (collectively "monitoring data") at 1002, analyzing the monitoring data at 1004 (such as by re-running PIM, validating the data, and the like), and then continuing to 1006 to assess whether any monitoring actions may be indicated.

Monitoring actions may include: notifications (to insurers, system for wildfire risk assessment and mitigation 200, users 404 such as homeowners or service providers, and the like) for updating or decision-making purposes, dispatching (of service providers, for example), and other steps that may be useful to both learn of the update, and make and implement any decisions indicated. The data (underlying PIM and the monitoring data and updated PIM) may be viewed at any time by an authorized user 404 for a given structure 102. If mitigation options are desired then method 500 may proceed to method 900, either as method 500 continues or waiting for method 900 to end.

At 1008 monitoring actions may be performed, at which point method 1000 returns to the "steady state" of continuing to monitor a given structure 102 or portfolio at 1010. Method 1000 "ends" at 1010, and may in one embodiment return to 520 method 500, but may also continue until monitoring is no longer desired.

Method 1000 may be triggered other than via method 500 or continue separate from method 500. In one embodiment a given structure 102 or property may be ingested via method 500 and then move to mitigation (method 900) and monitoring (method 1000) until those are disabled.

Figure 18:
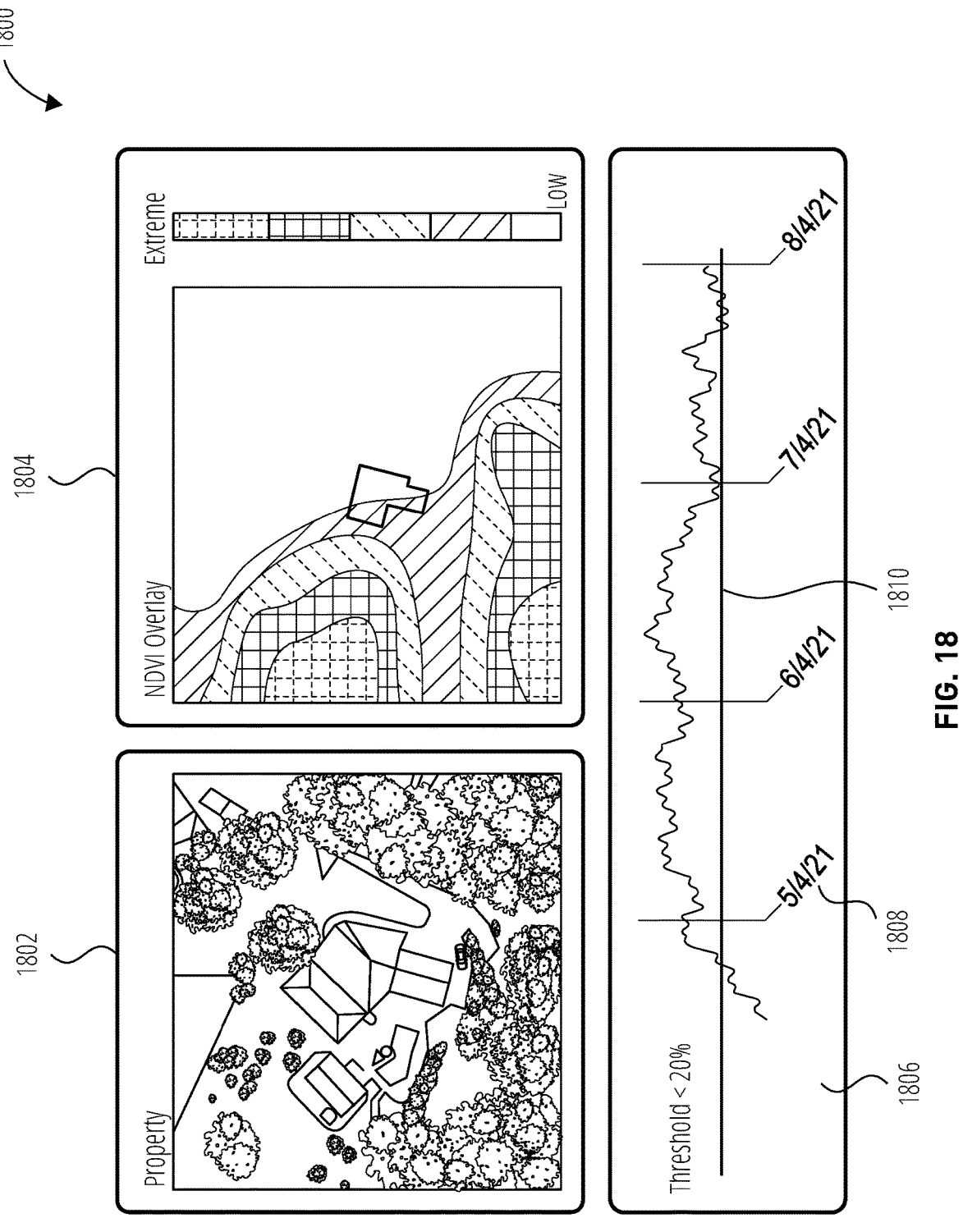
FIG. 18 illustrates a normalized difference vegetation index 1800 in accordance with one embodiment.

Method 1000 may be implemented and used in MMS 216 and for example via one or more screenshots such as the screenshot of normalized difference vegetation index 1800 shown in FIG. 18, where various user interface elements may allow for one or more users 404 to interact with system for wildfire risk assessment and mitigation 200 and method 1000, according to their roles and authorizations.

By way of example, the screenshot of normalized difference vegetation index 1800 (NDVI) in FIG. 18 has one or more user interface elements 1802, 1804, and 1806, that may assist in monitoring. Property view element 1802 shows the property, NDVI overlay element 1804 shows vegetation and vegetation stress around structure 102 in property view element 1802 (how much vegetation and/or vegetation growth has occurred), along with a legend that may help a user understand how much stress, or risk, there is surrounding property 102. NDVI timeline element 1806 shows NDVI information over time, assessed monthly 1808 in NDVI timeline element 1806, and set against a threshold value 1810 of <20%, which may be a suitable or desired threshold (adjustable for a given structure 102, user 404, or the like) for triggering mitigation, alerts, or simply for guidance in viewing the dashboard screen for the normalized difference vegetation index 1800. The threshold may be calculated in various ways, but for example by summing a vegetation score for each tile and taking the average. There may be numerous ways of depicting the information and enhance the monitoring experience. While the screenshot of normalized difference vegetation index 1800 shows aspects for monitoring vegetation, similar approaches and elements may be used to monitor other factors, such as moisture.

Monitoring Data

The following data may be included in monitoring data, in addition to other data included and described herein (for example that may be included in structure dataset and/or fuel source dataset):

1. Normalized Difference Vegetation Index (NDVI). This index has been in general use in agriculture since the 1970's, but is now enabled for broader coverage due to the availability of daily satellite data at a property level.
2. Normalized Difference Red Edge (NDRE). This is similar to NDVI, but much more sensitive to the Red and Near-Infrared bands of light. Having near Infrared data may give early indicators of heat stress. This may be used in conjunction with the NDVI to get ongoing measurements of vegetation at a property level.
3. Moisture Level Detection using Normalized Difference Moisture Index (NDMI). Monitoring for water stress is a very good early indicator of increased fire exposure risk and points to taking preventative or mitigation measures, including application of fire retardant.
4. Heat Index Monitoring. Heat index monitoring also gives a relative indicator of heat stress at a property level.
5. Weather Forecasting. Including Precipitation, Temperature, Relative Humidity, Wind Speed, and Wind Direction monitoring. Combined with forecasting, to evaluate evolving risks to every monitored property.
6. Active Alerting from Wildfire Monitoring Services. Inciweb, AirNow fire and smoke, National Wildfire Coordination Group, National Wildfire Situation Awareness, Global Forest Watch, Calfire Incidents Map This list of monitoring data may grow to include additional wildfire monitoring tools and social media in order to have the most up-to-date data on ongoing and emerging threats.

Method 500 may end, at 520—noting, as described, that method 900 and 1000 may continue despite method 500 largely being complete at a given time.

FIG. 11 illustrates a routine 1100 in accordance with one embodiment. Similar to method 500, system for wildfire risk assessment and mitigation 200 may be configured to performed routine 1100.

In block 1102, at least one image of a property, may be received to the disclosed system, such as system for wildfire risk assessment and mitigation 200. The property may comprise at least one primary structure. In one embodiment, an address or a set of locating coordinates may be received, and the disclosed system may be configured to collect at least one image from a connected database indexable by address or locating coordinates.

In block 1104, the system may identify structural features of the at least one primary structure. The system may accomplish this in one embodiment following the steps in block 1106 through block 1120.

In block 1106 the system may determine an inventory of exterior features of each at least one primary structure on the property, wherein the features are located along a perimeter of the at least one primary structure and include dimensions and material composition. These exterior features may include decks, porches, etc.

In block 1108, the system may utilize a machine learning feature detection algorithm on each of the at least one images to characterize primary structural features used to model fire susceptibility. These features may include walls and roofs of the various blocks, wings, and projections of the primary structure.

In block 1110, the system determines at least one non-primary structure fuel source on the property and surrounding the property. This may be accomplished by utilizing a machine learning fuel load algorithm (block 1112) to complete the steps in block 1114 through block 1120. The machine learning fuel load algorithm may be used on each image to characterize fuel features needed to model thermal energy potential.

In block 1114, the system detects major vegetation including at least one of a tree and a shrub. In block 1116, the system detects secondary structures including at least one of a shed and a fence. In block 1118, the system detects neighboring rooftops within a distance of the primary structure that would contribute to advancement of a wildfire. In block 1120, the system detects at least one of a footprint of the primary structure, roof characteristics of the primary structure, and local topological features, wherein the local topological features include at least one of a slope, a road, a hydrant, and an arroyo.

Figure 15:
FIG. 15 illustrates exemplary material parameters 1500 in accordance with one embodiment.

In block 1122, the system determines a feature-specific attribute for each of the structural features of the at least one primary structure and for features of each of the at least one non-primary structure fuel sources. These attributes may be determined using machine learning analysis of the image(s) received, and in one embodiment may be editable through a user interface such as those show in FIG. 16. Parameters for various attributes may further be available in data tables that may be stored locally or accessible via a network. Such data tables may include specifications such as are illustrated in FIG. 15.

In block 1124, the system calculates a fuel load in terms of thermal energy generation potential utilizing the feature-specific attributes. The fuel load may be used in a variety of ways to determine risk scoring as disclosed herein.

Figure 12:
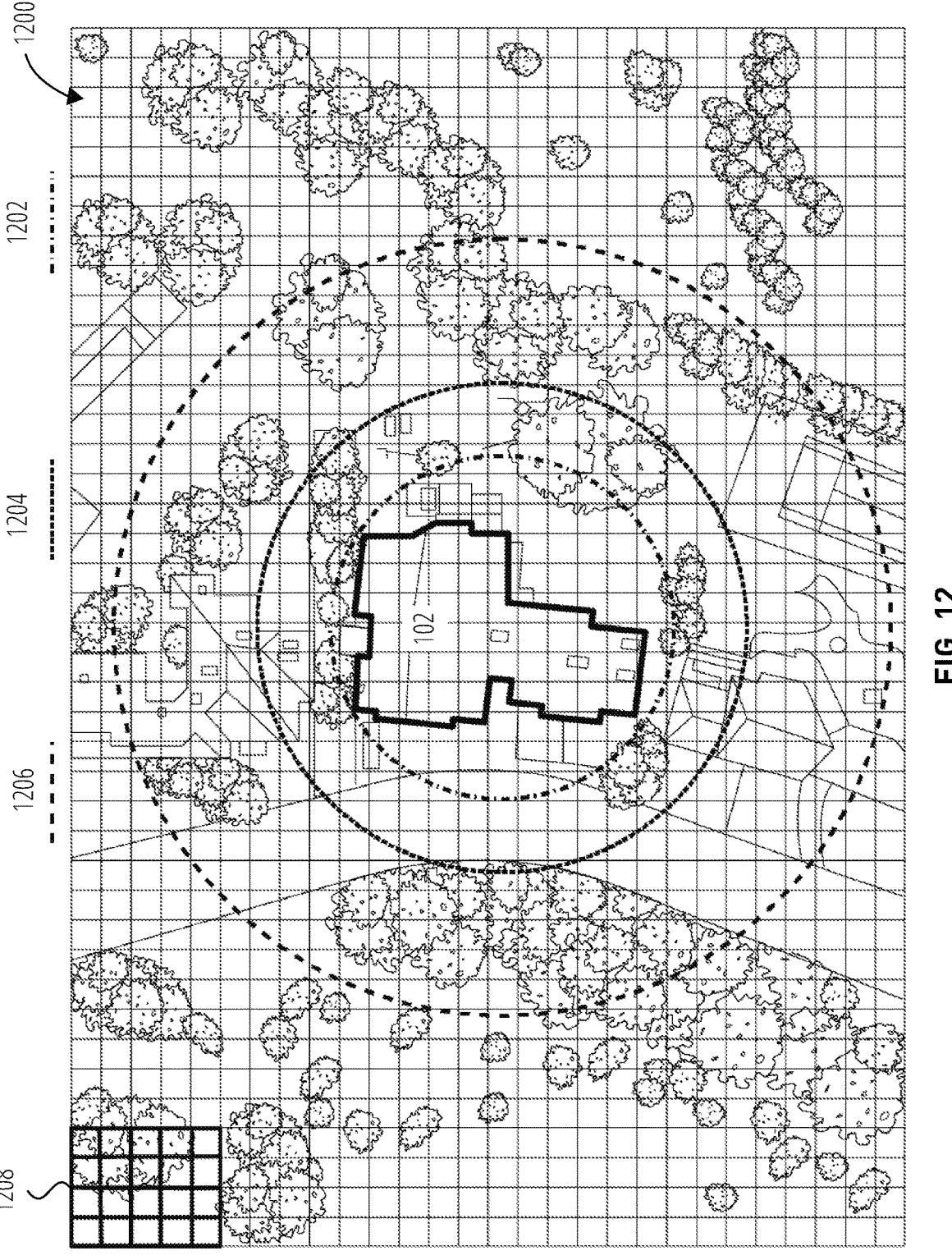
FIG. 12 illustrates an aerial view with exemplary grid 1200 in accordance with one embodiment.

In one embodiment, a routine such as routine 1100 may also include overlaying a multi-dimensional grid on the at least one image of the property, where the grid includes a plurality of tiles and divides the property into analysis points, as is illustrated in FIG. 12. Each analysis point may be represented by one tile of the grid. A centroid of the primary structure may be centered on the grid. Each tile within the grid may be encoded with associated fuel element details, structural element details, and topographical data.

In one embodiment, a routine such as routine 1100 may also include determining, when exposed to at least one fuel source, a thermal energy output and a probability of ignition failure for each of the structural features of the at least one primary structure and for each of the at least one non-primary structure fuel sources. A fire risk algorithm may be utilized that includes a plurality of threat vectors, such as heat flux for radiant impact threat vector, flame front contact for direct flame impingement threat vector, ember mass accumulation and size population for firebrand accumulation threat vector, and ember penetration probability computation threat vector. The probability of ignition failure for each of the plurality of threat vectors may be determined utilizing the structural features of the at least one primary structure, the features for each of the at least one non-primary structure fuel sources, spatial relationships between the at least one primary structure and the at least one non-primary structure fuel sources, and the feature-specific attributes for each of the structural features of the at least one primary structure and features for each of the at least one non-primary structure fuel sources. The fire risk algorithm may also include a direct evaluation routine to determine whether each structural feature of the at least one primary structure ignites under an influence of each of the plurality of threat vectors summed over all of a plurality of fuel sources with direct access to each structural feature of the at least one primary structure. The fire risk algorithm may further include a line of sight evaluation routine to determine the impact of each of the plurality of fuel sources within the line of sight of each tile, including a portion of the primary structure. The fire risk algorithm may include calculating an ignition failure determination for each structural feature at each tile including a portion of the primary structure, where the calculations include the impact of the plurality of fuel sources with direct access to the primary structure and the plurality of fuel sources within the line of sight of each tile including a portion of the primary structure. The fire risk algorithm may finally include an evaluation routine to determine whether each feature of the at least one non-primary structure fuel source ignites under the influence of each of the plurality of threat vectors. In one embodiment, the fire risk algorithm may be the fire risk algorithm 312 illustrated in FIG. 3.

In one embodiment, a routine such as routine 1100 may also include updating the fire risk algorithm by cataloguing for each tile with an ignition failure: a location of the tile, the at least one structural feature or each feature of the at least one non-primary structure fuel source that failed, each of the plurality of threat vectors that caused each structural feature and each feature of the at least one non-primary structure fuel source to fail, each individual fuel source contributing to each specific threat vector causing a feature failure, wind direction during the feature failure, and a failure surplus for each feature failure, where the failure surplus measures an extra heat flux the failed feature experienced over a non-failure or non-ignition state.

In one embodiment, a routine such as routine 1100 may also include determining an influence of wind on each of the plurality of threat vectors, including calculating an impact of each direction of wind from at least north, south, east, and west compass headings on each of the plurality of threat vectors for each tile including a portion of the primary structure, and calculating the impact of a plurality of wind speeds on each of the plurality of threat vectors for each tile including a portion of the at least one primary structure.

In one embodiment, a routine such as routine 1100 may also include determining an overall risk assessment for an entire property. This determination may include compiling a list of each ignited structural feature of the at least one primary structure and each ignited feature of the at least one non-primary structure fuel source. This determination may also include placing the list in a Failure Mode Effect Analysis (FMEA) framework. This determination may further include quantifying a relative risk of each item in the list in a Risk Priority Number (RPN) based on ignition impact by the tile and energy overage. This determination may include calculating a cumulative risk score for each of the plurality of threat vectors by evaluating the ignition failures of the at least one primary structure and calculating the energy overage and failure mode by ignition failure. This determination may also include calculating a risk score for the entire property based on threat vector energy contributions to each ignition failure. This determination may finally include generating a report. The report may include information pertaining to ignition outcomes, and non-ignition outcomes as well. The report may include risk scores for at least one of each ignited structural feature, each structural feature, each ignited feature of the at least one non-primary structure fuel source, each feature of the at least one non-primary structural fuel sources, and the risk score for the entire property.

In one embodiment, a routine such as routine 1100 may also include associating a heat flux contribution from multiple fuel sources to at least one ignition failure point, identifying multiple failures in a same structural feature of the primary structure, where the multiple failures are caused by the heat flux contribution from the multiple fuel sources, augmenting the FMEA framework to reflect the multiple failures of the same structural feature of the primary structure due to the heat flux from multiple sources, and prioritizing risks based on each of the multiple failures in the same structural feature.

In one embodiment, a routine such as routine 1100 may also include determining a remediation solution for the at least one ignition failure point. This determination may include applying the prioritized risks to generate a remediation score for the FMEA framework, thereby providing the ability to address remediation solutions in a failure event. This determination may also include incorporating risk prioritization into the FMEA framework, thereby utilizing multiple failure contributions. This determination may finally include generating a report for the at least one ignition failure point including remediation solutions based on the remediation score, where the remediation solutions include at least one of hardening the primary structure to ignition and reducing fuel loads surrounding the primary structure.

In one embodiment, the image received in block 1102 may be obtained through at least one of oblique satellite imagery, aerial imagery, ground imagery, real estate multiple listing service databases, and images from an application on a mobile device.

In one embodiment, the machine learning feature detection algorithm may characterize structural features including at least one of a window, a door, a vent, and a soffit. Other technical features may be readily apparent to one skilled in the art from the following figures, descriptions, and claims.

FIG. 12 illustrates an aerial view with exemplary grid 1200 in accordance with one embodiment. A multi-dimensional 300×300 grid 1208 at 2 ft×2 ft resolution for a total of 90,000 analysis points per property, noting that higher precision may be chosen based on computing resources and multiple calculations may be performed for each grid, as described).

The model disclosed herein may consider four discrete risk zones:

1. Home Ignition Zone (HIZ): The structure 102 itself and a boundary of 5 feet minimum from the structure 102, inside the line 1202.
2. Zone One: 5 feet to 30 feet from the structure 102, inside the line 1204 and outside the line 1202.
3. Zone Two: 30 to 100 feet from the structure 102, inside the line 1206 and outside the line 1204.

4. Zone Three: 100 to 300 feet from the structure 102, outside the line 1206.

The centroid of the structure 102 is positioned at the center of the structure grid, and every structure tile within the grid may be encoded with fuel and structure elements or structure data. For example, the structure outline or footprint may determine which tiles surrounding the center tile are roof tiles or wall tiles and each of those may be encoded with the structural materials at that part of the exterior wall (window, siding, roof material, etc.).

Figure 13:
FIG. 13 illustrates a structure and surrounding elevation 1300 in accordance with one embodiment.

Other tiles where trees are located may be encoded with the size of the tree. Other tiles may be encoded with grass or fence characteristics, and so on. Tiles also encode topographical data to allow inclusion of slope and elevation in ignition computations, as shown in FIG. 13. Once all relevant elements are encoded, relative distances and orientations between all elements may be computed for further use.

FIG. 13 illustrates a structure and surrounding elevation 1300 in accordance with one embodiment. Structure 102 is illustrated on an elevation map with showing contours indicating variation of elevation around the structure 102.

Figure 14:
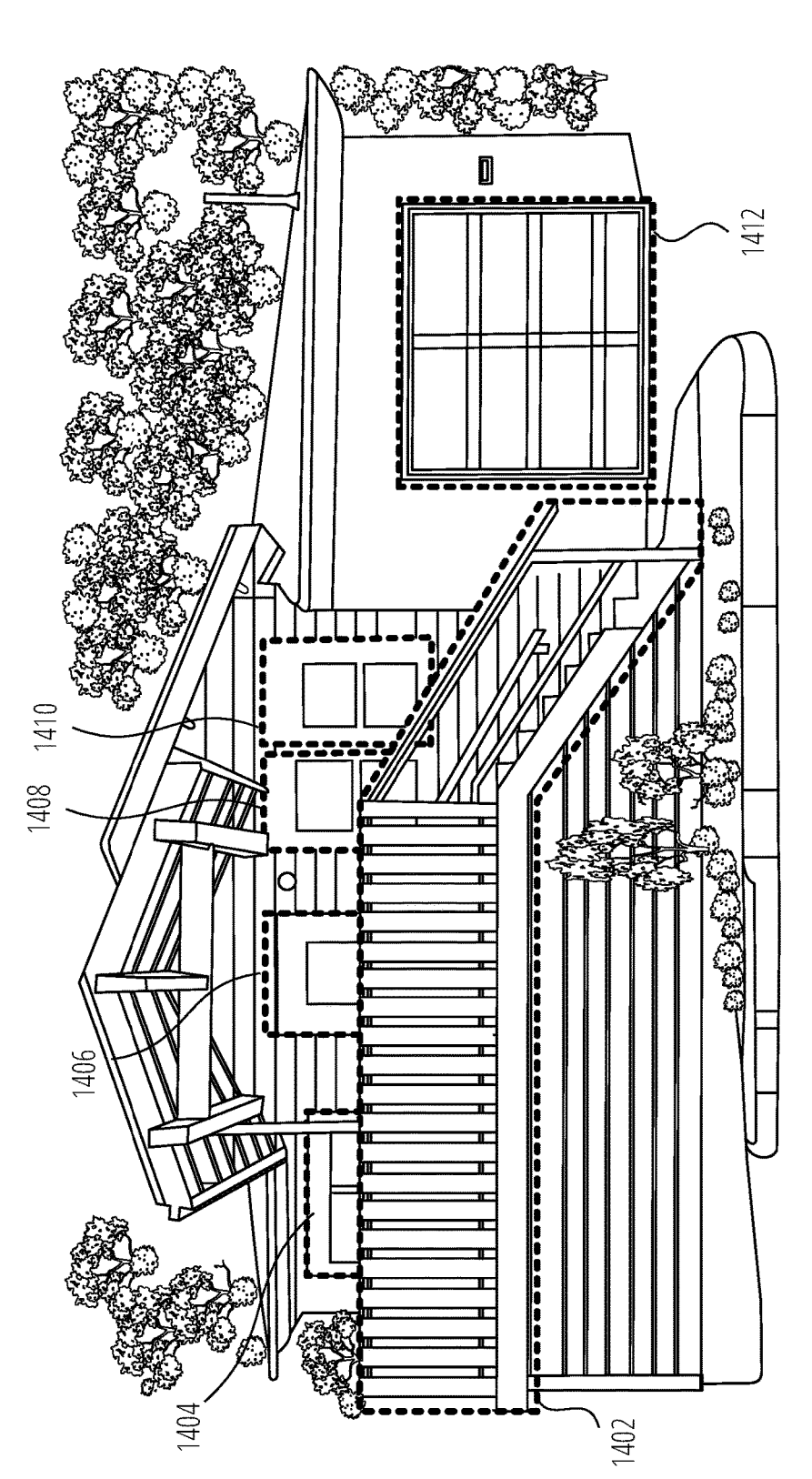
FIG. 14 illustrates structure exterior features 1400 in accordance with one embodiment.

FIG. 14 illustrates structure exterior features 1400 in accordance with one embodiment. Such features may be identified by the machine learning 310 implemented in the risk engine 300, based on input images such as satellite or Google™ imagery, or an address 302 for a structure 102 under evaluation. Structure exterior features 1400 of interest may include a front porch 1402, a front room slider 1404, a front door 1406, window 1408 and window 1410, and a garage door 1412.

The risk engine 300 may integrate data from a comprehensive set of sources to inform the model at the property-level. Machine learning algorithms may be used to identify and classify features that contribute to ignition risk, and to automate the risk assessment process. A Property Assessment App may allow confirmation and validation of the machine learning determinations while also addressing any gaps in automated data feeds.

In order to execute on the PIM methodology, system for wildfire risk assessment and mitigation 200 computes risk from inventory of the exterior features of the structures on the property, where the features are located along the perimeter of the respective structure, their dimensions, and material composition. To acquire this at scale, oblique satellite imagery, aerial imagery, ground imagery, multiple listing service (MLS) data, and input via the Property Assessment App may be obtained. Machine learning feature detection algorithms may be deployed on these images to characterize windows, doors, vents, soffits, and every other major feature to the extent needed to model fire susceptibility.

FIG. 15 illustrates exemplary material parameters 1500 in accordance with one embodiment. Parameters such as these may be used to determine failure thresholds for structure tiles as described herein.

Figure 16:
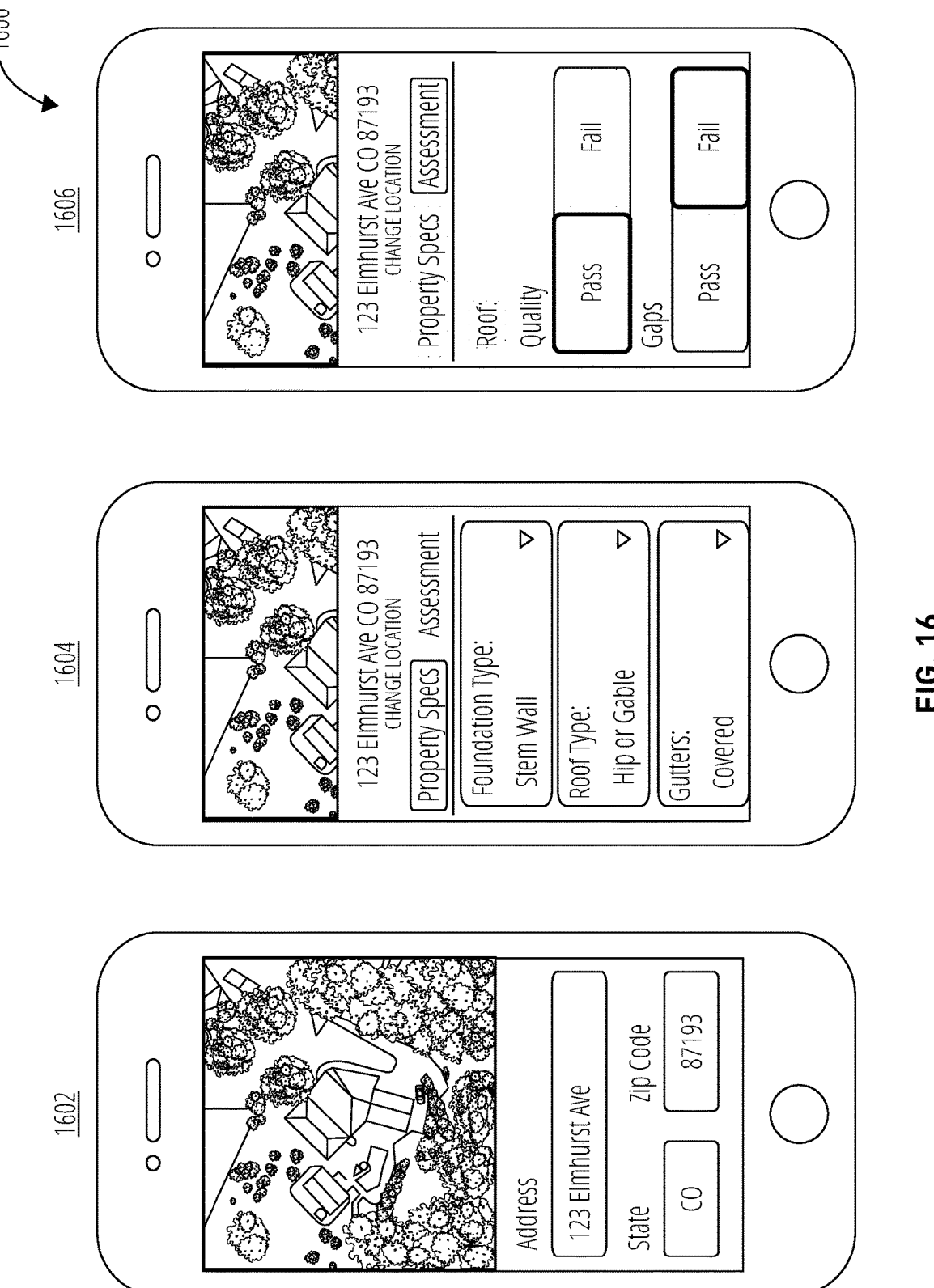
FIG. 16 illustrates an application interface 1600 in accordance with one embodiment.

FIG. 16 illustrates an application interface 1600 in accordance with one embodiment. A property entry screen 1602, a property specification screen 1604, and a property assessment screen 1606 are illustrated.

An application may be provided for users 404 to interact with the system for wildfire risk assessment and mitigation 200. Screens may allow a user 404 to enter an address and view a structure 102 and its surroundings (property entry screen 1602), enter various specifications or details about a property (property specification screen 1604), make assessments about property (property assessment screen 1606) on one or more bases, and more. For example, a user may be provided a screen to enter pictures of a structure 102 to enhance the accuracy and reliability of PIM. Additional features may be provided in the application interface 1600 as described below.

Individual Mode Versus Portfolio Mode

As noted above regarding 502, method 500 may be able to operate in two modes:

1. Portfolio Analysis or Portfolio Mode: a rapid risk overview and remediation opportunity ranking analysis, and 2. Detailed Property Analysis or simply Structure or Property Analysis: a more specific risk scoring and remediation analysis for underwriting.

Both modes may use the same underlying physical model, however, the portfolio mode may not require the depth of home-specific data collection that may delay analysis and may not be needed for a portfolio risk view or identification of high-value remediation opportunities. The portfolio mode may be designed to support the analysis of thousands of properties at a time and use inputs derived from satellite imagery and generic home construction standards (GHCS) mapped onto each home's footprint of structure tiles.

Portfolio Analysis

GHCS uses a set of common construction materials (siding, window, roofing, etc.) and feature placement designed to provide normalized risk feedback based on each structure's footprint and specific fuel context. Thus, while analysis in Portfolio Mode may not completely reflect the actual construction materials, feature placement for each home, and detailed or specific mitigation strategies, it may offer effective insight into risks across the portfolio by categorizing the portfolio in terms of the kind and degree of remediation needed for wildfire survival, for example:

1. Low-cost vulnerabilities: removal of shrubs next to home, application of fire retardant, tree-trimming 2. Medium-cost vulnerabilities: Replacement of single paned windows with tempered double-paned glass, replacement of wooden fence with fire resistant fence, strategic application of a fire retardant, soffit ember protection and/or moderate tree removal 3. High-cost vulnerabilities: Material tree removal, siding replacement, roof replacement 4. Very high probabilities of ignition regardless of construction materials: examples of such homes would be homes in such close proximity to other homes that if a neighboring house ignites, the target home may ignite. In these cases, the model may identify clusters of such homes that might be suitable for remediation and protection as a group.

Detailed Structure Analysis

For homes warranting remediation consideration and underwriting for insurability and premium rating, detailed home analysis mode may request specific information on actual construction materials along with actual window, door, vent, soffit, and other feature size and location on each face of the home. The modeling process may be the same as with portfolio analysis but with more accurate failure cataloging and remediation categorization. This additional information may be input manually, into an app or other screen of a computing device and/or via images of the property (structure 102 and fuel sources 104, such as via screenshots like those shown in FIG. 16) that may be processed to extract features and details. Data sources 210 may also provide some of such data and imagery.

The aforementioned embodiments have been described by way of example. The disclosure is not to be considered limited by these examples.

FIG. 17 illustrates a model editing interface 1700 in accordance with one embodiment. The model editing interface 1700 is shown displaying initial identifications 1702 and corrected model information 1704. The initial identifications 1702 include a structure identification error 1706 and a fuel source identification error 1708.

In on embodiment, building the thermal model may leverage third party data sources providing rooftop outlines and property shapes. This approach focuses on larger areas of analysis and provides good aggregate views, but not detailed property views. While this data may be accurate for the most part, in applying it to the disclosed thermal models, the data was not precise enough to inform an accurate PIM. In another embodiment, this approach may be enhanced with two components. First, the improved machine learning models disclosed focus on fuel rooftop, doors, windows, decks, and other structures, providing a more accurate view of a single property. Second, a data precision layer may be included, illustrated by the model editing interface 1700 in this figure, to allow for quick analysis and improvement of property data via a desktop or mobile app. This approach provides a quick overlay of the property data and a way to quickly enhance that data to give a more precise model of the thermal characteristics of a property, resulting in a more accurate PIM.

A user 404 may review the initial identifications 1702 and may, in an Edit Mode, make manual corrections to the features identified by machine learning 310 based on an input image, as shown. Once the corrections have been made, the corrected model information 1704 may display a corrected structure outline 1710 and may indicate, or simply no longer display a removed fuel source 1712. These corrections may be fed back to the machine learning 310 of the risk engine 300 to improve and refine future feature identification.

FIG. 18 illustrates a normalized difference vegetation index 1800 in accordance with one embodiment. The normalized difference vegetation index 1800 user interface may include a property view element 1802, an NDVI overlay element 1804, and an NDVI timeline element 1806 indicating monthly 1808 increments and comparison with a threshold value 1810.

FIG. 19A illustrates a fuel source to wall segment irradiation elevation 1900*a* in accordance with one embodiment. A fuel source 104 may radiate heat upon wall segment j 1902 such as may be determined as described above, with view factor view factor $F_{ij}$ 1904 projecting onto surface area $A_j$ of wall segment j 1902 (which might be a tile, for example, and noting that as shown the width is whatever is inside a particular 2×2 tile, and the height is whatever the height of the house wall is known to be at that point). Wind speed does not affect radiant heat flux FIG. 19B illustrates a typical large tree heat release rate (HRR) 1900*b* in accordance with one embodiment. Peak heat flux or peak HRR 1906 may be used for computation given that each surface material ignites at a minimum heat flux density $(J/m^2s)$ (noting this may be one example of different materials, as shown in FIG. 15). To simplify computation, the heat release may be modeled as a square/rectangular pulse of heat equivalent to the area under the heat release curve 1908 which is the area of rectangle 1910 or triangle 1912.

FIG. 19C illustrates a fuel source to wall segment irradiation elevation 1900*c* in accordance with one embodiment.

FIG. 19C shows heat for each structure tile, with scale 1918 indicating a range from little impact to failure (shading near the top of scale 1918). Scale 1918 may be different for each threat vector, in each figure, but may ultimately range from minimal impact (at unaffected tiles 1916) to failure of the structure tile in question (at failed tile 1914). Surplus heat (i.e., how much heat or threat, over ignition, is present for a given tile) may also be derived from known approaches to calculating heat flux that exceeds ignition.

FIG. 20A illustrates a flame angle as a function of slope and effective wind speed 2000a in accordance with one embodiment. Both flame length and angle are influenced by wind and slope. The PIM computes an effective wind vector $U_{ws}$ as a function of actual wind $U_a$ and slope θ as measured with respect to the horizontal on approach to the protected structure. I.e., a slope up to the structure is considered θ>0 and a slope down to the structure is considered θ<0. θ=0 is level ground.

Figures 20B, 20C:
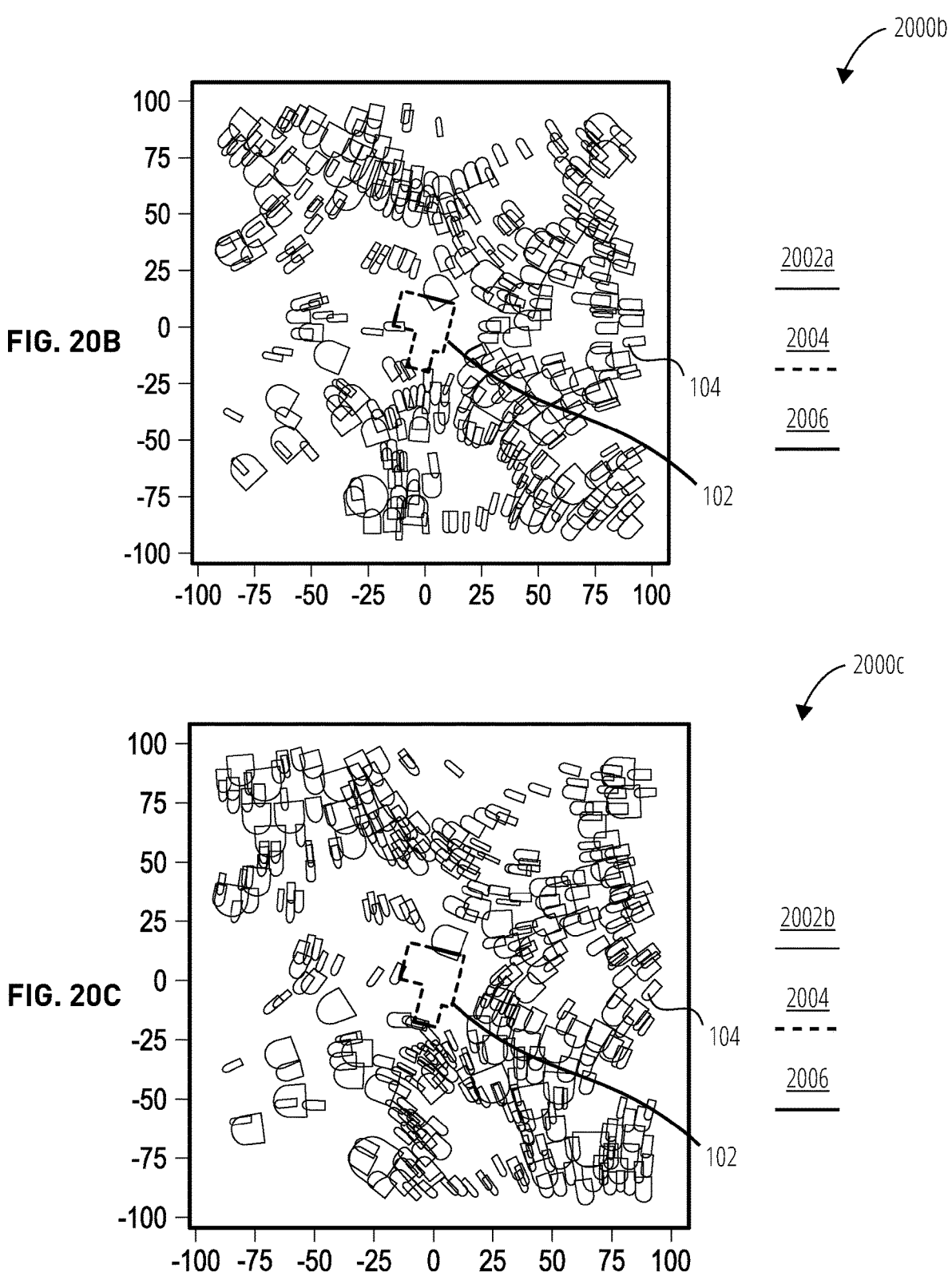
FIG. 20B illustrates a structure flame touch diagram 2000b in accordance with one embodiment.
FIG. 20C illustrates a structure flame touch diagram 2000c in accordance with one embodiment.

FIG. 20B and FIG. 20C illustrate structure flame touch diagrams 2000b and 2000c in accordance with one embodiment. An outline of structure 102 may be seen, in each, with flame touch indicators 2002a and flame touch indicators 2002b illustrated in structure flame touch diagram 2000b and structure flame touch diagram 2000c respectively.

Structure flame touch diagram 2000b indicates flame touch indicators 2002a for conditions that involve the fuel sources 104 shown, with the wind moving from west to east. Under these conditions, there are 174 unimpacted wall segments 2004, and 54 impacted wall segments 2006 of the 228 wall segments are touched by flame.

Structure flame touch diagram 2000c indicates the exact same structure 102 and fuel sources 104 under different conditions. In this diagram, the wind is moving from the southwest to the northeast, and the corresponding modified flame touch indicators 2002b for the fuel sources 104 are shown. Under these conditions, there are 172 unimpacted wall segments 2004, and 56 impacted wall segments 2006 of the 228 wall segments are touched by flame.

FIG. 21 illustrates a vector composition of wind-slope interaction 2100 in accordance with one embodiment. A plan view 2102, an elevation view 2104, and a plan view 2106 are shown. The PIM may use a standard $\|U_a\|=30$ km/h wind (the dividing line between moderate and high winds) and a rate of spread R=0.1, $U_a$=3 km/h, to:

1. Identify slope vector
2. Choose wind direction and magnitude
3. Compute effective wind velocity (direction and magnitude)
4. Compute flame length and angle
5. Plot flame reach and determine if contact Actual wind $U_a$ may not be aligned. $U_{ws}$ generally may be computed as follows, and as illustrated in this figure.

Effective Wind Direction:

$$\tan \gamma = (Arg); \text{ for } \theta > 0, Arg > 0$$

$$\tan(\gamma - \pi) = (Arg); \text{ for } \theta < 0, \text{ all } Arg$$

$$\tan(\gamma - 2\pi)| = (Arg); \text{ for } \theta > 0, Arg < 0$$

where, $$Arg = U_x/U_y = U_a \sin \Psi/(U_b \sin \theta + U_a \cos \Psi)$$

Effective Wind Magnitude:

$$U_{ws} = U_b[(U_a/U_b)^2 + 2(U_a/U_b)\sin \theta \cos \Psi + \sin^2 \theta]^{1/2}$$

where, $U_b = (2gI_B/(\rho_a c_p T_a))^{1/3}$ is the velocity at which combustion products rise vertically due to buoyancy generated by the fire (and used in calculating the flame angle below), $I_B = H_c W_a R$ is Byram's Fireline Intensity using crown heat of combustion $H_c$(BTU/lbs) heat of combustion $W_a$(lb/ft²) fuel loading R(ft/s) rate of spread FIG. 22 illustrates an ember mass projection downwind 2200 in accordance with one embodiment. Ember downrange mass projection in direction of $U_{ws}$ follows an LN distribution with 99% of ember mass falling out of the wind stream at 22.6 m assuming a 20 mph wind. For the PIM in one embodiment, embers at each distance may be considered to fall within a perpendicular range equal to the crown width along a path in the direction of the effective wind $\gamma_i$. Ember mass accumulation from tree i on surface element j falling within 12 crown width of the downwind line from the tree and less than 22.6 m from the tree is $$m_{e_{ij}} = 0.0015 M_{t_i} \delta_{e_{ij}}$$

where:

$M_{ti}$ is the mass of tree i, proportion of tree mass ejected as embers
  0.0008 for large Douglas Fir (5 m),
  0.0015 for smaller Douglas Fir, and $\delta_{e_{ij}}$ is the ember mass share from tree i deposited on element j $\delta_{e_{ij}}$ is computed from the LN distribution with location μ=−3.2811 and scale σ=0.94289.

$$\delta_{e_{ij}} = \frac{d}{2r}(Pr(x = d_{eff_{ij}}) = Pr(x < d_{eff_{ij}}))$$

where d is the grid size, and r is the tree crown radius, and $d_{eff} = d_{ij}/22.6$, the effective distance from the tree scaled such that the cumulative distribution function (CDF) equals 1 at 22.6 m.

Total ember mass at structural segment j is $$M_{e_j} = 0.0015 \sum_i m_{ij} \delta_{e_{ij}}$$

FIG. 23A illustrates an ember mass distribution at a given distance 2300a in accordance with one embodiment. At any given downwind distance from a tree, ember particle mass has a LN distribution. Given the mass and mass distribution at a structure segment j, the population of a given ember size may be computed using:

$$D_{eff} = \left(\frac{6m_p}{\rho_{0,p}\pi}\right)^{1/3}$$

with:

$m_p$ the mass of the ember particle, and $\rho_{0,p}$ the density of the ember particle.

This provides the mass share at distance for embers with mass less than 0.01 g. Using the formula above yields effective diameters <4 mm. Populations of embers <4 mm at structure segment j may be computed as follows:

$$N_{e_{i,<4\ mm}} = 10,000 M_{e_{j,<4\ mm}}$$

where:

$\delta_{ej,<4\ mm} = (88.772560 - 2.375739 * d_{ij})/100$ where $d_{ij}$ is the downwind distance of j, and $M_{ej,<4\ mm} = M_{e_j} \delta_{ej,<4\ mm}$ FIG. 23B illustrates ember penetration surplus per wall segment 2300*b* in accordance with one embodiment. A structure 102 is shown with fuel sources within ember throw distance 2302. The effect of ember surplus may be calculated with respect to the formulae described with respect to FIG. 23A, and may contribute to the failed tiles 1914 indicated here and in FIG. 23C.

FIG. 23C illustrates ember population soffit vectors 2300*c* in accordance with one embodiment. Scale 2304 indicates the contribution upon each wall segment and soffit of ember mass distribution from a given fuel source within ember throw distance 2302, including the contribution leading to the failed tiles 1914 indicated in FIG. 23B.

FIG. 24 illustrates a fuel sources within and outside of ember throw distance 2400 in accordance with one embodiment. An ember throw distance 2404 may be determined as described here from structure 102. Some fuel sources 104 identified and modeled may, based on the ember throw distance 2404, be fuel source outside of ember throw distance 2402, or may be fuel sources within ember throw distance 2302 of structure 102. Fuel source outside of ember throw distance 2402 may be ignored for calculations related to ember threat vectors.

FIG. 25A illustrates an impact from fuel sources within ember throw distance 2500*a* in accordance with one embodiment. Structure 102 is shown along with its associated fuel sources within ember throw distance 2302. The impact of the fuel sources within ember throw distance 2302 is illustrated with respect to scale 2504. As may be seen, a number of the fuel sources within ember throw distance 2302 may contribute to failed tiles 1914 indicated.

FIG. 25B illustrates the fuel sources contributing to failure due to embers 2500*b*. Structure 102 may be seen alongside the fuel sources within ember throw distance 2502 that contribute to failed tiles 1914.

FIG. 26 illustrates a sum of heat per wall segment 2600 in accordance with one embodiment. Scale 2602 provides an indication of the heat sum experienced at each of the illustrated wall segments, leading to failed tiles 2604 and failed tiles 2606.

FIG. 27 illustrates a sum of heat per fuel source 2700 in accordance with one embodiment. The sum of heat (j) output per fuel source to all visible wall segments may lead to some fuel sources being indicated as fuel sources 2702, not expected to materially contribute to failure at a failed tile 1914, and fuel sources 2704 that are expected to so contribute, where remediation or removal of these fuel sources may reduce the risk score for a structure 102.

FIG. 28 illustrates a structure and fuel sources within a parcel 2800 in accordance with one embodiment. Structure 102 may be seen with the property line 2802 bounding the parcel of land owned by the owner of structure 102. Fuel sources 104 within the property bounds, indicated with solid circles, as well as fuel sources 104 outside of the property line 2802, shown as dotted circles, may each contribute to failure of the structure 102 in case of wildfire. However, those fuel sources 104 outside the property line 2802 may not be possible to mitigate or remediate for property ownership or regulatory reasons.

FIG. 29 illustrates a wall normal for grid tile 2900 in accordance with one embodiment. View factors are functions of the geometry of the source and receiver and their relative orientations. Thus the normal to the wall ĵ is computed at each segment j.

The general form for computation of a view factor is:

$$F_{i \to j} = F_{ij} = \frac{1}{A_i} \int_{A_i} \int_{A_j} \frac{\cos\theta_i \cos\theta_j}{\pi R^2} dA_i dA_j$$

where $A_i$ is the area of the emitter, $A_j$ is the area of the receiver,

R is the line connecting $A_i$ and $A_j$, $\cos \theta_i$ is the angle between ˆR and Aˆ$_i$, and $\cos \theta_j$ is the angle between ˆR and Aˆ$_j$.

For complex geometries, computational methods are used to determine $F_{ij}$, however closed-form solutions may be facilitated by using the reciprocity relationship:

$$A_i F_{ij} = A_j F_{ji}$$

For the cylinder (FIG. 32), wall (FIG. 31), and sphere (FIG. 33) below, the view factors are computed with the candidate flame shapes as receiver and the planar element as the source (emitter). The reciprocity relationship is then used to compute the flame-to-wall view factor.

FIG. 30 illustrates a point source view factor 3000 in accordance with one embodiment. Tree combustion results in a complex shape and thus computing a view factor may use simplifying assumptions. The simplest is a point source in 2-D radiating as a blackbody in 360°. (Wind does not blow light; nor does earth's gravity pull light downslope significantly.)

Ignoring the z-axis, a simple view factor for a wall segment j for a fuel source i may then be estimated by the angle subtended by the wall segment at distance ‖r‖ from the point source.

The wall segment width is embedded in a tile with side length y (in one embodiment y=2 ft). The wall segment is x=y/cos α where α is the angle between the segment normal ˆx and the tile normal ˆy.

Then by geometry using the law of cosines and law of sines, The wall segment subtends an angle θ=ϕ+δ, where:

$$a^2 = R^2 + \left(\frac{x}{2}\right)^2 - \frac{Rx}{2} \cos\left(\beta + \frac{\pi}{2}\right),$$

$$b^2 = R^2 + \left(\frac{x}{2}\right)^2 - \frac{Rx}{2} \cos\left(\frac{\pi}{2} - \beta\right),$$

$$\phi = \sin^{-1}\left(\frac{(x/2)\sin(\beta + \pi/2)}{a}\right) \text{ for } R \geq \frac{x}{2},$$

$$\phi = \pi - \beta - \sin^{-1}\left(\frac{R\sin(\beta + \pi/2)}{a}\right) \text{ for } R < \frac{x}{2},$$

$$\delta = \sin^{-1}\left(\frac{(x/2)\sin\left(\frac{\pi}{2} - \beta\right)}{b}\right) \text{ for } R \geq \frac{x}{2},$$

$$\delta = \frac{\pi}{2} + \beta - \sin^{-1}\left(\frac{R\sin\left(\frac{\pi}{2} - \beta\right)}{b}\right) \text{ for } R < \frac{x}{2},$$

and then the view factor is $$F_{ij} = \frac{\theta_i}{2\pi}$$

Figure 31:
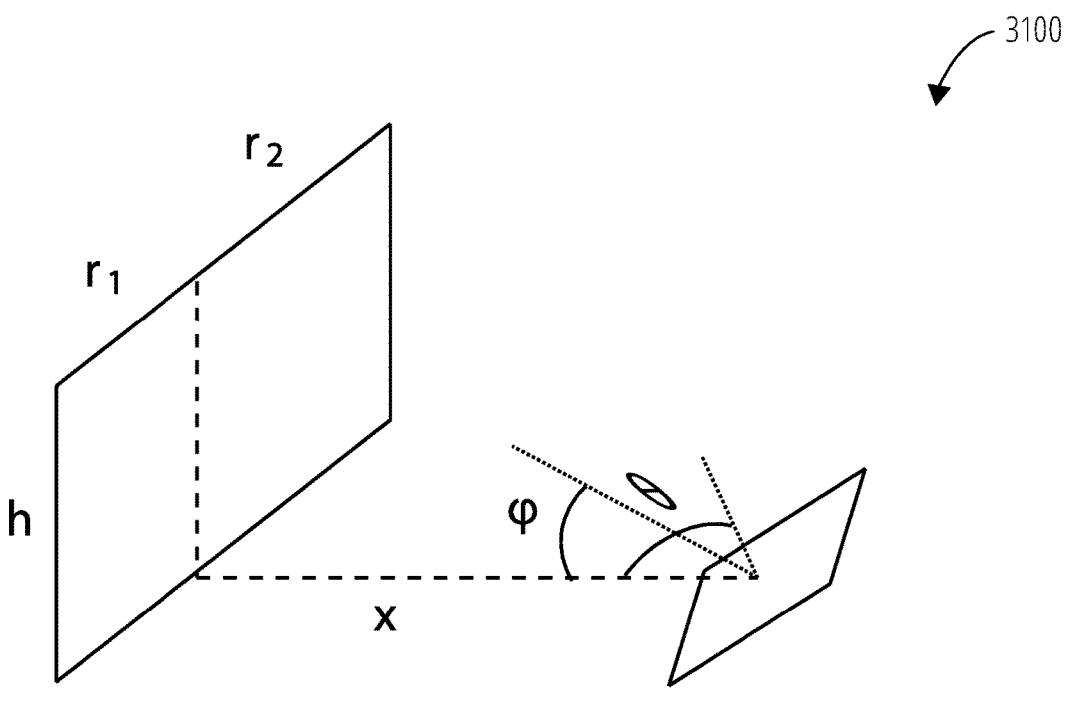
FIG. 31 illustrates a finite planar source view factor 3100 in accordance with one embodiment.

FIG. 31 illustrates a finite planar source view factor 3100 in accordance with one embodiment. The SIAM model assumes a planar flame front with view factor from source i to wall segment j. One view factor parameterization for such a geometry is offered by $$h_r = h/r$$

$$x_r = x/r$$

$$A = \frac{1}{\sqrt{h_r^2 + x_r^2}}$$

$$B = \frac{h_r}{\sqrt{1 + x_r^2}}$$

For a horizontal receiver on ground level ($\Theta = \pi/2$) the view factor is:

$$F_h = \frac{1}{2\pi}\left[\tan^{-1}\left(\frac{1}{x_r}\right) - Ax_r\tan^{-1}(A)\right]$$

and, for or a vertical surface ($\Theta = 0$):

$$F_v = \frac{1}{2\pi}\left[h_r A\tan^{-1}(A) + \frac{B}{h_r}\tan^{-1}(B)\right]$$

and for orientations of source and receiver not directly facing:

$$F_{ij} = \cos(\theta)\sqrt{F_v^2 + F_h^2}$$

Figure 32:
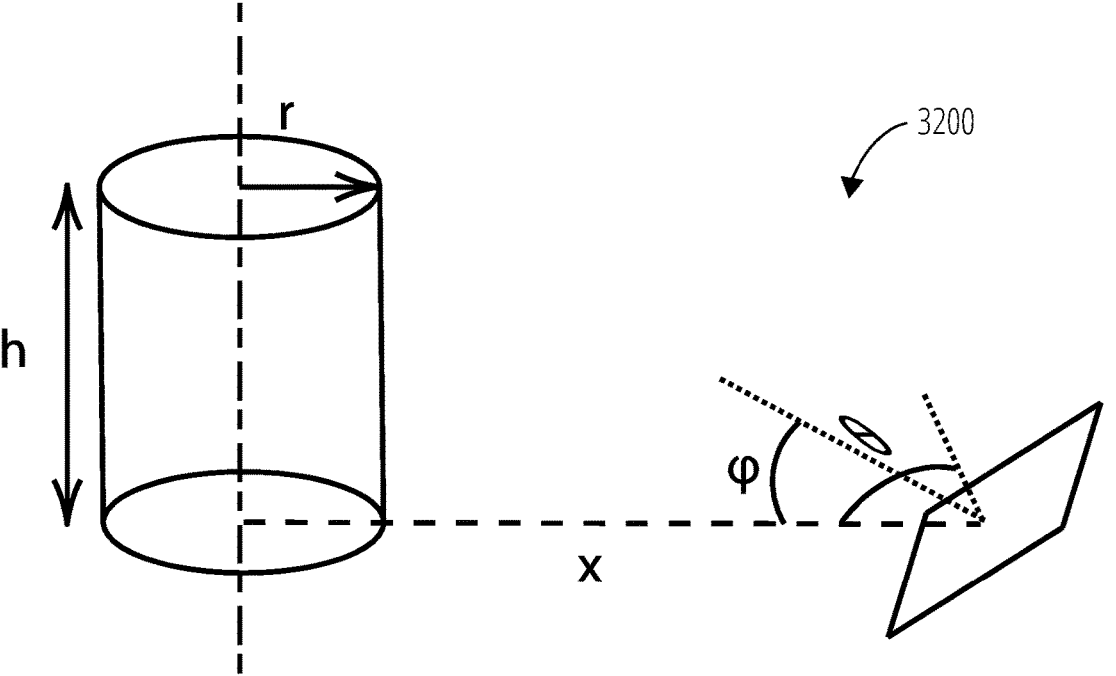
FIG. 32 illustrates a cylinder source view factor 3200 in accordance with one embodiment.

FIG. 32 illustrates a cylinder source view factor 3200 in accordance with one embodiment. A cylinder geometry may be used for tree fires, with flame height determined by:

$$H = -1.02D + 0.235HHR^{0.4}$$

A more conservative view factor parametrization for the cylinder geometry may be provided by:

$$h_r = h/r$$

$$x_r = x/r$$

$$A = (x_r + 1)^2 + h_r^2$$

$$B = (x_r - 1)^2 + h_r^2$$

For a horizontal receiver ($\phi = \pi/2$), $$F_h = \frac{1}{\pi}\left[\tan^{-1}\left(\sqrt{\frac{x_r-1}{x_r+1}}\right) - \frac{x_r^2 - 1 + h_r^2}{\sqrt{AB}}\tan^{-1}\left(\sqrt{\frac{(x_r-1)A}{(x_r+1)B}}\right)\right]$$

and for a vertical surface ($\phi = 0$), $$F_c = \frac{1}{\pi x_r}\tan^{-1}\left(\sqrt{\frac{h_r^2}{x_r^2 - 1}}\right) + $$
$$\frac{h_r(A - 2x_r)}{\pi x_r\sqrt{AB}}\tan^{-1}\left(\sqrt{\frac{(x_r-1)A}{(x_r+1)B}}\right) - \frac{h_r}{\pi x_r}\tan^{-1}\left(\sqrt{\frac{x_r-1}{x_r+1}}\right)$$

The maximum view factor is $$F_{ij} = \sqrt{F_h^2 + f_v^2}$$

FIG. 33 illustrates a spherical source view factor 3300 in accordance with one embodiment, where:
  r is the sphere radius,
  L is the length between the sphere center and the segment center,
  θ is the angle between the normal to the surface ^x and the connector to the sphere center L,
  2φ is the view angle, and
  Lr is the reduced length L/r.
For wall segments with a "full view" of the source, i.e., θ+φ≤π/2, $$F_{ij} = \frac{r^2}{L^2}\cos\theta$$

For wall segments with a "partial view" of the source, i.e., θ+φ>π/2, $$F_{ij} = \frac{1}{2} - \frac{1}{2}\sin^{-1}\left[\frac{(L_r^2 - 1)^{1/2}}{L_r}\right] + $$
$$\frac{1}{\pi L_r^2}\cos\theta\cos^{-1}\left[-(L_r^2 - 1)^{1/2}\cot\theta\right] - \frac{1}{\pi L_r^2}(L_r^2 - 1)^{1/2}(1 - L_r^2\cos^2\theta)^{1/2}$$

Figures 34A, 34B:
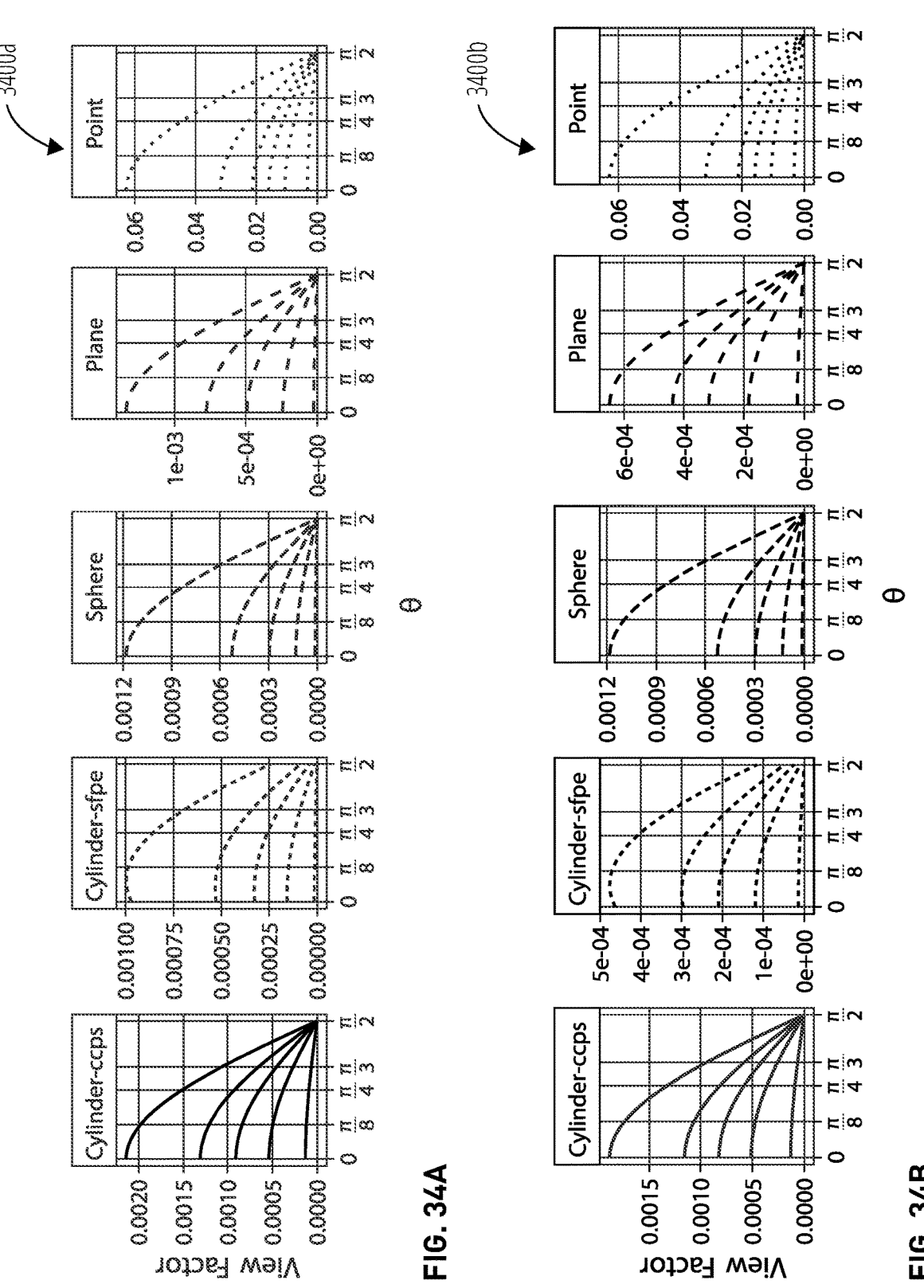
FIG. 34A illustrates a view factor for different geometries with H=2r 3400a in accordance with one embodiment.
FIG. 34B illustrates a view factor for different geometries with H=2r 3400a in accordance with one embodiment.

FIG. 34A illustrates view factor for different geometries with H=2r 3400a in accordance with one embodiment, as a function of plan angle θ with respect to source. The source height=twice radius (r=½ width for plane) for select $X_{ij}/r_i$ ratios between 1.5 and 30. View factors are shown for a cylinder using cylindrical coplanar stripline (CCPS) parameterization, a cylinder using the Society of Fire Protection Engineers (SFPE) parameterization, a sphere, a plane, and a point.

FIG. 34B illustrates a view factor for different geometries with H=5r 3400b in accordance with one embodiment, as a function of plan angle θ with respect to source. The source height=5×radius (r=½ width for plane) for select $X_{ij}/r_i$ ratios between 1.5 and 30. View factors are shown for a cylinder using cylindrical coplanar stripline (CCPS) parameterization, a cylinder using the Society of Fire Protection Engineers (SFPE) parameterization, a sphere, a plane, and a point.

Appropriate choice of emitter geometry (and thus associated view factor) for complex dynamic shapes (such as flames) ultimately depends upon the model's ability to reproduce results in close agreement to real-world data. View factors will meet logical constraints as well. In particular, view factors for different receivers from the same source are additive such that in a closed system where all emitted radiation is received by some surface, $$\sum_{j}^{N} F_{ij} = 1$$

View factors produced by cylindrical and spherical source geometries are larger (and thus more conservative) than those produced by planar and point source geometries. The cylinders have the advantage of variable height which better reflects the non-linear relationship between flame heights and crown widths. (One drawback, though, in the above parameterizations, is the cylinder models lack the partially occluded view afforded by the spherical model.)

In order to err on the conservative side and to allow for variable flame heights, the PIM may use the more conservative CCPS cylindrical view factor parameterization. Note, because view factors may be computed independently, the PIM may sum over all view factors per source to confirm that $$\sum_j F_{ij} \le 1.$$

Figure 35:
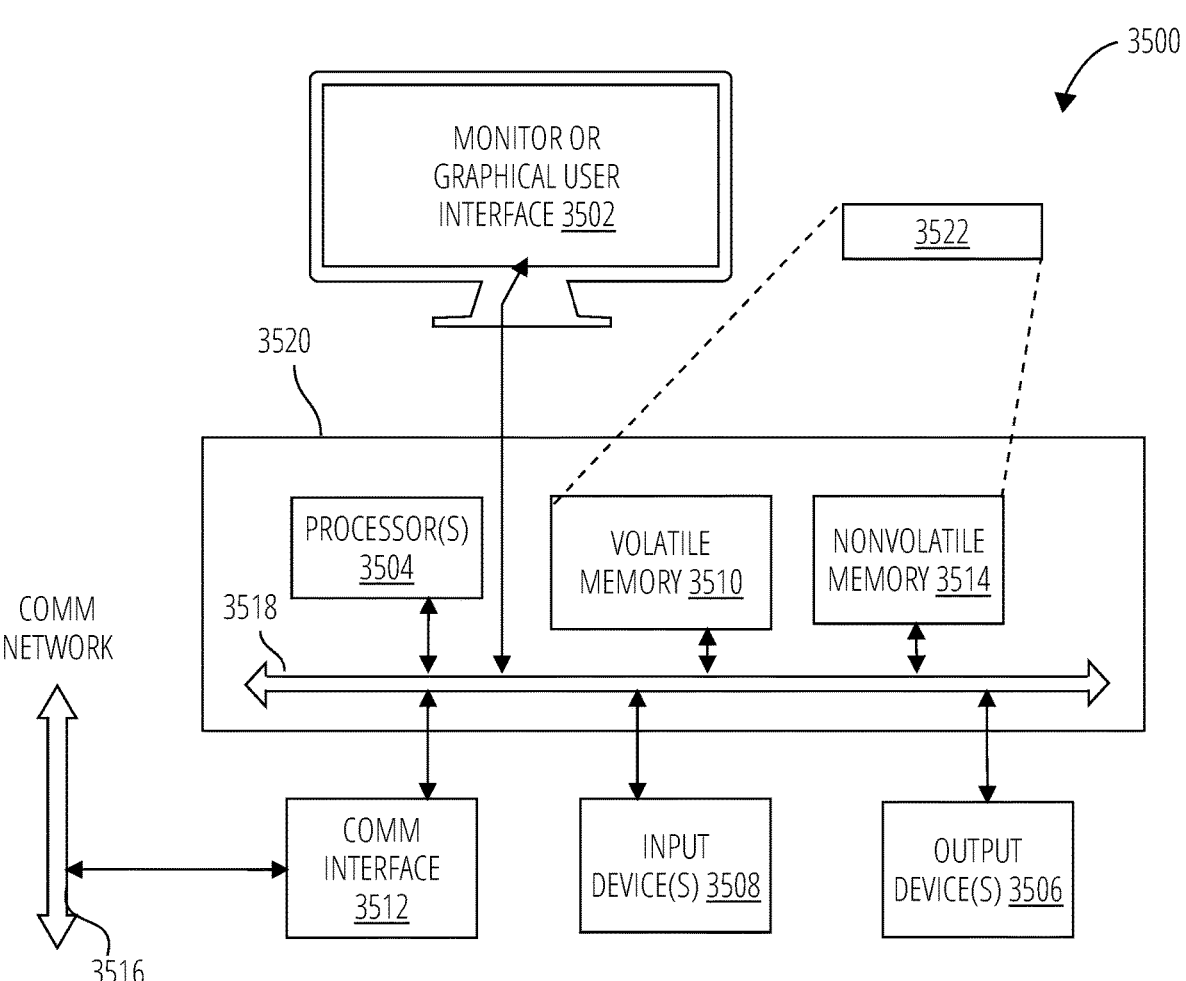
FIG. 35 is an example block diagram of a computing device 3500 that may incorporate embodiments of the present disclosure.

FIG. 35 is an example block diagram of a computing device 3500 that may incorporate embodiments of the present disclosure. FIG. 35 is merely illustrative of a machine system to carry out aspects of the technical processes described herein, and does not limit the scope of the claims. One of ordinary skill in the art would recognize other variations, modifications, and alternatives. In one embodiment, the computing device 3500 typically includes a monitor or graphical user interface 3502, a data processing system 3520, a communication network interface 3512, input device(s) 3508, output device(s) 3506, and the like.

As depicted in FIG. 35, the data processing system 3520 may include one or more processor(s) 3504 that communicate with a number of peripheral devices via a bus subsystem 3518. These peripheral devices may include input device(s) 3508, output device(s) 3506, communication network interface 3512, and a storage subsystem, such as a volatile memory 3510 and a nonvolatile memory 3514.

The volatile memory 3510 and/or the nonvolatile memory 3514 may store computer-executable instructions and thus forming logic 3522 that when applied to and executed by the processor(s) 3504 implement embodiments of the processes disclosed herein.

The input device(s) 3508 include devices and mechanisms for inputting information to the data processing system 3520. These may include a keyboard, a keypad, a touch screen incorporated into the monitor or graphical user interface 3502, audio input devices such as voice recognition systems, microphones, and other types of input devices. In various embodiments, the input device(s) 3508 may be embodied as a computer mouse, a trackball, a track pad, a joystick, wireless remote, drawing tablet, voice command system, eye tracking system, and the like. The input device(s) 3508 typically allow a user to select objects, icons, control areas, text and the like that appear on the monitor or graphical user interface 3502 via a command such as a click of a button or the like.

The output device(s) 3506 include devices and mechanisms for outputting information from the data processing system 3520. These may include the monitor or graphical user interface 3502, speakers, printers, infrared light emitting diodes (LEDs), and so on as well understood in the art.

The communication network interface 3512 provides an interface to communication networks (e.g., communication network 3516) and devices external to the data processing system 3520. The communication network interface 3512 may serve as an interface for receiving data from and transmitting data to other systems. Embodiments of the communication network interface 3512 may include an Ethernet interface, a modem (telephone, satellite, cable, Integrated Services Digital Network (ISDN)), (asynchronous) digital subscriber line (DSL), FireWire, USB, a wireless communication interface such as BlueTooth or WiFi, a near field communication wireless interface, a cellular interface, and the like.

The communication network interface 3512 may be coupled to the communication network 3516 via an antenna, a cable, or the like. In some embodiments, the communication network interface 3512 may be physically integrated on a circuit board of the data processing system 3520, or in some cases may be implemented in software or firmware, such as "soft modems", or the like.

The computing device 3500 may include logic that enables communications over a network using protocols such as HTTP, TCP/IP, RTP/RTSP, IPX, UDP and the like.

The volatile memory 3510 and the nonvolatile memory 3514 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 3510 and the nonvolatile memory 3514 may be configured to store the basic programming and data constructs that provide the functionality of the disclosed processes and other embodiments thereof that fall within the scope of the present disclosure.

Logic 3522 that implements embodiments of the present disclosure may be stored in the volatile memory 3510 and/or the nonvolatile memory 3514. Said logic 3522 may be read from the volatile memory 3510 and/or nonvolatile memory 3514 and executed by the processor(s) 3504. The volatile memory 3510 and the nonvolatile memory 3514 may also provide a repository for storing data used by the logic 3522.

The volatile memory 3510 and the nonvolatile memory 3514 may include a number of memories including a main random access memory (RAM) for storage of instructions and data during program execution and a read only memory (ROM) in which read-only non-transitory instructions are stored. The volatile memory 3510 and the nonvolatile memory 3514 may include a file storage subsystem providing persistent (non-volatile) storage for program and data files. The volatile memory 3510 and the nonvolatile memory 3514 may include removable storage systems, such as removable flash memory.

The bus subsystem 3518 provides a mechanism for enabling the various components and subsystems of data processing system 3520 communicate with each other as intended. Although the communication network interface 3512 is depicted schematically as a single bus, some embodiments of the bus subsystem 3518 may utilize multiple distinct busses.

It may be readily apparent to one of ordinary skill in the art that the computing device 3500 may be a device such as a smartphone, a desktop computer, a laptop computer, a rack-mounted computer system, a computer server, or a tablet computer device. As commonly known in the art, the computing device 3500 may be implemented as a collection of multiple networked computing devices. Further, the computing device 3500 may typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g., read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Herein, references to "one embodiment" or "an embodiment" do not necessarily refer to the same embodiment, although they may. Unless the context clearly specifies otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure may be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc., are used as labels for nouns that they precede, and do not imply any type of ordering (e.g., spatial, temporal, logical, etc.), unless stated otherwise. For example, in a register file having eight registers, the terms "first register" and "second register" may be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the disclosure as claimed. The scope of disclosed subject matter is not limited to the depicted embodiments but is rather set forth in the following claims.

What is claimed is:

1. A method comprising:

receiving at least one image of a property, wherein the property comprises at least one primary structure;

identifying structural features of the at least one primary structure by:

determining an inventory of exterior features of each at least one primary structure on the property, wherein the exterior features are located along a perimeter of the at least one primary structure and include dimensions and material composition;

utilizing a machine learning feature detection algorithm on each of the at least one image to characterize primary structural features necessary to model fire susceptibility;

determining at least one non-primary structure fuel source on the property and surrounding the property by:

utilizing a machine learning fuel load algorithm for:

detecting major vegetation including at least one of a tree and a shrub;

detecting secondary structures including at least one of a shed and a fence;

detecting neighboring rooftops within a distance of the primary structure that would contribute to advancement of a wildfire; and detecting at least one of a footprint of the primary structure, roof characteristics of the primary structure, and local topological features, wherein the local topological features include at least one of a slope, a road, a hydrant, and an arroyo;

determining a feature-specific attribute for each of the structural features of the at least one primary structure and for features of each of the at least one non-primary structure fuel sources; and calculating a fuel load in terms of thermal energy generation potential utilizing the feature-specific attributes.

2. The method of claim 1, further comprising:

overlaying a multi-dimensional grid on the at least one image of the property, wherein the grid comprises a plurality of tiles and divides the property into analysis points, each analysis point represented by one tile, and wherein a centroid of the primary structure is centered on the grid;

encoding each tile within the grid with associated fuel element details and structural element details; and encoding tiles within the grid with associated topographical data.

3. The method of claim 2, further comprising:

determining, when exposed to at least one fuel source, a thermal energy output and a probability of ignition failure for each of the structural features of the at least one primary structure and for each of the at least one non-primary structure fuel sources, utilizing a fire risk algorithm, the fire risk algorithm including:

a plurality of threat vectors, comprising:

a heat flux for radiant impact threat vector;

a flame front contact for direct flame impingement threat vector;

an ember mass accumulation and size population for firebrand accumulation threat vector; and an ember penetration probability computation threat vector, wherein the probability of ignition failure for each of the plurality of threat vectors comprises utilizing the structural features of the at least one primary structure, the features for each of the at least one non-primary structure fuel sources, spatial relationships between the at least one primary structure and the at least one non-primary structure fuel sources, and the feature-specific attributes for each of the structural features of the at least one primary structure and features for each of the at least one non-primary structure fuel sources;

a direct evaluation routine to determine whether each structural feature of the at least one primary structure ignites under an influence of each of the plurality of threat vectors summed over all of a plurality of fuel sources with direct access to each structural feature of the at least one primary structure;

a line of sight evaluation routine to determine an impact of each of the plurality of fuel sources within a line of sight of each tile including a portion of the primary structure;

calculating an ignition failure determination for each structural feature at each tile including a portion of the primary structure, wherein the calculations include the impact of the plurality of fuel sources with direct access to the primary structure and the plurality of fuel sources within the line of sight of each tile including a portion of the primary structure; and an evaluation routine to determine whether each feature of the at least one non-primary structure fuel source ignites under the influence of each of the plurality of threat vectors.

4. The method of claim 3, further comprising:

updating the fire risk algorithm by cataloguing for each tile with an ignition failure:

a location of the tile;

the at least one structural feature or each feature of the at least one non-primary structure fuel source that failed;

each of the plurality of threat vectors that caused each structural feature and each feature of the at least one non-primary structure fuel source to fail;

each individual fuel source contributing to each specific threat vector causing a feature failure;

wind direction during the feature failure; and a failure surplus for each feature failure, wherein the failure surplus measures an extra heat flux the failed feature experienced over a non-failure or non-ignition state.

5. The method of claim 3, further comprising:

determining an influence of wind on each of the plurality of threat vectors including:

calculating an impact of each direction of wind from at least north, south, east, and west compass headings on each of the plurality of threat vectors for each tile including a portion of the primary structure; and calculating the impact of a plurality of wind speeds on each of the plurality of threat vectors for each tile including a portion of the at least one primary structure.

6. The method of claim 5, further comprising:

determining an overall risk assessment for an entire property including:

compiling a list of each ignited structural feature of the at least one primary structure and each ignited feature of the at least one non-primary structure fuel source;

placing the list in a Failure Mode Effect Analysis (FMEA) framework;

quantifying a relative risk of each item in the list in a Risk Priority Number (RPN) based on ignition impact by the tile and energy overage;

calculating a cumulative risk score for each of the plurality of threat vectors by evaluating the ignition failures of the at least one primary structure and calculating the energy overage and failure mode by ignition failure;

calculating a risk score for the entire property based on threat vector energy contributions to each ignition failure;

generating a risk assessment report including risk scores for at least one of each ignited structural feature, each structural feature, each ignited feature of the at least one non-primary structure fuel source, each feature of the at least one non-primary structural fuel sources, and the risk score for the entire property.

7. The method of claim 6, further comprising:

associating a heat flux contribution from multiple fuel sources to at least one ignition failure point;

identifying multiple failures in a same structural feature of the primary structure, wherein the multiple failures are caused by the heat flux contribution from the multiple fuel sources;

augmenting the FMEA framework to reflect the multiple failures of the same structural feature of the primary structure due to the heat flux from multiple sources; and prioritizing risks based on each of the multiple failures in the same structural feature.

8. The method of claim 7, further comprising:

determining a remediation solution for the at least one ignition failure point, including:

applying the prioritized risks to generate a remediation score for the FMEA framework, thereby providing an ability to address remediation solutions in a failure event;

incorporating risk prioritization into the FMEA framework, thereby utilizing multiple failure contributions; and generating a remediation report comprising the at least one ignition failure point and including remediation solutions based on the remediation score, wherein the remediation solutions include at least one of hardening the primary structure to ignition and reducing fuel loads surrounding the primary structure.

9. The method of claim 1, wherein the image is obtained through at least one of oblique satellite imagery, aerial imagery, ground imagery, real estate multiple listing service databases, and images from an application on a mobile device.

10. The method of claim 1, wherein the machine learning feature detection algorithm characterizes structural features including at least one of a window, a door, a vent, and a soffit.

11. A computing apparatus comprising:

a processor; and a memory storing instructions that, when executed by the processor, configure the apparatus to:

receive at least one image of a property, wherein the property comprises at least one primary structure;

identify structural features of the at least one primary structure by:

determine an inventory of exterior features of each at least one primary structure on the property, wherein the exterior features are located along a perimeter of the at least one primary structure and include dimensions and material composition;

utilize a machine learning feature detection algorithm on each of the at least one image to characterize primary structural features necessary to model fire susceptibility;

determine at least one non-primary structure fuel source on the property and surrounding the property by:

utilize a machine learning fuel load algorithm for:

detect major vegetation including at least one of a tree and a shrub;

detect secondary structures including at least one of a shed and a fence;

detect neighboring rooftops within a distance of the primary structure that would contribute to advancement of a wildfire; and detect at least one of a footprint of the primary structure, roof characteristics of the primary structure, and local topological features, wherein the local topological features include at least one of a slope, a road, a hydrant, and an arroyo;

determine a feature-specific attribute for each of the structural features of the at least one primary structure and for features of each of the at least one non-primary structure fuel sources; and calculate a fuel load in terms of thermal energy generation potential utilizing the feature-specific attributes.

12. The computing apparatus of claim 11, wherein the instructions further configure the apparatus to:

overlay a multi-dimensional grid on the at least one image of the property, wherein the grid comprises a plurality of tiles and divides the property into analysis points, each analysis point represented by one tile, and wherein a centroid of the primary structure is centered on the grid;

encode each tile within the grid with associated fuel element details and structural element details; and encode tiles within the grid with associated topographical data.

13. The computing apparatus of claim 12, wherein the instructions further configure the apparatus to:

determine, when exposed to at least one fuel source, a thermal energy output and a probability of ignition failure for each of the structural features of the at least one primary structure and for each of the at least one non-primary structure fuel sources, utilizing a fire risk algorithm, the fire risk algorithm including:

a plurality of threat vectors, comprising:

a heat flux for radiant impact threat vector;

a flame front contact for direct flame impingement threat vector;

an ember mass accumulation and size population for firebrand accumulation threat vector; and an ember penetration probability computation threat vector, wherein the probability of ignition failure for each of the plurality of threat vectors comprises utilize the structural features of the at least one primary structure, the features for each of the at least one non-primary structure fuel sources, spatial relationships between the at least one primary structure and the at least one non-primary structure fuel sources, and the feature-specific attributes for each of the structural features of the at least one primary structure and features for each of the at least one non-primary structure fuel sources;

a direct evaluation routine to determine whether each structural feature of the at least one primary structure ignites under an influence of each of the plurality of threat vectors summed over all of a plurality of fuel sources with direct access to each structural feature of the at least one primary structure;

a line of sight evaluation routine to determine an impact of each of the plurality of fuel sources within a line of sight of each tile include a portion of the primary structure;

calculate an ignition failure determination for each structural feature at each tile including a portion of the primary structure, wherein the calculations include the impact of the plurality of fuel sources with direct access to the primary structure and the plurality of fuel sources within the line of sight of each tile including a portion of the primary structure; and an evaluation routine to determine whether each feature of the at least one non-primary structure fuel source ignites under the influence of each of the plurality of threat vectors.

14. The computing apparatus of claim 13, wherein the instructions further configure the apparatus to:

update the fire risk algorithm by cataloguing for each tile with an ignition failure:

a location of the tile;

the at least one structural feature or each feature of the at least one non-primary structure fuel source that failed;

each of the plurality of threat vectors that caused each structural feature and each feature of the at least one non-primary structure fuel source to fail;

each individual fuel source contribute to each specific threat vector causing a feature failure;

wind direction during the feature failure; and a failure surplus for each feature failure, wherein the failure surplus measures an extra heat flux the failed feature experienced over a non-failure or non-ignition state.

15. The computing apparatus of claim 13, wherein the instructions further configure the apparatus to:

determine an influence of wind on each of the plurality of threat vectors including:

calculate an impact of each direction of wind from at least north, south, east, and west compass headings on each of the plurality of threat vectors for each tile including a portion of the primary structure; and calculate the impact of a plurality of wind speeds on each of the plurality of threat vectors for each tile including a portion of the at least one primary structure.

16. The computing apparatus of claim 15, wherein the instructions further configure the apparatus to:

determine an overall risk assessment for an entire property including:

compile a list of each ignited structural feature of the at least one primary structure and each ignited feature of the at least one non-primary structure fuel source;

place the list in a Failure Mode Effect Analysis (FMEA) framework;

quantify a relative risk of each item in the list in a Risk Priority Number (RPN) based on ignition impact by the tile and energy overage;

calculate a cumulative risk score for each of the plurality of threat vectors by evaluating the ignition failures of the at least one primary structure and calculating the energy overage and failure mode by ignition failure;

calculate a risk score for the entire property based on threat vector energy contributions to each ignition failure; and generate an a risk assessment report including risk scores for at least one of each ignited structural feature, each structural feature, each ignited feature of the at least one non-primary structure fuel sources, each feature of the at least one non-primary structural fuel sources, and the risk score for the entire property.

17. The computing apparatus of claim 16, wherein the instructions further configure the apparatus to:

associate a heat flux contribution from multiple fuel sources to at least one ignition failure point;

identify multiple failures in a same structural feature of the primary structure, wherein the multiple failures are caused by the heat flux contribution from the multiple fuel sources;

augment the FMEA framework to reflect the multiple failures of the same structural feature of the primary structure due to the heat flux from multiple sources; and prioritize risks based on each of the multiple failures in the same structural feature.

18. The computing apparatus of claim 17, wherein instructions further configure the apparatus to:

determine a remediation solution for the at least one ignition failure point, including:

apply the prioritized risks to generate a remediation score for the FMEA framework, thereby providing an ability to address remediation solutions in a failure event;

incorporate risk prioritization into the FMEA framework, thereby utilizing multiple failure contributions; and generate a remediation report comprising the at least one ignition failure point and including remediation solutions based on the remediation score, wherein the remediation solutions include at least one of hardening the primary structure to ignition and reducing fuel loads surrounding the primary structure.

19. The computing apparatus of claim 11, wherein the image is obtained through at least one of oblique satellite imagery, aerial imagery, ground imagery, real estate multiple listing service databases, and images from an application on a mobile device.

20. The computing apparatus of claim 11, wherein the machine learning feature detection algorithm characterizes structural features including at least one of a window, a door, a vent, and a soffit.

\* \* \* \* \*